(12) United States Patent
Kondo et al.

(10) Patent No.: US 7,885,993 B2
(45) Date of Patent: Feb. 8, 2011

(54) COMMUNICATION APPARATUS, COMMUNICATION METHOD, ELECTRONIC APPARATUS, CONTROL METHOD FOR CONTROLLING ELECTRONIC APPARATUS, AND STORAGE MEDIUM

(75) Inventors: Tetsujiro Kondo, Tokyo (JP); Akira Tange, Tokyo (JP)

(73) Assignee: Sony Corporation, Tokyo (JP)

( * ) Notice: Subject to any disclaimer, the term of this patent is extended or adjusted under 35 U.S.C. 154(b) by 623 days.

(21) Appl. No.: 11/964,595

(22) Filed: Dec. 26, 2007

(65) Prior Publication Data

US 2008/0215662 A1 Sep. 4, 2008

Related U.S. Application Data

(63) Continuation of application No. 10/239,109, filed as application No. PCT/JP02/00172 on Jan. 15, 2002, now abandoned.

(30) Foreign Application Priority Data

Jan. 23, 2001 (JP) .............................. 2001-014244

(51) Int. Cl.
*G06F 15/16* (2006.01)
(52) U.S. Cl. ..................... 709/201; 709/204; 725/105
(58) Field of Classification Search ................ 370/260, 370/353, 464, 338; 709/220, 206, 229, 219; 455/99, 456
See application file for complete search history.

(56) References Cited

U.S. PATENT DOCUMENTS 5,710,815 A * 1/1998 Ming et al. ................. 380/241

(Continued)

FOREIGN PATENT DOCUMENTS

CN 1203399 12/1998

(Continued)

OTHER PUBLICATIONS

Ichida Yoshio, "Products Recommendation System Based on User's Preference Using Correlation Graph Representation," Workshop papers in Electrical Engineers Society, Japan, The Institute of Electrical Engineers Society, No. 98-43/52, pp. 45-50, Nov. 5, 1998.

(Continued)

*Primary Examiner*—Thong H Vu
(74) *Attorney, Agent, or Firm*—Frommer Lawrence & Haug LLP; William S. Frommer; Paul A. Levy

(57) ABSTRACT

Value-added information is generated by collecting information relating to apparatuses from a plurality of users, and service is automatically and adaptively provided in a manner that satisfies each user's own preference.

Since a second electronic apparatus of a given user is controlled based on control information of a second electronic apparatus of another user to which first electronic apparatus information of the user is similar, electronic apparatus control service is performed in a manner adaptively matching preference of the user without complex signal processing such as user preference analysis. The electronic apparatus of the user is controlled based electronic apparatus information of the similar user with whom the user shares activity information such as transfer and purchases of apparatuses in common, electronic apparatus control service is performed in a manner adaptively matching preference of the user without complex signal processing such as user preference analysis.

149 Claims, 21 Drawing Sheets

U.S. PATENT DOCUMENTS

| | | | |
|---|---|---|---|
| 5,793,365 A | | 8/1998 | Tang et al. |
| 5,798,785 A | | 8/1998 | Hendricks et al. |
| 5,889,863 A | | 3/1999 | Weber |
| 5,915,067 A | * | 6/1999 | Nonomura et al. ............. 386/70 |
| 6,006,287 A | | 12/1999 | Wakazu |
| 6,029,195 A | * | 2/2000 | Herz ........................... 725/116 |
| 6,061,056 A | * | 5/2000 | Menard et al. .............. 715/704 |
| 6,067,302 A | * | 5/2000 | Tozuka ....................... 370/464 |
| 6,112,181 A | * | 8/2000 | Shear et al. ................... 705/10 |
| 6,134,532 A | | 10/2000 | Lazarus et al. |
| 6,154,776 A | | 11/2000 | Martin |
| 6,226,672 B1 | * | 5/2001 | DeMartin et al. ........... 709/219 |
| 6,247,000 B1 | | 6/2001 | Hawkins et al. |
| 6,263,205 B1 | | 7/2001 | Yamaura et al. |
| 6,347,993 B1 | | 2/2002 | Kondo et al. |
| 6,374,237 B1 | | 4/2002 | Reese |
| 6,377,982 B1 | | 4/2002 | Rai et al. |
| 6,392,664 B1 | | 5/2002 | White et al. |
| 6,396,531 B1 | | 5/2002 | Gerszberg et al. |
| 0,083,459 A1 | | 6/2002 | Kondo et al. |
| 6,412,012 B1 | | 6/2002 | Bieganski et al. |
| 6,463,585 B1 | | 10/2002 | Hendricks et al. |
| 6,486,892 B1 | | 11/2002 | Stern |
| 6,516,350 B1 | | 2/2003 | Lumelsky et al. |
| 6,535,915 B1 | | 3/2003 | Valys et al. |
| 6,545,722 B1 | | 4/2003 | Schultheiss et al. |
| 6,546,419 B1 | | 4/2003 | Humpleman et al. |
| 6,553,108 B1 | | 4/2003 | Felger |
| 6,557,012 B1 | | 4/2003 | Arun et al. |
| 6,594,699 B1 | | 7/2003 | Sahai et al. |
| 6,611,501 B1 | | 8/2003 | Owen |
| 6,640,145 B2 | | 10/2003 | Hoffberg et al. |
| 6,647,202 B1 | | 11/2003 | Yamaguchi et al. |
| 6,697,824 B1 | * | 2/2004 | Bowman-Amuah ......... 709/229 |
| 6,714,987 B1 | | 3/2004 | Amin et al. |
| 6,771,638 B1 | * | 8/2004 | Nguyen et al. .............. 370/352 |
| 6,778,982 B1 | | 8/2004 | Knight et al. |
| 6,785,538 B2 | | 8/2004 | Nihei |
| 6,785,716 B1 | | 8/2004 | Nobakht |
| 6,802,041 B1 | | 10/2004 | Rehm |
| 6,836,768 B1 | | 12/2004 | Hirsch |
| 6,871,234 B1 | | 3/2005 | Minakuchi et al. |
| 6,898,762 B2 | | 5/2005 | Ellis et al. |
| 6,901,207 B1 | * | 5/2005 | Watkins ........................ 386/83 |
| 6,911,592 B1 | | 6/2005 | Futamase et al. |
| 6,912,385 B2 | | 6/2005 | Namba et al. |
| 6,965,868 B1 | | 11/2005 | Bednarek |
| 6,971,119 B1 | * | 11/2005 | Arsenault et al. ............. 725/89 |
| 6,990,489 B2 | | 1/2006 | Kondo et al. |
| 6,990,631 B2 | | 1/2006 | Narahara |
| 6,999,957 B1 | * | 2/2006 | Zamir et al. ................. 707/673 |
| 7,072,886 B2 | | 7/2006 | Salmenkaita et al. |
| 7,146,627 B1 | | 12/2006 | Ismail et al. |
| 7,158,986 B1 | | 1/2007 | Oliver et al. |
| 7,159,011 B1 | | 1/2007 | Knight et al. |
| 7,266,376 B2 | * | 9/2007 | Nakagawa ............... 455/456.1 |
| 7,426,540 B1 | * | 9/2008 | Matsumoto et al. ......... 709/206 |
| 7,620,703 B1 | * | 11/2009 | Shteyn ....................... 709/220 |
| 2001/0016492 A1 | | 8/2001 | Igarashi et al. |
| 2001/0030667 A1 | | 10/2001 | Kelts |
| 2001/0049826 A1 | | 12/2001 | Blasko |
| 2001/0049826 A1 | | 12/2001 | Wilf |
| 2002/0019796 A1 | | 2/2002 | LeGraw |
| 2002/0026348 A1 | | 2/2002 | Fowler et al. |
| 2002/0041756 A1 | | 4/2002 | Kato |
| 2002/0045154 A1 | | 4/2002 | Wood et al. |
| 2002/0059621 A1 | | 5/2002 | Thomas et al. |
| 2002/0065802 A1 | | 5/2002 | Uchiyama |
| 2002/0078150 A1 | | 6/2002 | Thompson et al. |
| 2002/0083065 A1 | | 6/2002 | Sasaki et al. |
| 2002/0087661 A1 | | 7/2002 | Matichuk et al. |
| 2002/0100058 A1 | | 7/2002 | Hirose et al. |
| 2002/0111146 A1 | * | 8/2002 | Fridman et al. ............... 455/99 |
| 2002/0111878 A1 | | 8/2002 | Namba et al. |
| 2002/0116366 A1 | | 8/2002 | Magouirk et al. |
| 2002/0120931 A1 | | 8/2002 | Huber et al. |
| 2002/0152461 A1 | | 10/2002 | Istvan |
| 2002/0165912 A1 | | 11/2002 | Wenocur et al. |
| 2002/0174227 A1 | | 11/2002 | Hartsell et al. |
| 2002/0178446 A1 | | 11/2002 | Sie et al. |
| 2002/0178447 A1 | | 11/2002 | Plotnick et al. |
| 2002/0178448 A1 | | 11/2002 | Te Kiefte et al. |
| 2003/0004853 A1 | | 1/2003 | Ram et al. |
| 2003/0005134 A1 | | 1/2003 | Martin et al. |
| 2003/0009570 A1 | | 1/2003 | Moskowitz et al. |
| 2003/0018767 A1 | | 1/2003 | Chatani et al. |
| 2003/0028872 A1 | | 2/2003 | Milovanovic et al. |
| 2003/0037144 A1 | | 2/2003 | Pestoni et al. |
| 2003/0067554 A1 | | 4/2003 | Klarfeld et al. |
| 2003/0069922 A1 | | 4/2003 | Arunachalam |
| 2003/0093790 A1 | | 5/2003 | Logan et al. |
| 2003/0120557 A1 | | 6/2003 | Evans et al. |
| 2003/0126136 A1 | | 7/2003 | Omoigui |
| 2003/0126245 A1 | | 7/2003 | Feltin et al. |
| 2004/0223476 A1 | * | 11/2004 | Jose et al. .................... 370/338 |
| 2005/0210120 A1 | | 9/2005 | Yukie et al. |
| 2005/0246738 A1 | | 11/2005 | Lockett et al. |
| 2005/0262539 A1 | | 11/2005 | Barton et al. |
| 2005/0262542 A1 | | 11/2005 | DeWeese et al. |
| 2006/0015904 A1 | | 1/2006 | Marcus |
| 2006/0129547 A1 | | 6/2006 | Yamamoto et al. |
| 2006/0161635 A1 | | 7/2006 | Lamkin et al. |
| 2009/0013356 A1 | * | 1/2009 | Doerr et al. .................... 725/62 |
| 2009/0190677 A1 | * | 7/2009 | Jokela et al. ................. 375/260 |

FOREIGN PATENT DOCUMENTS

| | | |
|---|---|---|
| JP | 9-179909 | 7/1997 |
| JP | 11-7453 | 1/1999 |
| JP | 11-509019 | 8/1999 |
| JP | 2000 112609 | 4/2000 |
| JP | 2000 112976 | 4/2000 |
| JP | 2000 123027 | 4/2000 |
| JP | 2000 155757 | 6/2000 |
| JP | 2002 82977 | 3/2002 |
| JP | 2002 232823 | 8/2002 |
| WO | WO 97/02537 | 1/1997 |

OTHER PUBLICATIONS

Manabu Nagai, "Recommendation automatically recommending preferred commodity", NIKKEI Multimedia, Japan, Nikkei Business Publications, Inc., No. 43, pp. 144-145, Feb. 1999.

Kanba Tomonari, "Beyond Internet-based one-to-one marketing," Technical report in Information Processing Society, Japan, Information Processing Society of Japan, vol. 2000, No. 63, pp. 19-24, Jul. 11, 2000.

Yagawa Yuichi, "TV Program Planning Agent using Analysis Method of User's Taste," IEICE technical report, Japan, The Institute of Electronics, Information and Communication Engineers, vol. 98, No. 437, pp. 9-16, Dec. 1998.

A scalable control topology for multicast communications Liebeherr, J., Sethi, B.S.: Infocom '98. Seventeenth Annual Joint Conference of the IEEE Computer and Communications Societies. Proceedings. IEEE, vol. 3, Mar. 29-Apr. 2, 1998 pp. 1197-1204 vol. 3.

Onion Routing for Anonymous and Private Internet Connections—Goldschlag, Reed, Syverson (1999) www.onion-router.net/Publications/CACM-1999 ps.gz.

Techniques and Knowledge used for Adaptation during . . . —Wolke, Bermann (1998) ftpagr.informatik.uni-kl.de/pub/lehre/CBR_WS9798/iea.ps.gz.

Identification of Web User Traffic Composition using Multi-Modal .. —Heer, Chi (2000), www-users.cs.umn.edu/~echi/papers/SIAM-Data-Mining-2001/SIAM-Data-Mining-MMC2.pdf.

* cited by examiner

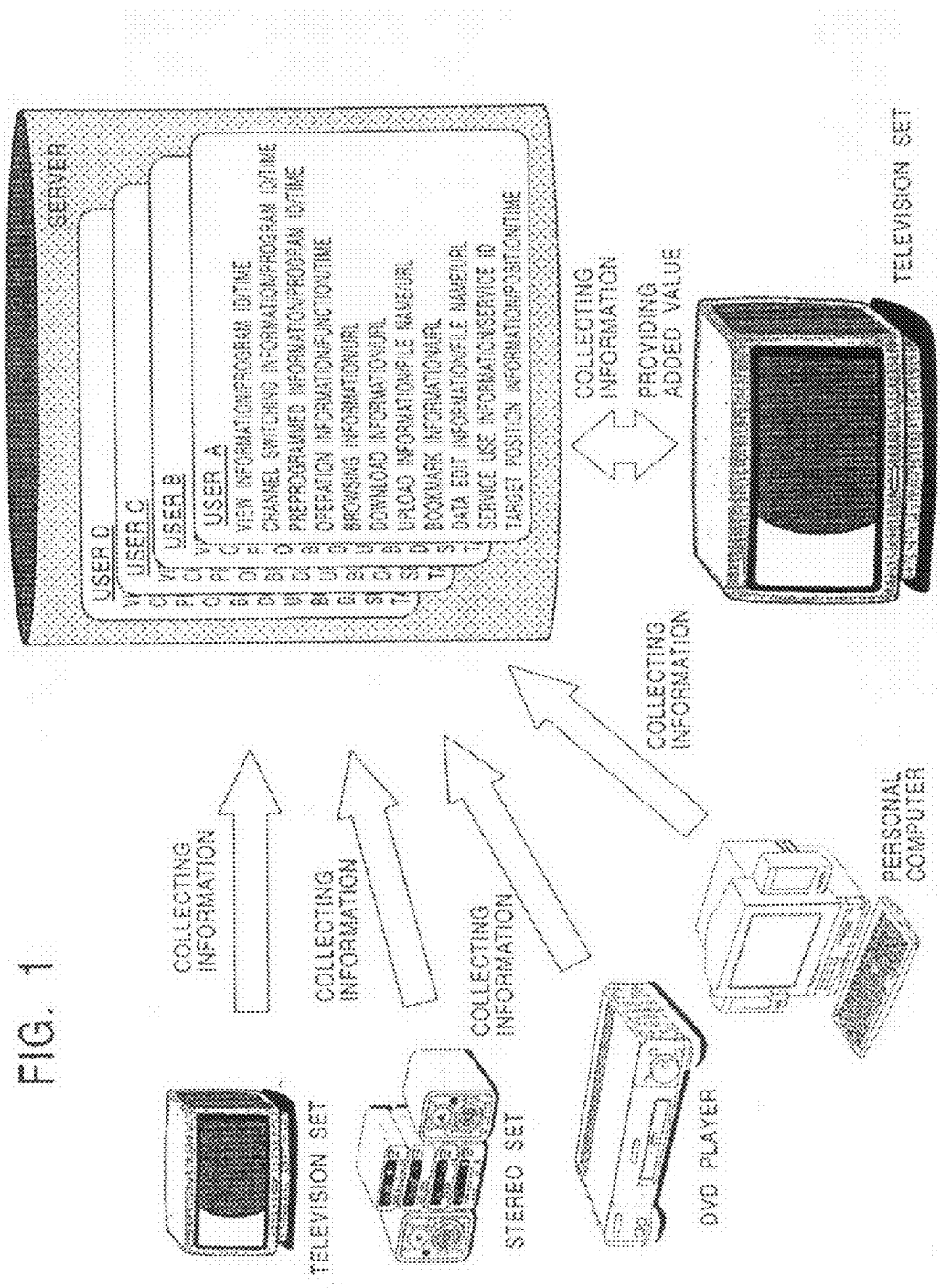

FIG. 2

| COLLECTED INFORMATION | ADDED VALUE | TV (RADIO) | VIDEO (AUDIO) | COMPUTER | MOBILE TELEPHONE |
|---|---|---|---|---|---|
| TV (RADIO) | VIDEO AND AUDIO INFORMATION CHANNEL SWITCHING INFORMATION (NEXT CHANNEL ON A TRAIL BASIS) | | | | |
| VIDEO (AUDIO) | PREPROGRAMMED VIDEO/AUDIO RECORDING INFORMATION OPERATION INFORMATION (PLAYBACK, FAST-FORWARD, REWIND, OVERWRITE) | CHANNEL PRIORITY AUTOMATIC CHANNEL SWITCHING | AUTOMATIC PREPRO- GRAMMED RECORDING DIGEST PRODUC- TION | AUTOMATIC BOOKMARK | AUTOMATIC MELODY UPDATING |
| COMPUTER (MOBILE TELEPHONE) | BROWSING INFORMATION DOWNLAOD INFORMATION (PAID) UPLOAD INFORMATION BOOKMARK INFORMATION DATA EDIT INOFORMATION | AUTOMATIC PARTIAL RESOLUTION SETTING | SEARCH INDEX PRODUC- TION | AUTOMATIC DOWNLOAD AUTOMATIC BROWSING | AUTOMATIC TICKET BOOKING |
| MOBILE TELEPHONE | SERVICE USE INFORMATION (MELODY SIGNALING INCOMING CALL) | AUTOMATIC VOLUME CONTROL | AUTOMATIC PROGRAM ERASING | AUTOMATIC DATA DELETION | |
| ADDED FUNCTION | (VIEWER/LISTENER POSTURE INFORMATION) TARGET POSITION INFORMATION (SIGHT LINE DIRECTION, MOUSE) | | AUTOMATIC TITLE PRODUC- TION | AUTOMATIC CATEGORI- ZATION | |

FIG. 12

| COLLECTED INFORMATION | ADDED VALUE | TV (RADIO) | VIDEO (AUDIO) | COMPUTER | MOBILE TELEPHONE | ADDED VALUE USEFUL IN REAL WORLD |
|---|---|---|---|---|---|---|
| TV (RADIO) | VIDEO AND AUDIO INFORMATION, CHANNEL SWITCHING INFORMATION (NEXT CHANNEL ON A TRAIL BASIS) | | | | | |
| VIDEO (AUDIO) | PREPROGRAMMED VIDEO/AUDIO RECORDING INFORMATION, OPERATION INFORMATION (PLAYBACK, FAST-FORWARD, REWIND, OVERWRITE) | CHANNEL PRIORITY, AUTOMATIC CHANNEL SWITCHING | AUTOMATIC PREPROGRAMMED RECORDING | AUTOMATIC BOOKMARK | AUTOMATIC MELODY UPDATING | SHOPPING AND EVENT INFORMATION INTENDED FOR INDIVIDUALS WHO HAVE COMMON PERSONAL REFERENCES |
| COMPUTER (MOBILE TELEPHONE) | BROWSING INFORMATION, DOWNLOAD INFORMATION (PAID), UPLOAD INFORMATION, BOOKMARK INFORMATION, DATA EDIT INFORMATION | AUTOMATIC PARTIAL RESOLUTION SETTING | DIGEST PRODUCTION, SEARCH INDEX PRODUCTION | AUTOMATIC DOWNLOAD, AUTOMATIC BROWSING | AUTOMATIC TICKET BOOKING | ACTIVITY PROMOTING INFORMATION IN LOCATION OF ACTIVITY |
| MOBILE TELEPHONE | SERVICE USE INFORMATION (MELODY SIGNALING INCOMING CALL), ACTIVITY INFORMATION BY GPS | AUTOMATIC VOLUME CONTROL | AUTOMATIC PROGRAM ERASING | AUTOMATIC DATA DELETION | | AREA INFORMATION OF ACTIVITY AREA |
| ADDED FUNCTION | (VIEWER/LISTENER POSTURE INFORMATION) TARGET POSITION INFORMATION (SIGHT LINE DIRECTION, MOUSE), INFORMATION OF PRODUCT PURCHASED THROUGH CREDIT CARD | | AUTOMATIC TITLE PRODUCTION | AUTOMATIC CATEGORIZATION | | VALUE-ADDED INFORMATION FOR DRIVING WILLINGNESS TO BUY |

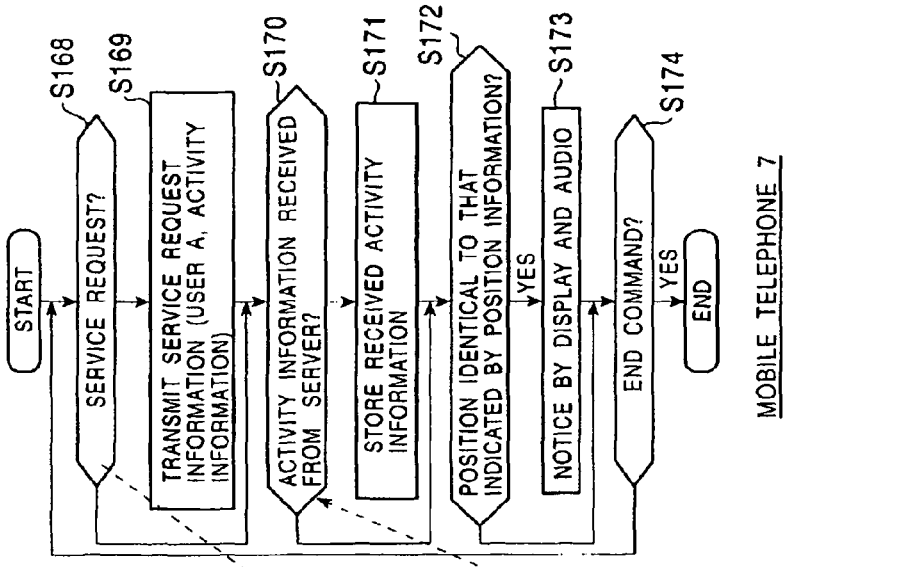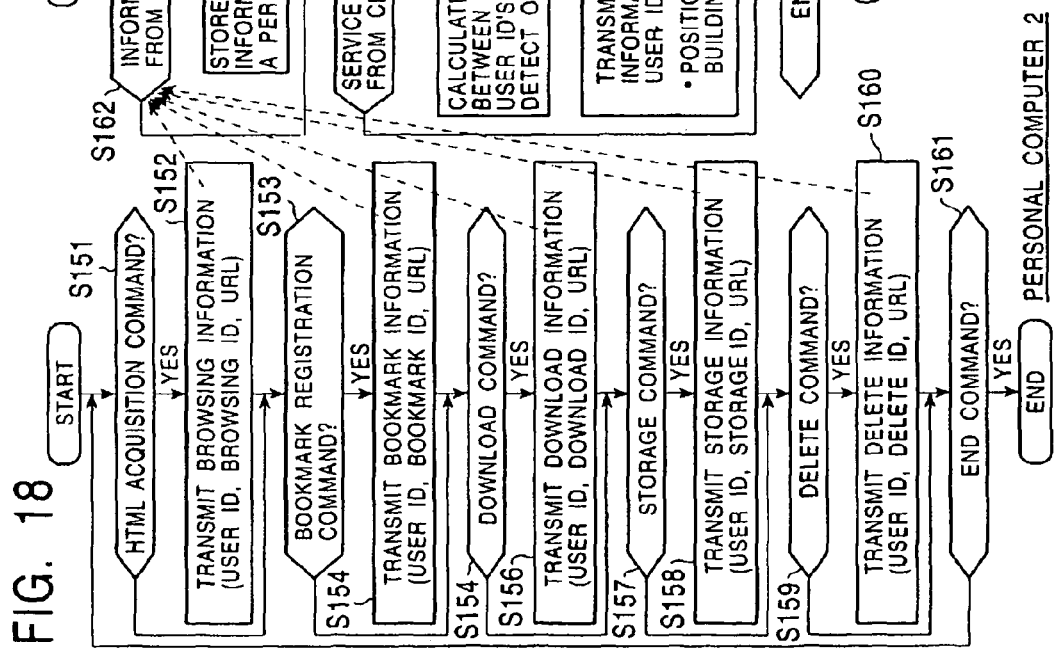
FIG. 18

COMMUNICATION APPARATUS, COMMUNICATION METHOD, ELECTRONIC APPARATUS, CONTROL METHOD FOR CONTROLLING ELECTRONIC APPARATUS, AND STORAGE MEDIUM

This is a continuation of application Ser. No. 10/239,109, filed Sep. 19, 2002 now abandoned under 35 USC 371 from International Application PCT/JP02/00172, filed Jan. 15, 2002 with a claim of priority under 35 USC 119 to Japanese Application 2001-014244, filed in Japan on Jan. 23, 2001, the entirety thereof being incorporated herein by reference.

TECHNICAL FIELD

The present invention relates to a communication apparatus and a communication method of a server which adds value to information collected from a plurality of users, and an electronic apparatus and a method of controlling the electronic apparatus for a client who receives this type of value-added information and, particularly, to a communication apparatus and a communication method, an electronic apparatus and a method controlling the electronic apparatus, and a storage medium for collecting information relating to operation of apparatuses by a plurality of users and activity of the users in the real world, for generating value-added information and for receiving the value-added information.

More specifically, the present invention relates to a communication apparatus and a communication method, an electronic apparatus and a method for controlling the electronic apparatus, and a storage medium for collecting information relating to apparatus operation from a plurality of users, for generating value-added information relating to users, preferences, and for automatically adapting to provision of a variety of services based on user preferences taking advantage of the value-added information.

BACKGROUND ART

Along with current advance of technology, information apparatuses such as personal computers (PCs), and information appliances such as television receivers, and other audio-visual apparatuses have been developed and are commercially available. Consumers purchase these information apparatuses directly from show cases in stores, or online shop them.

Purchase information of what products the consumers have bought, and history of use and operation of the products by the users may serve as source information for value addition to be used to predict consumer life and needs of the consumers. For example, purchasers of television sets are expected to desire to receive signals from broadcasting satellites (or the purchasers of television sets may be interested in satellite broadcasting more than purchasers of other products). The purchase information of the purchasers of the television sets may be registered in a purchase information data base and the data base is then analyzed to select addressees to which advertising catalogs for satellite broadcasting may be efficiently sent. Based on television viewing information (for example, of what programs are viewed for how long), it is possible to determine what category of television programs each individual prefers. Automatic reception service of advertising contents may be provided to people who like the same category.

The method for linking the purchasers of the television sets to the advertising catalogs of satellite broadcasting needs human intervention in the interpretation of the data, and cannot be automatically adapted to a variety of other services.

The method of distributing programs of the same category based on the television viewing information requires less data interpretation because the object from which information is collected is identical to the object to which value-added information is provided. Broadcast and distributed contents need to be automatically categorized, and this method cannot be automatically adapted to a variety of other services.

The provision of service based on the user's preference has conventionally required human intervention in data interpretation or automatic categorization of the contents. Applying the methods in vast amount of service is costly, and is difficult to technically implement.

DISCLOSURE OF THE INVENTION

It is an object of the present invention to provide a communication apparatus and a communication method, an electronic apparatus, and a method of controlling the electronic apparatus, and a storage medium for collecting information relating to operation of apparatuses by a plurality of users and activity of the users, for generating value-added information and for receiving the value-added information.

It is another object of the present invention to provide a communication apparatus and a communication method, an electronic apparatus, and a method of controlling the electronic apparatus, and a storage medium for collecting information relating to apparatus operation from a plurality of users, for generating value-added information relating to users' preferences, and for automatically adapting to provision of a variety of services based on user preferences taking advantage of the value-added information.

The present invention has been developed to achieve the above objects, and in a first aspect relates to a communication apparatus or a communication method, including receiver means or receiving step for receiving first electronic apparatus information relating to a first electronic apparatus from a plurality of users, determining means or determining step for determining, from among the plurality of users, a second user having the first electronic apparatus information similar to that of a first user, and transmitter means or transmitting step for transmitting control information for a second electronic apparatus of the second user to a second electronic apparatus of the first user.

The present invention has been developed based on the fact that operation information or control information such as input operations to the electronic apparatus by the user reflects a certain degree of preference information of the user.

In accordance with the communication apparatus and the communication method of the present invention in the first aspect thereof, value-added information is generated based on the operation information and the control information to a diversity of media by a plurality of users so that an automatic control service is provided in the operation of a particular medium by a particular user. In other words, service working on another medium of a similar user is tuned up making use of information expressing the preference of the user such as the operation information and the control information acquired on the medium of the particular user.

The present invention in a second aspect relates to a communication apparatus or a communication method and includes receiver means or receiving step for receiving user activity information from a plurality of users, determining means or determining step for determining, from among the plurality of users, a second user having activity information which, received and collected by the receiver means, is similar to that of a first user, and transmitter means or transmitting step for transmitting control information for a second electronic apparatus of the second user to a second electronic apparatus of the first user.

In accordance with the communication apparatus or the communication method of the present invention in the second aspect thereof, an automatic control service is provided to a medium of a particular user based on trial information and activity information of a plurality of users in the real world. In other words, the user activity information is received and accumulated from a plurality of user terminals, and value-added information is generated based on the accumulated activity information, and service working on the medium of the user is tuned up making use of the operation information of the medium of the similar user having similar activity information.

The present invention in a third aspect relates to a communication apparatus or a communication method and includes receiver means or receiving step for receiving first electronic apparatus information relating to a first electronic apparatus from a plurality of users, determining means or determining step for determining, among the plurality of users, a second user having the first electronic apparatus information similar to that of a first user, and transmitter means or transmitting step for transmitting control information for a second electronic apparatus, corresponding to activity information of the second user, to a second electronic apparatus of the first user.

In accordance with the communication apparatus or the communication method of the present invention in the third aspect thereof, activity information affecting the activity of the user in the real world is provided based on the value-added information obtained from the operation information and the control information of the media of the plurality of users. For example, based on the operation information of another user collected on a personal computer, value-added information affecting the real world is provided through notice to the user on a mobile telephone, for example.

The present invention in a fourth aspect relates to an electronic apparatus or a control method for the electronic apparatus, and includes receiver means or receiving step for receiving control information for the electronic apparatus, and control means or control step for controlling the electronic apparatus based on the received control information, wherein the control information includes control information for another electronic apparatus of a similar user, and wherein electronic apparatus information of the similar user of the other electronic apparatus is similar to that of a user of the electronic apparatus.

In accordance with the fourth aspect of the present invention, the electronic apparatus receives, from an external server, the value-added information which is generated based on the operation information and the control information of a variety of media by a plurality of users. The user thus enjoys an automatic tuning service on the electronic apparatus making use of the value-added information from another user who has similar operation information on a medium.

The present invention in a fifth aspect relates to an electronic apparatus or a control method for controlling the electronic apparatus, and includes receiver means or receiving step for receiving control information for controlling the electronic apparatus, and control means or control step for controlling the electronic apparatus based on the received control information, wherein the control information includes control information for another electronic apparatus of a similar user, and wherein activity information of the similar user is similar to that of a user of the electronic apparatus.

In accordance with the fifth aspect of the present invention, the operation of the electronic apparatus by the user is automatically tuned making use of the operation information of the medium by the similar user who has similar preference information and activity information in the real world.

The present invention in a sixth aspect relates to a recording medium physically storing a computer readable software program into which a process for controlling an electronic apparatus for a single user based on control information of electronic apparatuses of a plurality of users is written to be executed on a computer system. The computer software program includes a receiving step of receiving first electronic apparatus information relating to a first electronic apparatus from a plurality of users, a determining step of determining, from among the plurality of users, a second user having the first electronic apparatus information similar to that of a first user, and a transmitting step of transmitting control information for a second electronic apparatus of the second user to a second electronic apparatus of the first user.

The present invention in a seventh aspect relates to a recording medium physically storing a computer readable software program into which a process for controlling an electronic apparatus for a single user based on activity information of a plurality of users is written to be executed on a computer system. The computer software program includes a receiving step of receiving user activity information from a plurality of users, a determining step of determining, from among the plurality of users, a second user having activity information which, received and collected in the receiving step, is similar to that of a first user, and a transmitting step of transmitting control information for a second electronic apparatus of the second user to a second electronic apparatus of the first user.

The present invention in an eighth aspect relates to a recording medium physically storing a computer readable software program into which a process for controlling an electronic apparatus for a single user based on electronic apparatus information of a plurality of users is written to be executed on a computer system. The computer software program includes a receiving step of receiving first electronic apparatus information relating to a first electronic apparatus from a plurality of users, a determining step of determining, from among the plurality of users, a second user having the first electronic apparatus information similar to that of a first user, and a transmitting step of transmitting control information for a second electronic apparatus, corresponding to activity information of the second user, to a second electronic apparatus of the first user.

The present invention in a ninth aspect relates to a recording medium physically storing a computer readable software program into which a process for controlling an electronic apparatus for a single user based on control information of an electronic apparatus of a similar user is written to be executed on a computer system. The computer software program includes a receiving step of receiving control information for controlling the electronic apparatus, and a controlling step of controlling the electronic apparatus based on the received control information, wherein the control information includes control information for another electronic apparatus of a similar user, and wherein electronic apparatus information of the similar user of the other electronic apparatus is similar to that of a user of the electronic apparatus.

The present invention in a tenth aspect relates to a recording medium physically storing a computer readable software program into which a process for controlling an electronic apparatus for a single user based on activity information of a similar user is written to be executed on a computer system.

The computer software program includes a receiving step of receiving control information for controlling the electronic apparatus, and a controlling step of controlling the electronic apparatus based on the received control information, wherein the control information includes control information for another electronic apparatus of a similar user, and wherein activity information of the similar user is similar to that of a user of the electronic apparatus.

The storage medium in each of the sixth through tenth aspects of the present invention provides a computer software program in a computer readable form to a general-purpose computer system which executes a diversity of program codes. Such medium may be a removable and portable recording medium such as a DVD (Digital Versatile Disc), a CD (Compact Disc), an FD (Flexible Disk), or an MO (Magneto-Optical disc). It is technically possible to supply a computer software program to a particular computer system through a network (whether the network is wireless or wired is not important).

The storage medium in each of the sixth through tenth aspects of the present invention defines structural or functional collaborative relationship with which the function of a predetermined computer software program is carried on the computer system. In other words, the predetermined computer software program is installed in the computer system through the storage medium in each of the sixth through tenth aspects of the present invention, and a collaborative operation is performed on the computer system. The storage medium thus provides the same advantages and operation as those provided by the communication apparatus or the communication method related to each of the first through third aspects of the present invention, and the electronic apparatus or the control method for controlling the electronic apparatus related to each of the fourth and fifth aspects of the present invention.

Other objects, features, and advantages of the present invention will become obvious from the detailed description of the embodiments of the present invention and accompanying drawings.

BRIEF DESCRIPTION OF THE DRAWINGS

FIG. 1 diagrammatically illustrating a tuning service using other media in accordance with one embodiment of the present invention.

FIG. 2 lists, in a table, information collected from each medium and value-added information provided to each medium.

FIG. 12 lists, in a table, information collected from each medium and value-added information provided to each medium.

FIG. 18 is a flow diagram of the process for providing service that affects the real world through the mobile telephone 7 with the GPS function based on information collected on the personal computer 2.

BEST MODE FOR CARRYING OUT THE INVENTION

Figure 3:
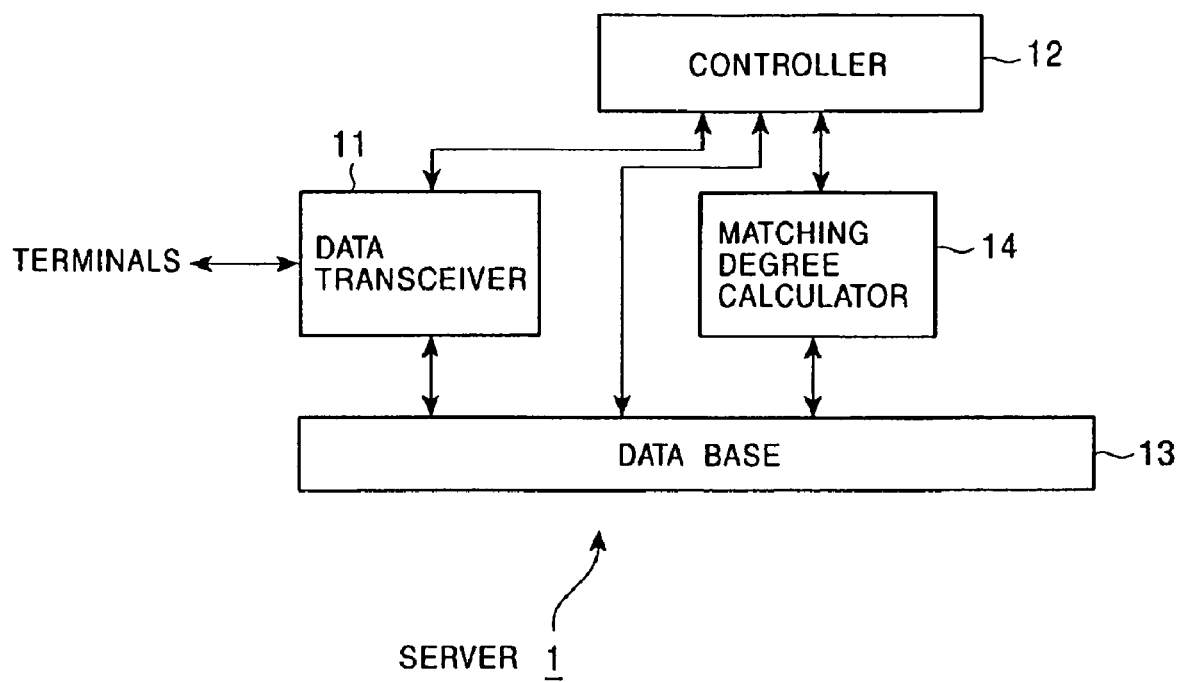
FIG. 3 is a block diagram diagrammatically illustrating the function of a server 1 which provides a tuning service using another medium.

The embodiments of the present invention will now be discussed with reference to the drawings.

A. First Embodiment

A first embodiment of the present invention is based on the fact that operation information or control information such as input operations to an electronic apparatus by a user reflects the users preference information to some degree. In accordance with the present embodiment, value-added information is generated based on the operation information and the control information to a variety of media by a plurality of users, and then an automatic control service is provided to a particular user in the operation of a particular medium.

The feature of the present embodiment is that the preference information and the operation information acquired on the medium of a given user are used to tune up service in another medium of a similar user. Specifically, the present invention provides a wide range of electronic apparatus control service to a diversity of media and electronic apparatuses.

For example, user input information is collected as the user's preference information from a plurality of media ubiquitous at home, such as AV apparatuses including television sets, stereo sets, video decks, and DVD players, and personal computers, and some value-added information is generated based on the collected information, and is then fed back in control service of other media.

FIG. 1 diagrammatically illustrates a tuning service using other media in accordance with one embodiment of the present invention.

As shown, a particular server collects information relating to user operation carried out on the media installed at home such as TV sets, stereo sets, DVD players, and personal computers.

The server and each medium are connected to each other using a short-distance radio data link such as Bluetooth, IEEE 1394, home LAN, a wide-area network such as the Internet, cable television (CATV), or other communication media.

The server may be installed at the same home or in a remote place. A plurality of homes may share the same server. As shown, users A through D share the same server.

FIG. 2 lists, in a table, information collected from each medium and value-added information provided to each medium.

The user operation information collected on the server includes "viewing and listening information" represented by a program ID and viewing (replay) time of television or radio broadcast data in a receiver and "channel switching information" represented by the ID of a channel to which the receiver is tuned, and channel switch time at which the tuned channel is switched.

Other examples of user operation information also include "video (recording) information" represented by the ID of a program which is replayed by a receiver such as a TV set or is recorded by a recorder such as a VTR and broadcast (recording) time, "operation information" representing an operation to the recorder during recording, "preprogrammed recording information" representing the ID of a content preprogrammed for video (recording) on the recorder, and "operation information" for replaying representing functions such as replay, fast-forward, rewind, and pause, and time set for these functions.

The user operation information further includes "browsing information" of a Web represented by a URL (Uniform Resource Locator) indicating a site which is searched and monitored on a user terminal that is linked over a network, such as a personal computer, "download information" represented by a URL indicating the storage location of a file downloaded to the user terminal through the network from an external apparatus such as an information providing server, "upload information" represented by a URL indicating the ID and the storage location of a file uploaded to an external electronic apparatus from the user terminal through the network, "bookmark information" represented by an URL indicating a site which is searched, monitored and bookmark registered on the user terminal, and "edit information" containing the ID of a file edited by the user on the user terminal and an edit ID identifying the type of edit.

Other examples of the user operation information include operation information for a mobile telephone or a communication terminal which performs one-to-one communication such as in peer to peer link. For example, the user operation information includes "service use information" represented by a service ID identifying ticket-booking information transmitted from a mobile telephone to an external apparatus such as a service center through a public telephone line.

The server collects and processes the user operation information of each medium, and generates value-added information based on the user preference information represented by the user operation. The value-added information is fed to a medium (the value-added information is fed to a TV set in FIG. 1), and tuning service is carried out on the medium. The value-added information may be operation information that helps the user operate the electronic apparatus, for example.

The value-added information fed to the user from the server includes operation information of a receiver such as a TV set. For example, the value-added information may include "channel information" formed of the ID of a channel to which the receiver is tuned, "area information" indicating a target area of video data received and replayed, and "volume information" indicating the volume of audio data received and replayed.

The value-added information supplied to the user from the server is operation information of a video recorder such as a VTR. For example, the value-added information may include "preprogrammed recording information" indicating the content ID and recording time, and "preprogrammed recording information" which indicates preprogrammed recording date and time on a video recorder of another user.

The value-added information supplied to a reproducing device such as a VTR or a DVD player may include "digest information" of a replay content produced by another user, "search index information" produced for searching for the replay content, "delete information" formed of the ID of a content which is deleted from a recording medium on the recorder of the other user, and "title information" relating to a recorded content produced on the recorder of the other user.

The value-added information supplied to the user terminal, such as a personal computer, communicable over a network, may include "browsing information" of a Web represented by a URL indicating a site which is searched and monitored on another user terminal, "download information" represented by a URL indicating the storage location of a file downloaded to the terminal of the other user through the network from an external apparatus such as an information providing server, "bookmark information" represented by an URL indicating a site which is bookmark registered on the terminal of the other user, and "category information" according to which the other user categorizes a plurality of contents stored in a hard disk device in the terminal of the other user.

The value-added information supplied to a mobile telephone or a communication terminal which performs a one-to-one communication such as in a peer-to-peer link may include an incoming call sound ID identifying an incoming call sound set in a communication terminal of another user, and "service use information" represented by a service ID identifying ticket-booking information transmitted to an external apparatus such as a service center from the mobile telephone of the other user through a public telephone line.

FIG. 3 is a block diagram diagrammatically illustrating the function of a server 1 which provides a tuning service using another medium. The server 1 is actually embodied by an ordinary computer system that carries out a predetermined server application.

As shown, the server 1 includes a data transceiver 11, a controller 12, a data base 13, and a matching degree calculator 14.

The data transceiver 11 is connected to each of media installed at home, such as AV apparatuses including television sets, stereo sets, video decks, and DVD players, and personal computers, and collects information relating to operations carried out to the media by a plurality of users. The data transceiver 11 is connected to each medium using a short-distance radio data link such as Bluetooth, IEEE 1394, home LAN, a wide-area network such as the Internet, cable television (CATV), or other communication media.

The controller 12 generally controls the operation of the server 1 by performing a variety of program codes under a program execution environment provided by an operating system (OS). The controller 12 may be formed of a CPU (Central Processing Unit) and a main memory, for example.

The data base 13 stores the user operation information received from each medium which is used by each user. Specifically, all user operation information is stored on a per user ID basis as illustrated in FIG. 1.

The matching degree calculator 14 is a functional module which calculates a matching degree between the user operation information received from the medium of a particular user and each pieces of data on the data base 13. For example, the matching degree calculator 14 searches the data base 13 for a user similar to the user operation information of a particular apparatus of a particular user. Also, the matching degree calculator 14 searches the data base 13 for a user having activity information (to be discussed later) similar to that of the particular user.

Based on the matching degree, the controller 12 generates value-added information of the particular user. The generated value-added information is transferred to the medium of the particular user through the data transceiver 11.

The present embodiment is based on the assumption that users who share operation information and preference information in common concerning a particular apparatus/medium also have similar operation information and preference information concerning other apparatuses/media. In other words, a user who has coincident or similar operation information and preference information concerning a particular apparatus/medium is searched for, the operation information and preference information of another apparatus/medium of this user are retrieved, and the value-added information to be supplied to another user is generated based on the operation information and preference information, and is then sent to the corresponding apparatus/medium through the data transceiver 11.

As a result, the server 1 tunes up apparatus control service on the other medium making use of the preference information and the operation information acquired on a given medium. For example, based on the collected information such as the operation information and the control information on a personal computer, other media such as a digital TV, a digital video tape recorder, and a mobile telephone of the same user are automatically controlled.

Tuning service making use of the other medium is specifically discussed below.

Figure 4:
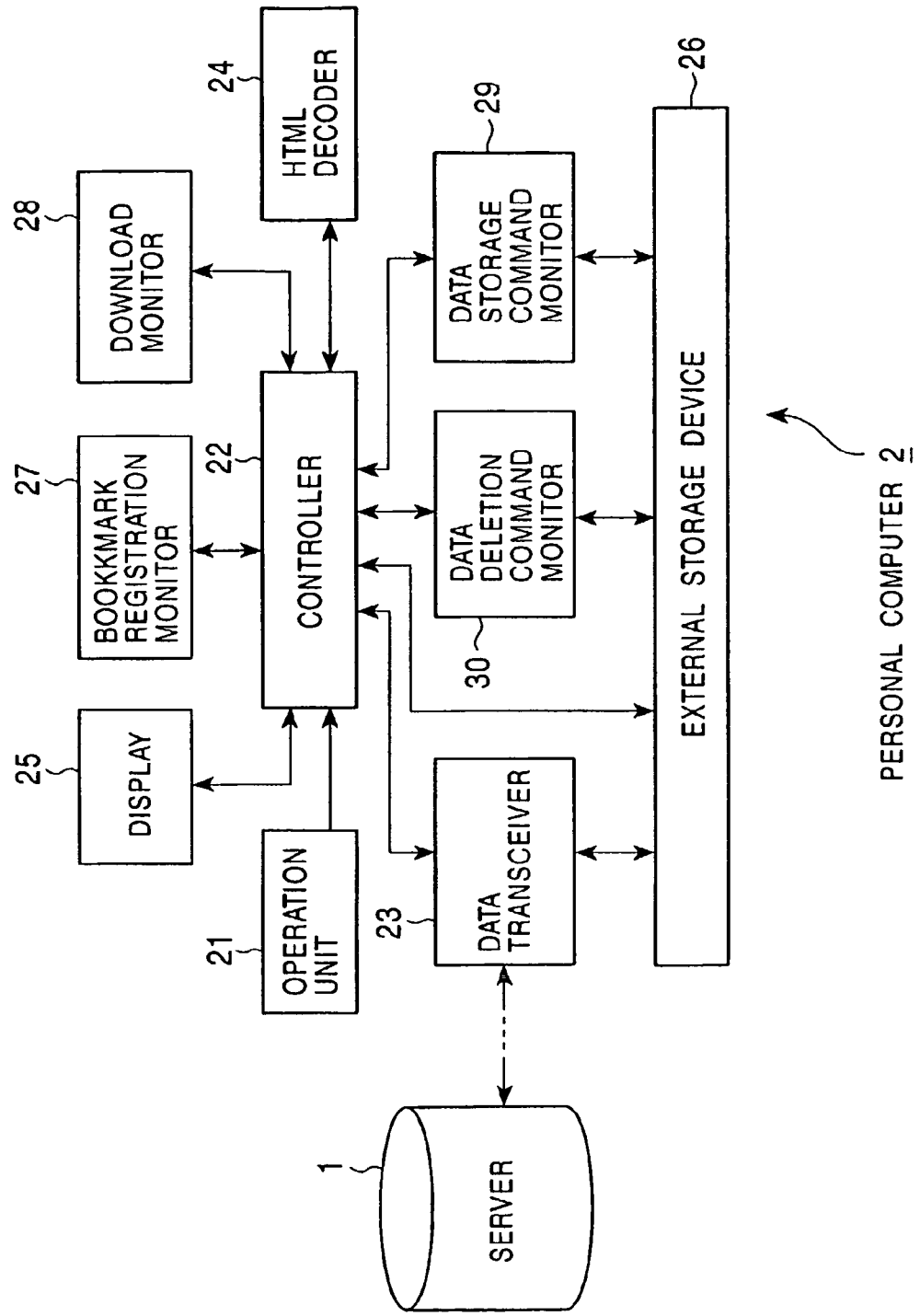
FIG. 4 diagrammatically illustrates the functional structure of a personal computer (PC) to which the present invention is applied.

Automatic Control of Digital TV Based on Information Collection on a Personal Computer:

FIG. 4 diagrammatically illustrates the functional structure of a personal computer (PC) 2 to which the present invention is applied.

As shown, the personal computer 2 includes an operation unit 21, a controller 22, a data transceiver 23, an HTML decoder 24, a display 25, an external storage device 26 such as a hard disk drive, a bookmark registration monitor 27, a download monitor 28, a data storage command monitor 29, and a data deletion command monitor 30. The personal computer 2 provides service under a program execution environment provided by the operating system when the controller 22 executes a variety of program codes. The blocks of the personal computer 2 are discussed below.

The operation unit 21 is formed of a user input device such as a keyboard or a mouse, and is used to input a command to the system 2. The display 25 is formed of a CRT (Cathode Ray Tube) display or an LCD (Liquid-Crystal Display), and is used to visually provide a feedback to the user such as calculation results in the system 2. A combination of the operation unit 21 and the display 25 forms a user interface. A GUI (Graphical User Interface) environment is generally provided, and the user inputs a command to the system by intuitively operating a mouse cursor on icons on the desk-top screen of the display 25.

When the personal computer 2 is used as an ordinary computer, the controller 22 executes an application program, and provides a diversity of adaptive job services in response to an interactive operation on a user console formed of the operation unit 21 and the display 25.

In this embodiment, the operation unit 21 is used to enter commands to store, delete, and edit data, and enter commands to perform information searching on the Internet, such as registering a bookmark, or downloading data. A command through the operation unit 21 is processed by the controller 22 under the control of the operating system.

The external storage device 26 is formed of a relatively large-capacity non-volatile memory device such as a hard disk drive (HDD). The external storage device 26 is used to store a software program executed by the controller 22, and a variety of data files.

The data storage command monitor 29 is a functional module which monitors commands relating to the data storage of a file to the external storage device 26. The data deletion command monitor 30 is a functional module which monitors a command relating to a data deletion from the external storage device 26. Optionally, a data edit monitor (not shown) may be included to monitor a file edited by the user through the user interface such as the operation unit 21 and the display 25, and the type of file edit.

The data transceiver 23 is a functional module which is used to interconnect the system 2 to an external host terminal, and may be a network interface and a communication protocol stack. For example, the personal computer 2 is connected to the server 1 through the data transceiver 23. The personal computer 2 transmits the collected user operation information to the server 1 through the data transceiver 23 while receiving the value-added information generated in the server 1 through the data transceiver 23.

The data transceiver 23 establishes a link to LAN or the Internet. The data transceiver 23 may support a communication function such as a short-range radio data link including Bluetooth, or IrDA, or IEEE 1394 bus.

The HTML decoder 24 is a functional module which decodes a document file described in an HTML (Hyper Text Markup Language) format. The location of an HTML document is described in URL format resource identification information over the TCP/IP (Transmission Control Protocol/Internet Protocol) network such as the Internet, and is transmitted in an HTTP (Hyper Text Transfer Protocol) form (as is known). The system 2 acquires the file through the data transceiver 23.

An HTML document decoded by the HTML decoder 24 is processed on a browser screen under the control of the controller 22. Specifically, in response to the decode result of the HTML document, a browser forms a so-called home page and presents it on the screen of the display 25.

Link information embedded in an anchor is called by clicking on the anchor on the home page screen presented by the browser. Information is searched for over the TCP/IP network, and information resources (files and contents) over the network are thus downloaded. The browser has the function of bookmark registering a frequently used URL.

The bookmark registration monitor 27 is a functional module which monitors a bookmark registration on the browser. The download monitor 28 is a functional module which monitors data such as a file or a content downloaded through the network. Optionally, an upload monitor (not shown) may be included to monitor the uploading of data to an external apparatus (such as a server) over the network.

The user operation information, collected by the monitors such as the bookmark registration monitor 27, the download monitor 28, the upload monitor, the data storage command monitor 29, the data deletion command monitor 30, and the data edit monitor, is transmitted to the server 1 via the data transceiver 23.

Figure 5:
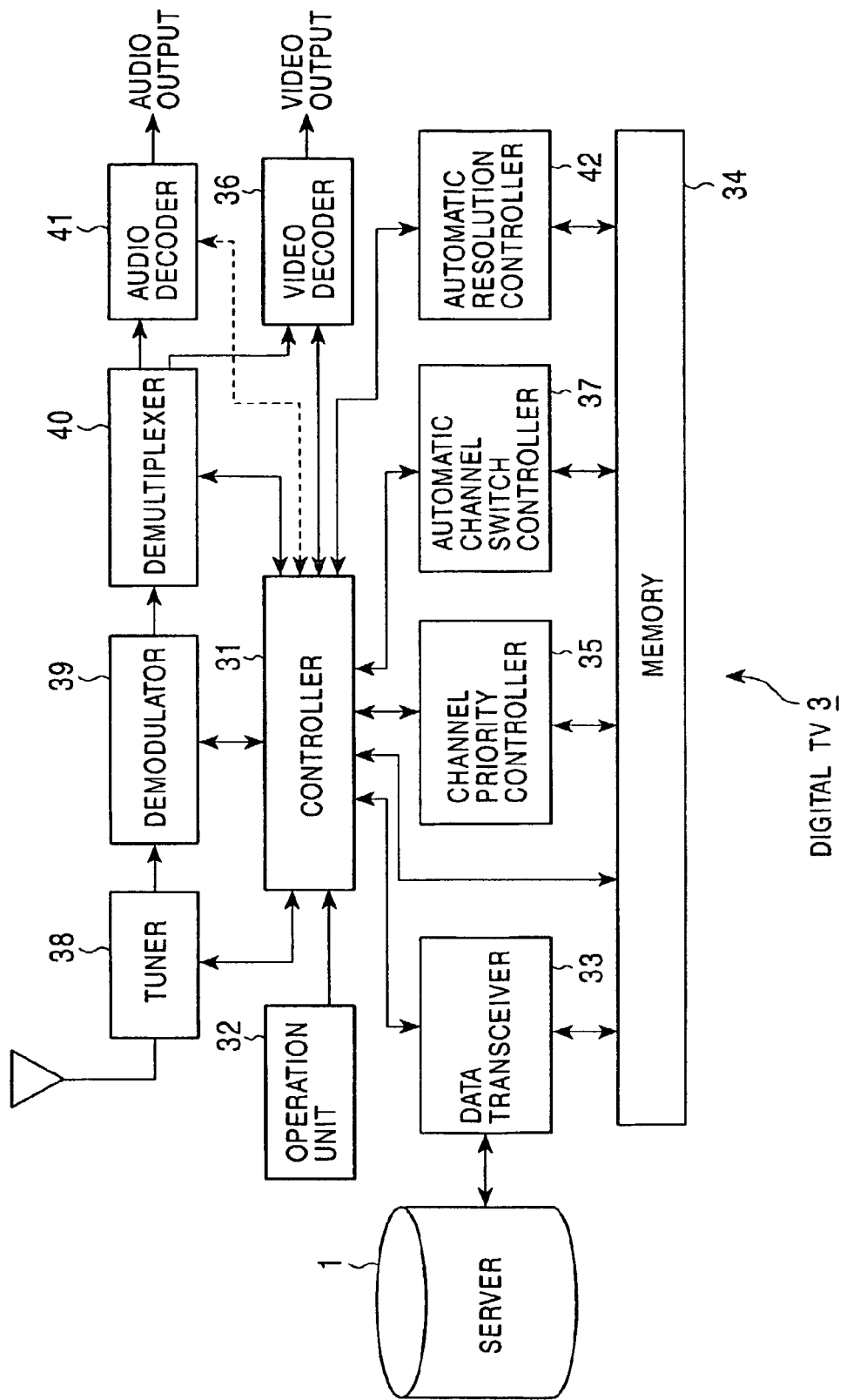
FIG. 5 diagrammatically illustrates the functional structure of a digital TV 3 to which the present invention is applied.

FIG. 5 diagrammatically illustrates the functional structure of a digital TV 3 to which the present invention is applied.

As shown, the digital TV 3 includes a controller 31, an operation unit 32, a data transceiver 33, a memory 34, a channel priority controller 35, a video decoder 36, an automatic channel switch controller 37, a tuner 38, a demodulator 39, a demultiplexer 40, an audio decoder 41, and an automatic resolution controller 42. The digital TV 3 provides services under a program execution environment provided by the operating system when the controller 31 executes a variety of program codes. The blocks of the digital TV 3 are discussed below.

When the digital TV 3 receives digital broadcast signals, the tuner 38 selects a channel as commanded by the controller 31, thereby receiving the broadcast content of the predetermined channel. The signal received by the tuner 38 is demodulated through the demodulator 9 at a subsequent stage. An MPEG (Moving Picture Experts Group) data stream is thus formed, and is then separated into a video signal and an audio signal through the demultiplexer 40. The video signal is then decoded through the video decoder 36, and is displayed as an image (not shown) on a display. The audio signal is decoded through the audio decoder 41, and is output in sound on a loudspeaker (not shown).

The operation unit 32, including a channel switch button, an audio adjusting button, and a brightness control button, is used to input commands to the digital TV 3. The input commands from the operation unit 32 are processed by the controller 31 under the control of the operating system.

The memory 34 is used to store the program codes of the operating system and other programs to be executed by the controller 31, and to temporarily store job data of the program. The value-added information received from the server 1 through the data transceiver 33 is temporarily stored in the memory 34.

The data transceiver 33 is a functional module which interconnects the system 3 to an external host terminal, and may be a combination of a network interface and a communication protocol stack. The system 3 is connected to the server 1 through the data transceiver 33. The digital TV 3 receives the value-added information generated by the server 1 through the data transceiver 33. The received data is temporarily stored in the memory 34.

As already discussed with reference to FIG. 2, the value-added information supplied to the receiver, such as a TV set or a radio set receiving broadcast data may include "channel information" formed of the ID of a channel to which the receiver is tuned, "area information" indicating a target area of video data received and replayed, and "volume information" indicating the volume of audio data received and replayed.

The receiver 3 automatically controls apparatus operation in accordance with the value-added information received from the server 1. For example, the channel priority controller 35 and the automatic channel switch controller 37 respectively determine channel priority and automatically switch channels based on the channel information received as the value-added information. The automatic resolution controller 42 performs automatic resolution setting based on the area information received as the value-added information. Furthermore, automatic volume control may be performed based on the volume information received as the value-added information.

The server 1 collects the user operation information on the personal computer 2 (see FIG. 5), thereby generating the value-added information intended for the digital TV 3. The tuning service of the digital TV 3 is thus performed taking advantage of the other media.

The automatic resolution controller 42 controls the resolution of a video decoded by the video decoder 36 with predictive coefficients for class category responsive to a plurality of resolutions. Based on an identifier of a predictive coefficient preferred by users having the same preference stored in the memory 34, the automatic resolution controller 42 automatically controls the resolution of the video output from the video decoder 36. The class category process is disclosed in U.S. Pat. No. 5,517,588 which is assigned to the assignee of this application. The specification of the patent constitutes part of this description of the present invention.

Figure 6:
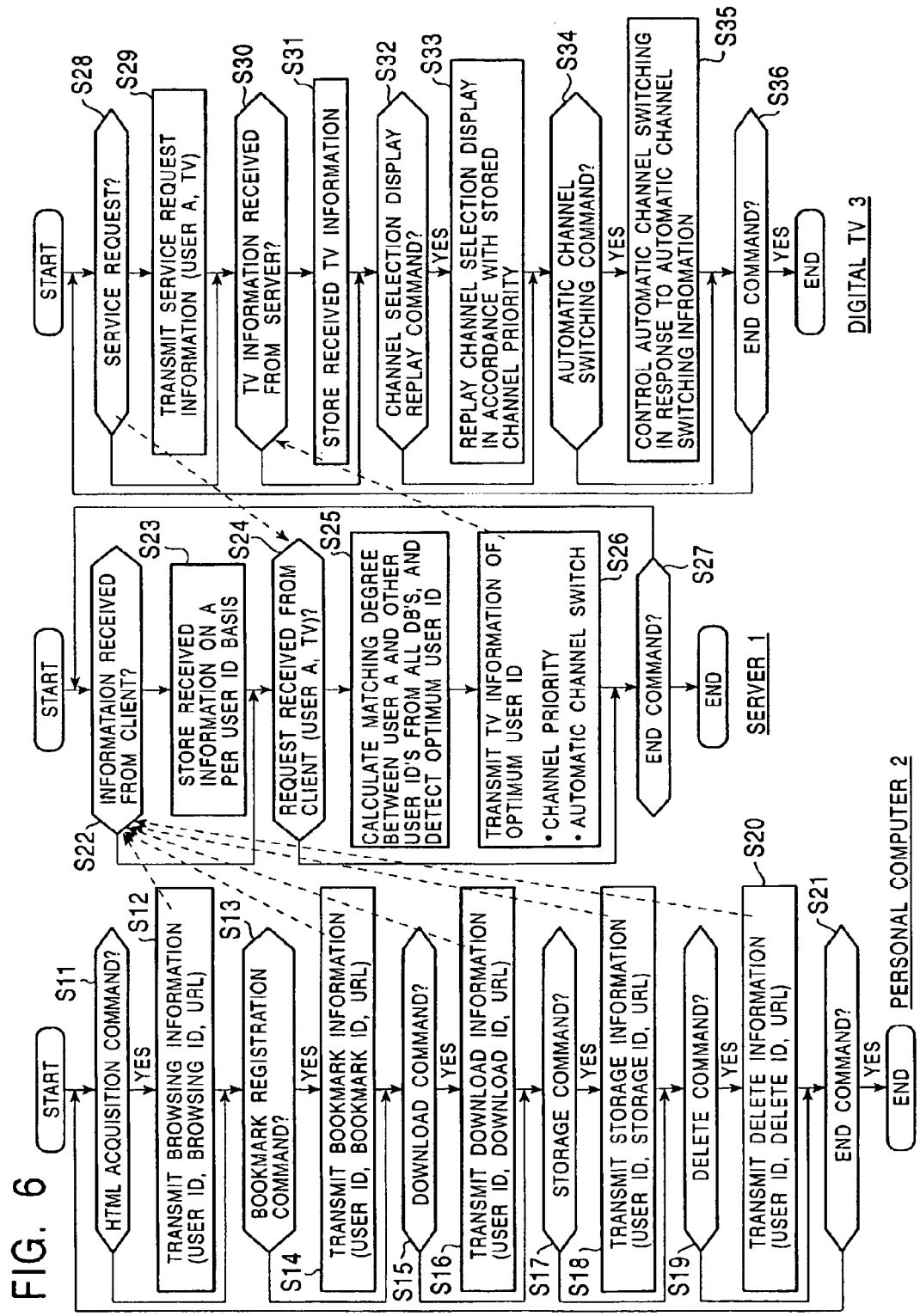
FIG. 6 is a flow diagram illustrating the process for automatically controlling the digital TV 3 based on information collected on a personal computer 2.

FIG. 6 is a flow diagram illustrating the process for automatically controlling the digital TV 3 based on the operation information and the control information collected on the personal computer 2. This process is carried out when the controllers 12, 22, and 31 of the server 1, the personal computer 2 and the digital TV 3 collaboratively execute predetermined program codes.

The automatic tuning of the digital TV 3 based on the information collected on the personal computer 2 of another user is discussed with reference to the flow diagram.

The operation of the personal computer 2 illustrated in FIG. 4 is discussed below. When the controller 22 determines in step S11 that the user operates the operation unit 21 to issue an HTML acquisition command, the algorithm proceeds to step S12. If no HTML acquisition command is input, the algorithm proceeds to step S13.

In step S12, the data transceiver 23 receives HTML data designated by the user through the server 1 connected to the Internet. The controller 22 decodes the HTML data through the HTML decoder 24 under the control thereof, and presents the HTML data on the display 25. The controller 22 transmits, to the server 1 through the data transceiver 23, a user ID registered beforehand in the external storage device 26, and the "browsing information" of the Web represented by a URL indicating the site which is searched for and monitored by the personal computer 2.

In step S13, the bookmark registration monitor 27 monitors whether the user inputs a bookmark registration command on the operation unit 21. If a bookmark registration command is input, then the algorithm proceeds to step S14, else the algorithm proceeds to step S15.

In step S14, the controller 22 transmits, to the server 1 through the data transceiver 23, the user operation information such as the user ID registered beforehand in the external storage device 26, and the "bookmark information" represented by the URL indicating the bookmark registered site.

In step S15, the download monitor 28 monitors whether the user inputs a download command on the controller 12. If a download command is input, then the algorithm proceeds to step S16, else the algorithm proceeds to step S17.

In step S16, the controller 22 transmits, to the server 1 through the data transceiver 23, the user operation information such as the user ID, and the "download information" represented by the URL indicating the storage location of the file downloaded to the personal computer 2.

Similarly, the upload monitor monitors whether the user inputs an upload command on the operation unit 21. If an upload command is input, the controller 22 may transmit, to the sever 1, the user operation information such as the user ID, the "upload information" such as the ID of a file uploaded from the personal computer 2 and the URL indicating the storage location of the uploaded file.

In step S17, the data storage command monitor 29 monitors whether the user inputs a data storage command for the information displayed as the HTML information on the operation unit 21. If the user inputs the storage command, then the algorithm proceeds to step S18, else the algorithm proceeds to step S19.

Similarly in step S18, the controller 22 transmits, to the server 1 through the data transceiver 23, the user operation information such as the user ID, the storage ID, the URL data to be stored.

In step S19, the data deletion command monitor 30 monitors whether the user inputs a delete command of data stored in the HDD 26 on the operation unit 21. If the user has input the data delete command, then the algorithm proceeds to step S20, else the algorithm proceeds to step S21.

Similarly in step S20, the controller 22 transmits, to the server 1 through the data transceiver 23, the user operation information such as the user ID, the delete ID, the URL data to be deleted, and the name of a file to be deleted.

When the user edits data on the personal computer 2, the user operation information such as "edit information" containing the ID of an edited file and the edit ID identifying the type of edit may be transmitted to the server 1 via the data transceiver 23.

In step S21, the controller 22 determines whether the user has input an end command. If no end command has been input, then the algorithm loops to step S11, else the process on the personal computer 2 ends.

The operation of the server 1 illustrated in FIG. 3 will now be discussed. In step S22, the controller 12 determines whether the data transceiver 11 receives the user operation information from the personal computer 2 (and other media). If the user operation information has been received, then the algorithm proceeds to step S23, else the algorithm proceeds to step S24.

When the user operation information in the personal computer 2 of each user is received in step S23, the controller 12 controls apparatus operation to store the user operation information in the data base 13 on a per user ID basis for data base building.

In step S24, the controller 12 determines whether service request information is received from a client through the data transceiver 11. If the service request is received, then the algorithm proceeds to step S25, else the algorithm proceeds to step S27 for an end command. Here, the client is the digital TV 3, and the user A requests TV information service as the value-added information.

In step S25, the matching degree calculator 14 calculates the matching degree of the user operation information concerning the personal computer 2 between the user A and each of the other user IDs in all data base information. The matching degree calculator 14 thus detects a user ID having the highest degree of matching. For example, data in each category is tested for matching on a text basis, and the number of fully matched words may be treated as the degree of matching. A weighting process may be performed with the degree of matching varied from full to partial matching. Hereinafter, a user having the highest degree of matching is referred to as a "similar user."

In step S26, the controller 12 searches the data base 13 and reads the TV information corresponding to the user ID of the similar user. The controller 12 also transmits the search result as the TV information to the requesting user A, namely, the digital TV 3. The TV information in this case includes the "channel information" formed of the ID of a channel to which the receiver is tuned, the "area information" indicating a target area of video data received and replayed, and the "volume information" indicating the volume of audio data received and replayed.

In step S27, the controller 12 determines whether a server manager inputs an end command. If no end command is input, then the algorithm loops to step S22, else the process on the server 1 ends.

The operation of the digital TV 3 illustrated in FIG. 5 is discussed below.

In step S28, the controller 31 determines whether the user has input a service request through the operation unit 32. If the service request has been input, then the algorithm proceeds to step S29, else the algorithm proceeds to step S30.

In step S29, the controller 31 transmits data request of the user A and the TV information to the server 1 through the data transceiver 33.

In step S30, the controller 31 determines whether the TV information as the value-added information has been received from the server 1 through the data transceiver 33. If the TV information has been received, then the algorithm proceeds to step S31, else the algorithm proceeds to step S32.

In step S31, the controller 31 controls the memory 34 to store the received TV information therewithin.

In step S32, the controller 31 determines whether the user inputs a channel selection display replay command. If the channel selection display replay command is input, then the algorithm proceeds to step S33, else the algorithm proceeds to step S34.

In step S33, the channel priority controller 35 replays a channel selection display through the video decoder 36 in accordance with a channel priority of a similar user having the same preference stored in the memory 34. Specifically, the channel selection display is automatically customized and replayed so that a channel frequently viewed by the user having the same preference is presented with priority. An automatic tuning service is thus provided.

In step S34, the controller 31 determines whether the user inputs an automatic channel switch command. If an automatic channel switch command is input, then the algorithm proceeds to step S35, else the algorithm proceeds to step S36.

In step S35, the automatic channel switch controller 37 automatically switches a channel in accordance with an automatic channel switching information stored in the memory 34. In other words, the automatic channel switch controller 37 automatically switches the channel to a channel currently viewed by the similar user. For example, this control may be performed by allowing the controller 31 to control the tuner 38 to automatically switch the channel. The output from the tuner 38 subsequent to the channel switching is demodulated through the demodulator 39, and is then separated into audio data and video data through the demultiplexer 40. The audio data is decoded and replayed by the audio decoder 41, and the video data is decoded and replayed by the video decoder 36.

The volume of the audio data, received and replayed in accordance with volume information stored in the memory 34, may be automatically adjusted.

In step S36, the controller 12 determines whether the user inputs an end command. If an end command is not input, then the algorithm loops to step S28, else the process on the digital TV 3 ends.

The process routine illustrated in FIG. 6 includes no automatic resolution control. Optionally, the automatic resolution controller 42 may perform the automatic resolution control on the digital TV 3 by determining the "area information" based on the user operation information acquired from another medium, namely, the personal computer 2. In this case, the controller 31 determines whether the user inputs an automatic resolution control command. If the automatic resolution control command is input, the automatic resolution controller 42 controls the resolution of the video decoded through the video decoder 36 in response to the predictive coefficient for class category corresponding to the plurality of resolutions. Based on an identifier of a predictive coefficient preferred by users having the same preference stored in the memory 34, the automatic resolution controller 42 automatically controls the resolution of the video output from the video decoder 36.

The class category process is disclosed in U.S. Pat. No. 5,517,588 which is already assigned to the assignee of this application. The specification of the patent constitutes part of this description of the present invention.

Automatic Control of the Digital Video Tape Recorder Based on Information Collected on the Personal Computer:

The automatic control function of a digital video tape recorder 5 is performed by the collaborative operation of the personal computer 2, the server 1, and the digital video tape recorder 5.

The server 1 and the personal computer 2 having the functions and constructions respectively illustrated in FIG. 3 and FIG. 4 are also used here, and the discussion thereof is omitted here.

Figure 7:
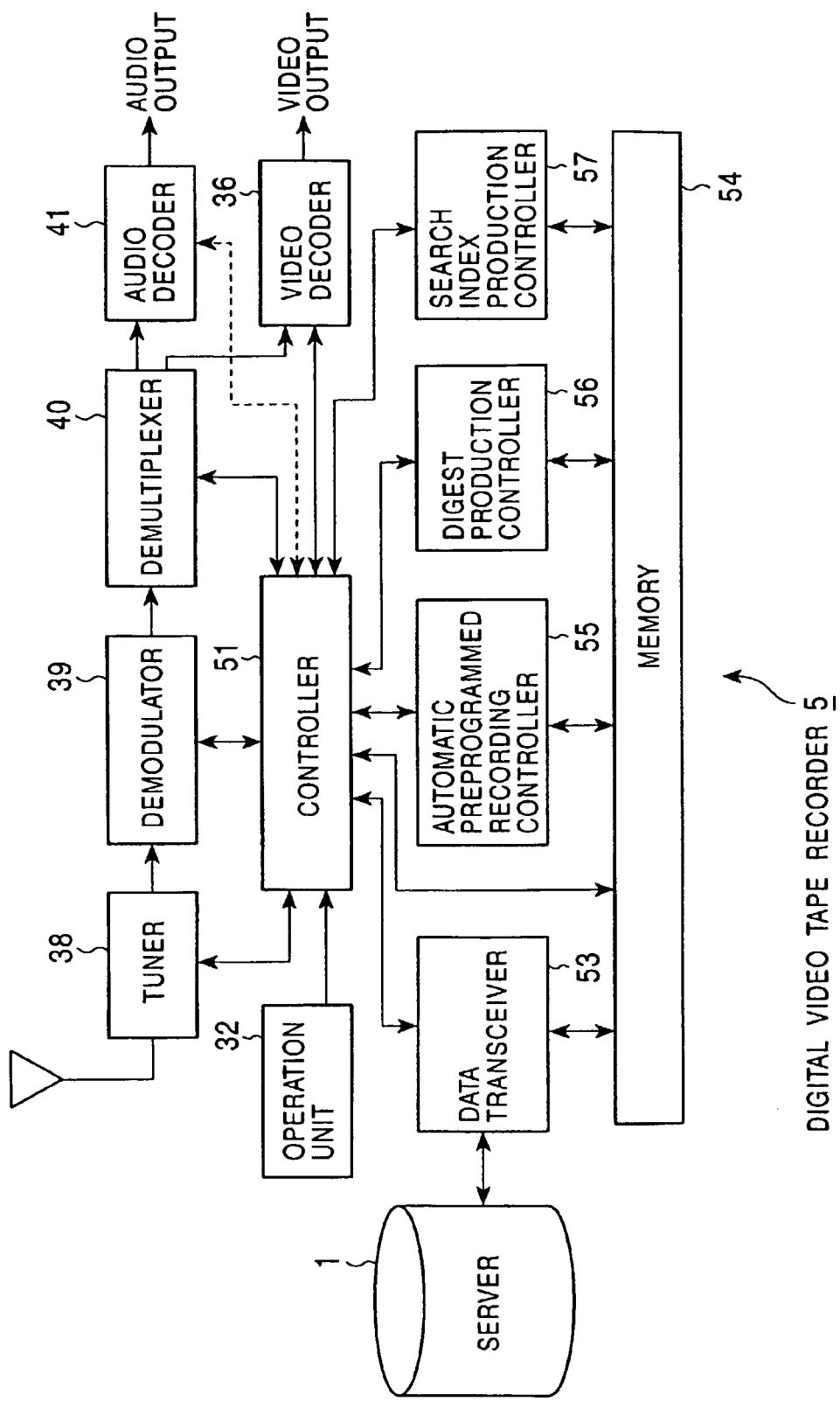
FIG. 7 is a block diagram illustrating the functional structure of a digital video tape recorder 5 to which the present invention is applied.

FIG. 7 is a block diagram illustrating the functional structure of the digital video tape recorder 5 to which the present invention is applied.

As shown, the digital video tape recorder 5 includes a controller 51, a data transceiver 53, a memory 54, an automatic preprogrammed recording controller 55, a digest production controller 56, a search index production controller 57, an operation unit 32, a video decoder 36, a tuner 38, a demodulator 39, a demultiplexer 40, an audio decoder 41, and an automatic resolution controller 42. The digital video tape recorder 5 provides video replay related services under a program execution environment provided by the operating system when the controller 51 executes a variety of program codes. The blocks of the digital video tape recorder 5 are discussed below.

When the digital video tape recorder 5 receives digital broadcast signals, the tuner 38 selects a channel as commanded by the controller 51, thereby receiving the broadcast content of the predetermined channel. The signal received by the tuner 38 is demodulated through the demodulator 9 at a subsequent stage. An MPEG data stream is thus formed, and is then separated into a video signal and an audio signal through the demultiplexer 40. The video signal is then decoded through the video decoder 36, and is displayed as an image on a display (not shown). The audio signal is decoded through the audio decoder 41, and is output in sound on a loudspeaker (not shown).

The operation unit 32, including a channel switch button, an audio adjusting button, and a brightness control button, is used to input commands to the controller 51, such as those for video recording, preprogrammed video recording, replaying of a video content, fast-forward, rewind, pause, indexing. The input commands from the operation unit 32 are processed by the controller 51 under the control of the operating system.

The memory 54 is used to store the program codes of the operating system and other programs to be executed by the controller 51, and to temporarily store job data of the program. The value-added information received from the server 1 through the data transceiver 53 is temporarily stored in the memory 34.

The data transceiver 53 is a functional module which interconnects the system 5 to an external host terminal, and may be a combination of a network interface and a communication protocol stack. The system 5 is connected to the server 1 through the data transceiver 53. The digital video tape recorder 5 receives the value-added information generated by the server 1 through the data transceiver 53. The received data is temporarily stored in the memory 54.

As already discussed with reference to FIG. 2, the value-added information supplied to the digital video tape recorder 5 and other broadcast content record reproducing devices may include "preprogrammed recording information" representing the ID and recording time of a content, "preprogrammed recording information" representing preprogrammed date and time information that is already preprogrammed in a video recording device of another user, "digest information" of a replay content produced by the other user, "search index information" produced for searching the replay content, "delete information" containing the ID of a content deleted from a recording medium in the recording device of the other user, and "title information" relating to a recorded content in the recording device of the other user.

Based on the value-added information received from the server 1, the automatic preprogrammed recording controller 55, the digest production controller 56, and the search index production controller 57 respectively automatically perform automatic preprogrammed video recording control, digest production control, and search index production control.

It should be noted that since these pieces of value-added information are generated by collecting the user operation information from the personal computer 2 (see FIG. 5), the server 1 can provide the tuning service to the digital video tape recorder 5.

Figure 8:
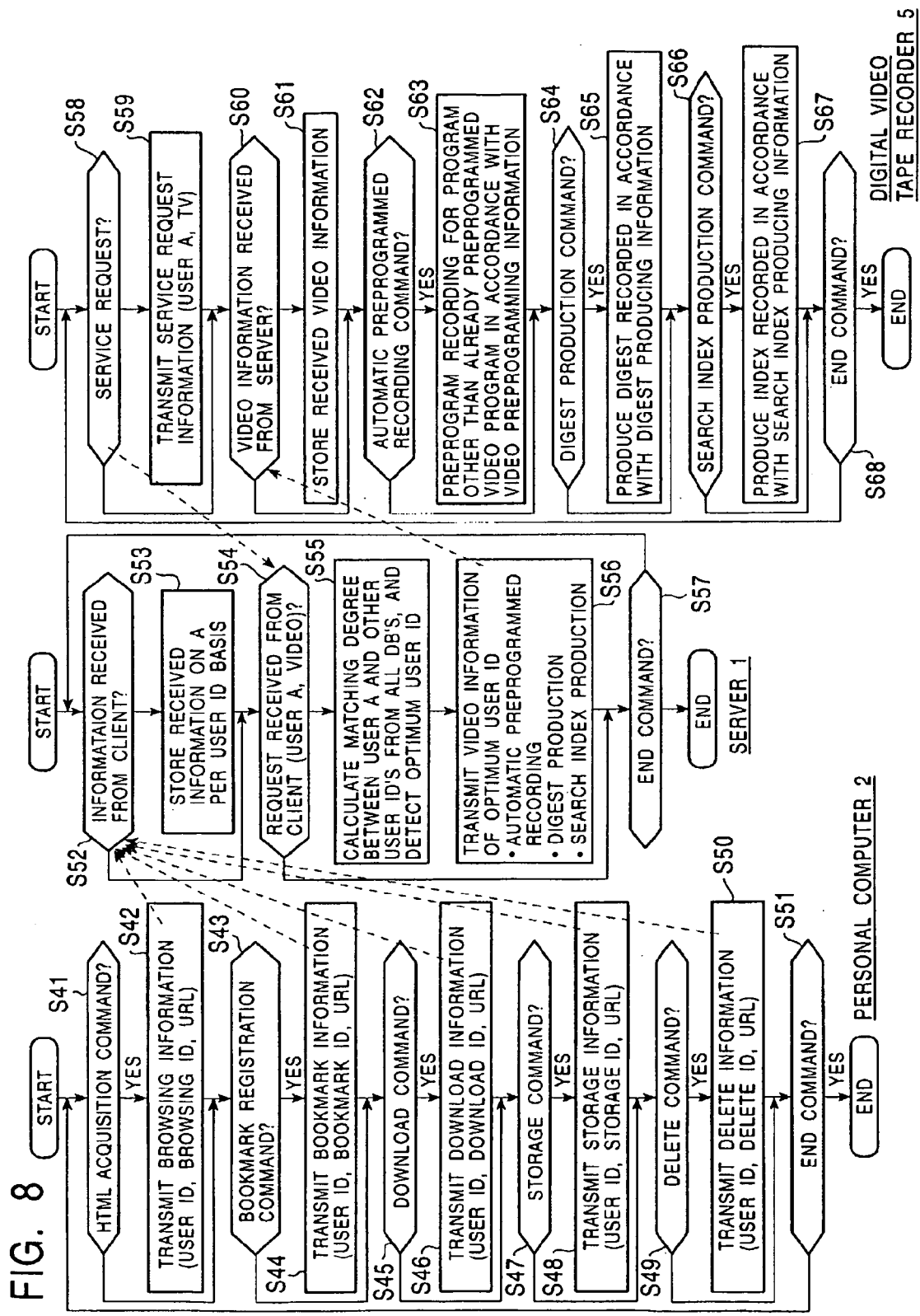
FIG. 8 is a flow diagram illustrating the process for automatically controlling the digital video tape recorder 5 based on the information accumulated on the personal computer 2.

FIG. 8 is a flow diagram illustrating the process for automatically controlling the digital video tape recorder 5 based on the information collected on the personal computer 2 of each user. The process is performed when the respective controllers 12, 22, and 51 of the server 1, the personal computer 2, and the digital video tape recorder 5 collaboratively work by executing predetermined program codes.

The automatic control of the digital video tape recorder 5 based on the user operation information collected on the personal computer 2 of each user is discussed with reference to the flow diagram.

The operation of the personal computer 2 illustrated in FIG. 4 is discussed first. If the controller 22 determines in step S41 that an HTML acquisition command is input, the algorithm proceeds to step S42, else the algorithm proceeds to step S43.

In step S42, the data transceiver 23 receives HTML data designated by the user through the server 1 connected to the Internet. The controller 22 decodes the HTML data through the HTML decoder 24 under the control thereof, and presents the HTML data on the display 25. The controller 22 transmits, to the server 1 through the data transceiver 23, the user operation information such as a user ID registered beforehand in the external storage device 26, and the "browsing information" of the Web represented by a URL indicating the site which is searched for and monitored by the personal computer 2.

In step S43, the bookmark registration monitor 27 monitors whether the user inputs a bookmark registration command. If a bookmark registration command is input, then the algorithm proceeds to step S44, else the algorithm proceeds to step S45.

In step S44, the controller 22 transmits, to the server 1 through the data transceiver 23, the user operation information such as the user ID registered beforehand in the external storage device 26, and the "bookmark information" represented by the URL indicating the bookmark registered site.

In step S45, the download monitor 28 monitors whether the user inputs a download command. If a download command is input, then the algorithm proceeds to step S46, else the algorithm proceeds to step S47.

In step S46, the controller 22 transmits, to the server 1 through the data transceiver 23, the user operation information such as the user ID, and the "download information" represented by the URL indicating the storage location of the file downloaded to the personal computer 2.

Similarly, the upload monitor monitors whether the user inputs an upload command. If an upload command is input, then the controller 22 may transmit, to the sever 1, the user operation information such as the user ID, the "upload information" such as the ID of a file uploaded from the personal computer 2 and the URL indicating the storage location of the uploaded file.

In step S47, the data storage command monitor 29 monitors whether the user inputs a data storage command for the information displayed as the HTML information on the operation unit 21. If the user inputs the storage command, then the algorithm proceeds to step S48, else the algorithm proceeds to step S49.

Similarly in step S48, the controller 22 transmits, to the server 1 through the data transceiver 23, the user operation information such as the user ID, the storage ID, and the URL data to be stored.

In step S49, the data deletion command monitor 30 monitors whether the user has input a delete command of data stored in the HDD 26 on the operation unit 21. If the user has input the data delete command, then the algorithm proceeds to step S50, else the algorithm proceeds to step S51.

In step S50, the controller 22 transmits, to the server 1 through the data transceiver 23, the user operation information such as the user ID, the delete ID, the URL data to be deleted, and the name of a file to be deleted.

When the user edits data on the personal computer 2, the user operation information such as "edit information" containing the ID of an edited file and the edit ID identifying the type of edit may be transmitted to the server 1 via the data transceiver 23.

In step S51, the controller 22 determines whether the user has input an end command. If no end command has been input, the algorithm loops to step S41, else the process on the personal computer 2 ends.

The operation of the server 1 illustrated in FIG. 3 will now be discussed. In step S52, the controller 12 determines whether the data transceiver 11 receives the user operation information from the personal computer 2 (and other media). If the user operation information has been received, then the algorithm proceeds to step S53, else the algorithm proceeds to step S54.

When the user operation information in the personal computer 2 of each user is received in step S53, the controller 12 controls apparatus operation to store the user operation information in the data base 13 on a per user ID basis for data base building.

In step S54, the controller 12 determines whether service request information is received from a client through the data transceiver 11. If the service request is received, then the algorithm proceeds to step S55, else the algorithm proceeds to step S57 for an end step. Here, the client is the digital video tape recorder 5, and the user A requests video information service as the value-added information.

In step S55, the matching degree calculator 14 calculates the matching degree of the user operation information concerning the personal computer 2 between the user A and each of the other user IDs in all data base information. The matching degree calculator 14 thus detects a user ID having the highest degree of matching. For example, data in each category is tested for matching on a text basis, and the number of fully matched words may be treated as the degree of matching. A weighting process may be performed with the degree of matching varied from full to partial matching.

In step S56, the controller 12 searches the data base 13 and reads the video information corresponding to the user ID of the similar user. The controller 12 also transmits the search result as the video information to the requesting user A, namely, the digital video tape recorder 5 through the data transceiver 11. The video information in this case includes "preprogrammed recording information" containing the ID and recording time of a content, "preprogrammed recording information" containing preprogrammed date and time information that is already preprogrammed in a video recording device of a similar user, "digest information" of a replay content produced by the similar user, "search index information" produced for searching the replay content, "delete information" containing the ID of a content deleted from a recording medium in the recording device of the other user, and "title information" relating to a recorded content produced in the recording device of the other user.

In step S57, the controller 12 determines whether a server manager inputs an end command. If no end command is input, the algorithm loops to step S52, else the process on the server 1 ends.

The operation of the digital video tape recorder 5 illustrated in FIG. 7 is discussed below. In step S58, the controller 31 determines whether the user has input a service request through the operation unit 32. If the service request has been input, then the algorithm proceeds to step S59, else the algorithm proceeds to step S60.

In step S59, the controller 51 transmits data request of the user A and the video information to the server 1 through the data transceiver 53.

In step S60, the controller 51 determines whether the video information as the value-added information has been received from the server 1 through the data transceiver 53. If the video information as the value-added information has been received, then the algorithm proceeds to step S61, else the algorithm proceeds to step S62.

In step S61, the controller 51 controls the memory 54 to store the received video information therewithin.

In step S62, the controller 51 determines whether the user inputs a preprogrammed recording command. If the preprogrammed recording command is input, then the algorithm proceeds to step S63, else the algorithm proceeds to step S64.

In step S63, the automatic preprogrammed recording controller 55 automatically stores, in the memory 54, time and program at a channel designated by the user. Furthermore, the preprogrammed video recording is automatically set based on the video information namely, the preprogrammed recording information of the similar user having the same preference stored in the memory 54. The decode process of the received information is identical to that already discussed and is omitted here.

In step S64, the controller 51 determines whether the user inputs a digest production command. If the digest production command is input, then the algorithm proceeds to step S65, else the algorithm proceeds to step S66.

In step S65, the digest production controller 56 automatically produces a digest video in accordance with the video information stored in the memory 54, namely, the digest production information of the similar user having the same preference, specifically, the content ID and time information for producing a digest, when the same content is stored in the memory 54. The digest video is then stored in a different area in the memory 54.

The digest production information of the user having the same preference is digest information that is manually produced beforehand by the user having the same preference. The digest production information is formed of the content ID, the ID of a frame or a field of a digest screen, and time information.

In step S66, the controller 51 determines whether the user inputs a search index production command. If the search index production command is input, then the algorithm proceeds to step S67, else the algorithm proceeds to an end command test.

In step S67, the search index production controller 57 automatically produces a search index in accordance with the search index production information of the similar user having the same preference stored in the memory 54, namely, the content ID and time information for producing a search index when the same content is stored in the memory 54. The search index is then stored in a different area in the memory 54.

The search index production information of the user having the same preference is search index information that is manually produced beforehand by the user having the same preference. The search index information is produced by bookmarking a characteristic frame or a characteristic field. For example, when the user searches video data for a desired screen in a random access fashion, the user possibly quickly reaches the desired screen by scrawling the bookmarks. The search index information includes the content ID, the ID of a frame or a field for a search index screen, and time information.

In step S68, the controller 12 determines whether the user inputs an end command. If the end command is not input, then the algorithm loops to step S58, else the process on the digital video tape recorder 5 ends.

Automatic Control of a Mobile Telephone Based on the Information Collection on the Personal Computer:

The automatic control function of a mobile telephone 6 is performed in the collaborative operation of the personal computer 2, the server 1 and the mobile telephone 6.

The server 1 and the personal computer 2 having the functions and constructions respectively illustrated in FIG. 3 and FIG. 4 are also used here, and the discussion thereof is omitted here.

Figure 9:
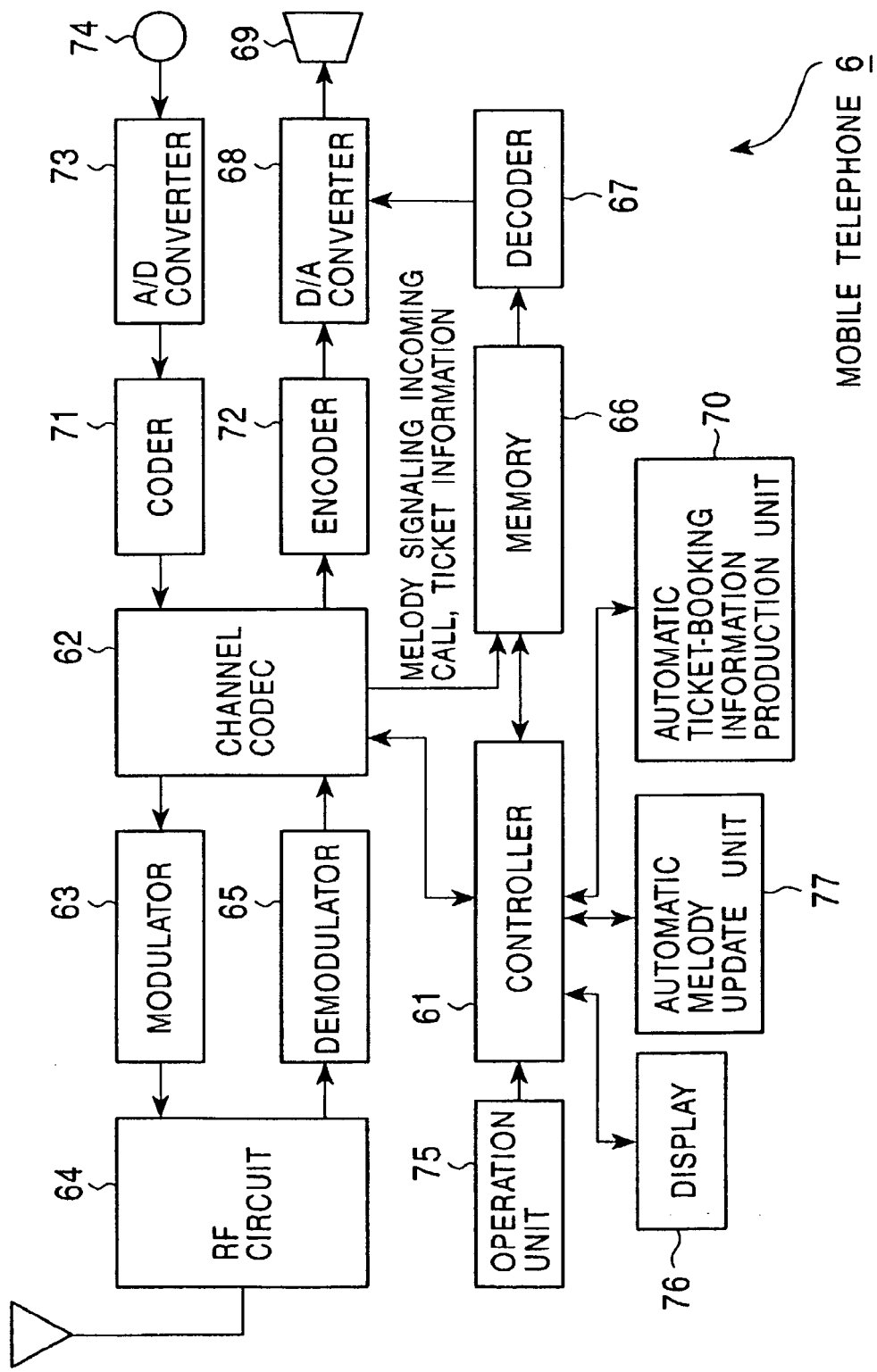
FIG. 9 is a block diagram diagrammatically illustrating the functional structure of a mobile telephone 6 to which the present invention is applied.

FIG. 9 is a block diagram diagrammatically illustrating the functional structure of the mobile telephone 6 to which the present invention is applied. As shown, the mobile telephone 6 includes a controller 61, a channel CODEC 62, a modulator 63, an RF circuit 64, a demodulator 65, a memory 66, a decoder 67, a D/A converter 68, a loudspeaker 69, an automatic ticket-booking information producing unit 70, a coder 71, a decoder 72, an A/D converter 73, a microphone 74, an operation unit 75, a display 76, and an automatic melody update unit 77. The mobile telephone 6 provides services under a program execution environment provided by the operating system when the controller 51 executes a variety of program codes. The blocks of the mobile telephone 6 are discussed below.

When the mobile telephone 6 is linked to an ordinary telephone line, the RF circuit 64 down-converts an analog transmission signal received through an antenna from a mobile-telephone base station (not shown). The demodulator 65 demodulates the analog signal in accordance with predetermined demodulation information and timing, is channel-decoded through the channel CODEC 62, is decoded through the decoder 72, and is then converted into analog audio signal through the D/A converter 68. The analog audio signal is then output in sound from the loudspeaker 69.

An audio sound input through the microphone 74 is converted into a digital signal through the A/D converter 73, is encoded through the coder 71, is channel-coded through the channel CODEC 62, and is then modulated through the modulator 63 in accordance with predetermined modulation information and timing. The modulated signal is then up-converted through the RF circuit 64 and is then transmitted through the antenna to the mobile-telephone base station (not shown).

The mobile telephone 6 of this embodiment also has the function of transmitting and receiving data processed through the controller 61 over a mobile telephone network. For example, the mobile telephone 6 may be linked to a predetermined provider or a service center through the mobile telephone network through exchange to request service such as ticket booking. Through the mobile telephone network, the mobile telephone 6 may also be linked to the server 1 (see FIG. 3) to receive the value-added information generated based on the user operation information on the other medium.

When the mobile telephone 6 transmits data, the data handled by the controller 61 is channel-coded through the channel CODEC 62, is modulated through the modulator 63 in accordance with predetermined modulation information and timing, is up-converted through the RF circuit 64, and is then output from the antenna to the mobile-telephone base station.

When the mobile telephone 6 receives data, an analog transmission signal received through the antenna from the mobile-telephone base station (not shown) is down-converted through the RF circuit 64, is demodulated through the demodulator in accordance with the demodulation information and timing, and is then channel-decoded through the channel CODEC 62. The received data is thus converted into data in a form that is processed through the controller 61.

The operation unit 75, composed of a user input device such as numeric keys and function buttons, is used to enter commands to the system 6. The display 76 is formed of an LCD (Liquid-Crystal Display), and provides a visual feedback to the user.

In this embodiment, the operation unit 75 is also used to enter telephone numbers, set a melody signaling an incoming call, and input commands for a variety of services such as ticket booking. The commands input through the operation unit 75 are processed through the controller 61 under the control of the operating system.

The memory 66 stores program codes of the operating system and other programs executed by the controller 61, and temporarily stores job data of an execution program.

The memory 66 also stores a variety of audio data for incoming calls, such as a "melody signaling an incoming call." The audio data stored in the memory 66 is signal-processed through the decoder 67, is converted into an analog audio signal through the D/A converter 68, and is then output in sound from the loudspeaker 69.

The value-added information received from the server 1 through the mobile-telephone network is temporarily stored in the memory 66. Already discussed with reference to FIG. 2, the value-added information supplied to the mobile telephone 6 includes an incoming call sound ID identifying an incoming call sound set in a communication terminal of another user, and "service use information" represented by a service ID identifying ticket-booking information transmitted to an external apparatus such as a service center from the mobile telephone of the other user through a public telephone line.

The automatic ticket-booking information producing unit 70 and the automatic melody update unit 77 respectively automatically produces ticket-booking information and updates incoming call melody in accordance with the value-added information received from the server 1.

It should be noted that since these pieces of value-added information for the mobile telephone 6 are generated by collecting the user operation information from the personal computer 2 (see FIG. 5), the server 1 can provide the tuning service to the mobile telephone 6.

Figure 10:
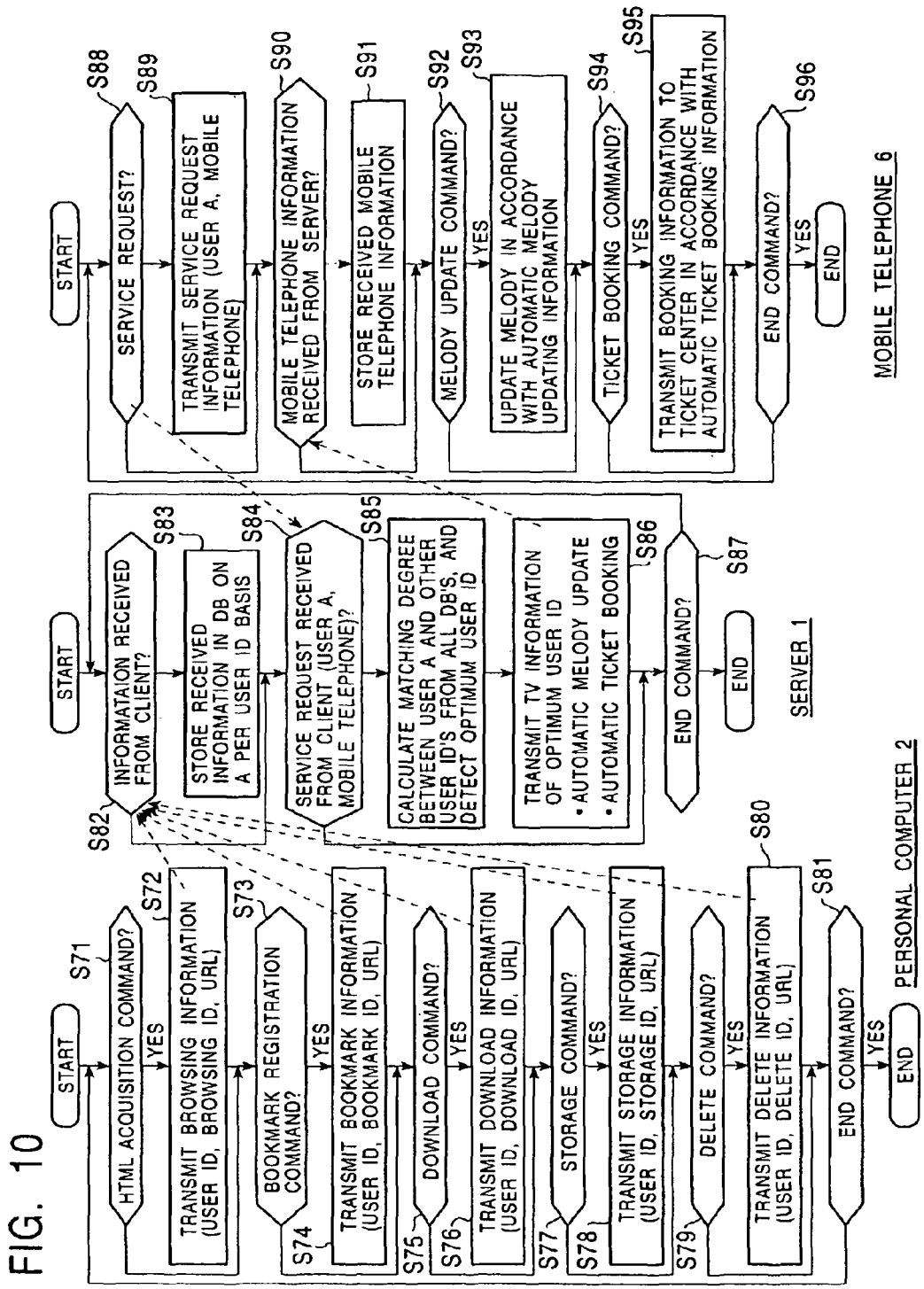
FIG. 10 is a flow diagram of a process for automatically controlling the mobile telephone 6 based on the information accumulated on the personal computer 2.

FIG. 10 is a flow diagram of a process for automatically controlling the mobile telephone 6 based on the user operation information and the control information collected on the personal computer 2. The process is performed when the respective controllers 12, 22, and 61 of the server 1, the personal computer 2, and the mobile telephone 6 collaboratively work by executing predetermined program codes.

The automatic tuning service of the mobile telephone 6 of a particular user based on the operation information of the personal computers 2 of a plurality of users is discussed below with reference to the flow diagram.

The operation of the personal computer 2 illustrated in FIG. 4 is discussed below. When the controller 22 determines in step S71 that an HTML acquisition command is input, the algorithm proceeds to step S72. If no HTML acquisition command is provided, the algorithm proceeds to step S13.

In step S72, the data transceiver 23 receives HTML data designated by the user through the server 1 connected to the Internet. The controller 22 decodes the HTML data through the HTML decoder 24 under the control thereof, and presents the HTML data on the display 25. The controller 22 transmits, to the server 1 through the data transceiver 23, the user information such as a user ID registered beforehand in the external storage device 26, and the "browsing information" of the Web represented by a URL indicating the site which is searched for and monitored by the personal computer 2.

In step S73, the bookmark registration monitor 27 monitors whether the user inputs a bookmark registration command on the operation unit 21. If a bookmark registration command is input, then the algorithm proceeds to step S14, else the algorithm proceeds to step S75.

In step S74, the controller 22 transmits, to the server 1 through the data transceiver 23, the user operation information such as the user ID registered beforehand in the external storage device 26, and the "bookmark information" represented by the URL indicating the bookmark registered site.

In step S75, the download monitor 28 monitors whether the user inputs a download command on the controller 21. If a download command is input, then the algorithm proceeds to step S76, else the algorithm proceeds to step S77.

In step S76, the controller 22 transmits, to the server 1 through the data transceiver 23, the user operation information such as the user ID, and the "download information" represented by the URL indicating the storage location of the file downloaded to the personal computer 2.

Similarly, the upload monitor monitors whether the user inputs an upload command on the operation unit 21. If an upload command is input, the controller 22 may transmit, to the sever 1, the user operation information such as the user ID, and the "upload information" such as the ID of a file uploaded from the personal computer 2 and the URL indicating the storage location of the uploaded file.

In step S77, the data storage command monitor 29 monitors whether the user inputs a data storage command for the information displayed as the HTML information on the operation unit 21. If the user inputs the storage command, then the algorithm proceeds to step S78, else the algorithm proceeds to step S79.

In step S78, the controller 22 transmits, to the server 1 through the data transceiver 23, the user operation information such as the user ID, the storage ID, the URL data to be stored.

In step S79, the data deletion command monitor 30 monitors whether the user has input a delete command of data stored in the external storage device 26 on the operation unit 21. If the user has input the data delete command, then the algorithm proceeds to step S80, else the algorithm proceeds to step S81.

In step S80, the controller 22 transmits, to the server 1 through the data transceiver 23, the user operation information such as the user ID, the delete ID, the URL data to be deleted, and the name of a file to be deleted.

When the user edits data on the personal computer 2, the user operation information such as "edit information" containing the ID of an edited file and the edit ID identifying the type of edit may be transmitted to the server 1 via the data transceiver 23.

In step S81, the controller 22 determines whether the user has input an end command. If no end command has been input, then the algorithm loops to step S11, else the process on the personal computer 2 ends.

The operation of the server 1 illustrated in FIG. 3 will now be discussed. In step S82, the controller 12 determines whether the data transceiver 11 receives the user operation information from the personal computer 2 (and other media). If the user operation information has been received, then the algorithm proceeds to step S83, else the algorithm proceeds to step S84.

When the user operation information in the personal computer 2 of each user is received in step S83, the controller 12 controls apparatus operation to store the user operation information in the data base 13 on a per user ID basis for data base building.

In step S84, the controller 12 determines whether service request information is received from a client through the data transceiver 11. If the service request is received, then the algorithm proceeds to step S85, else the algorithm proceeds to step S87 for an end step. Here, the client is the mobile telephone 6, and the user A requests mobile telephone information service as the value-added information.

In step S85, the matching degree calculator 14 calculates the matching degree of the user operation information concerning the personal computer 2 between the user A and each of the other user IDs in all data base information. The matching degree calculator 14 thus detects a user ID having the highest degree of matching. For example, data in each category is tested for matching on a text basis, and the number of fully matched words may be treated as the degree of matching. A weighting process may be performed with the degree of matching varied from full to partial matching.

In step S86, the controller 12 searches the data base 13 and reads the mobile telephone information corresponding to the user ID of the similar user. The controller 12 also transmits the search result as the mobile telephone information to the requesting user A through the data transceiver 11.

The mobile telephone information in this case includes an incoming call sound ID identifying an incoming call sound set in a communication terminal of another user, and "service use information" represented by a service ID identifying ticket-booking information transmitted to an external apparatus such as a service center from the mobile telephone of the other user through a public telephone line.

In step S87, the controller 12 determines whether a server manager inputs an end command. If no end command is input, then the algorithm loops to step S82, else the process on the server 1 ends.

The operation of the mobile telephone 6 illustrated in FIG. 9 will now be discussed. In step S88, the controller 61 determines whether a service request is received from the user through the operation unit 75. If the service request is received, then the algorithm proceeds to step S89, else the algorithm proceeds to step S90.

In step S89, the controller 61 transmits service request information about the user A and the mobile telephone information to the server 1 through the channel CODEC 62, the modulator 63, and the RF circuit 64.

In step S90, the controller 61 processes an analog transmission signal, received from an antenna, through the RF circuit 64, the demodulator 65, and the channel CODEC 62, and then determines whether the mobile telephone information is received from the server 1 as the value-added information. If the mobile telephone information is received, then the algorithm proceeds to step S91, else the algorithm proceeds to step S92.

In step S91, the controller 61 controls the memory 66 to store the received mobile telephone information therewithin.

In step S92, the controller 61 determines whether the user inputs an incoming call sound update command such as a melody signaling an incoming call. If the melody update command is input, then the algorithm proceeds to step S93, else the algorithm proceeds to step S94.

In step S93, the controller 61 outputs, to the decoder 67, the audio data identified by the incoming call sound ID as the mobile telephone information stored in the memory 66. The audio data is decoded by the decoder 67, is decompressed, if compressed, is output to the D/A converter 68, and is then output to the loudspeaker 69. The controller 61 links a program managing the stored melodies with a pointer at which the melody is stored in the memory 66 so that the incoming call sound becomes the melody of the mobile telephone 6.

In step S94, the controller 61 determines whether the user inputs a ticket-booking command. If the ticket-booking command is input, then the algorithm proceeds to step S95, else the algorithm proceeds to step S96 for an end command.

In step S95, the automatic ticket-booking information producing unit 70 automatically produces the ticket-booking information (the user ID, and a concert ID) based on the service use information as the mobile telephone information stored in the memory 66. The ticket-booking information is then radio transmitted to an unshown ticket center (namely, over the mobile-telephone network). The ticket booking may be categorized as value-added service in the real world as will be discussed later.

In step S96, the controller 12 determines whether the user inputs an end command. If no end command is input, then the algorithm loops to step S88, else the process of the mobile telephone 6 ends.

B. Second Embodiment

A second embodiment provides an automatic control service to a medium of a particular user based on trial information and activity information of a plurality of users in the real world. Specifically, a server receives and accumulates activity information from a plurality of users, while generating value-added information based on the accumulated activity information, and providing each user with the value-added information.

In the above-referenced first embodiment, the value-added information is generated based on medium operation information of the user. In contrast, the second embodiment of the present invention generates the value-added information taking advantage of the activity information of the user. The second embodiment automatically controls the media based on the degree of matching of preferences of the users in the real world, and provides services in the real world in accordance with the matching degree of the users' preferences in the media or in accordance with the activity information indicating where the user is located.

Specifically, in the second embodiment of the present invention, the work space of the value-added information based on the user information of the plurality of users is expanded from the medium to the real world.

Figure 11:
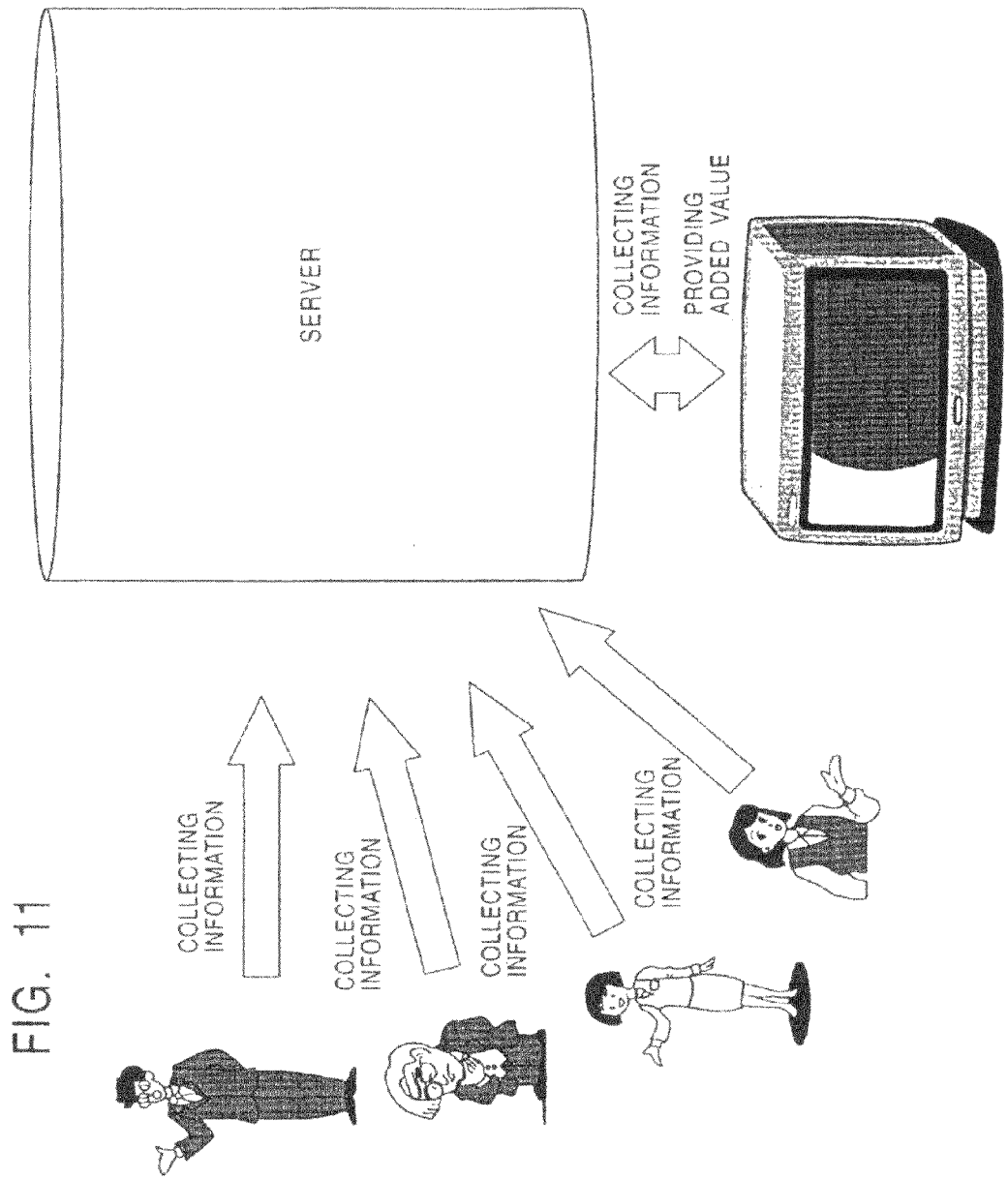
FIG. 11 diagrammatically illustrates a tuning service that uses another medium in accordance with another embodiment of the present invention.

FIG. 11 diagrammatically illustrates a value creation service making use of information in the real world in accordance with the second embodiment of the present invention.

As shown, a particular server collects the preference information of each user from each user terminal (not shown).

The server and the user terminal are connected to each other using a short-distance radio data link such as Bluetooth, IEEE 1394, home LAN, a wide-area network such as the Internet, cable television (CATV), or other communication media.

The server collects the activity information of the user accumulated on a mobile telephone with a GPS (Global Positioning System) function, and product purchase information based on the use of credit cards.

The server summarizes and processes the preference information of the users, and generates the value-added information. The value-added information here refers to information that affects the real world, such as data helping the user in activity in the real world. For example, the introduction of stores or events to which individuals have personal preference is the value-added information.

FIG. 12 lists, in a table, information collected from each medium and value-added information provided to each medium.

As already discussed with reference to FIG. 2, information collected from each user in a video deck, a DVD player, and an audio apparatus for replaying a recorded content includes "video (recording) information" containing the ID and broadcast (record) time of a program replayed by a receiver such as a television and recorded by a recording device such as a VTR, "operation information" representing the operation of the recording device during recording, "preprogrammed recording information" containing the ID of a content, the recording of which is preprogrammed on the recording device, and "operation information" for a reproducing device such as the VTR or the DVD player for replaying the content, relating to functions such as replay, fast-forward, rewind, and pause, and time set for these functions.

In a terminal linked to a network for communication for editing and processing user input data, such as a computer, a PDA (Personal Digital Assistant), and a mobile telephone, information collected from each user includes "browsing information" of a Web represented by a URL indicating a site which is searched and monitored on the terminal, "download information" containing a URL indicating the storage location of a file downloaded to the user terminal through the network from an external apparatus such as an information providing server, "upload information" containing a URL indicating the ID and the storage location of a file uploaded to an external electronic apparatus from the user terminal through the network, "bookmark information" containing an URL indicating a site which is searched, monitored and bookmark registered on the user terminal, and "edit information" containing the ID of a file edited by the user on the user terminal and an edit ID identifying the type of edit.

In a mobile terminal or a communication terminal which performs one-to-one communication such as in peer to peer link, information collected from each user includes an incoming call sound ID identifying an incoming call sound set in the communication terminal of another user, and "service use information" represented by a service ID identifying ticket-booking information transmitted to an external apparatus such as a service center from the mobile telephone of the other user through a public telephone line.

Besides the user operation information acquired from each medium as shown in FIG. 2, the present embodiment collects user information in the real world such as activity information of the user accumulated in the mobile telephone with the GPS (Global Positioning System) function, and information of products purchased by credit cards.

The user activity information may be expressed in a format of "position information+building ID." The activity information may be categorized into categories such as "stores," "parks," and "events." The "store category" may include attributes such as "meal," "apparel," "articles of taste."

The information of the product purchased by the credit card may be expressed in a format of "position information+building ID+product ID." The product purchase information may be categorized into categories such as "brand," "menu," "maker," and "vehicle."

The server collects and process the user operation information and the activity information in the real world in each medium, and then generates the value-added information based on the user preference information in accordance with the user operation.

The value-added information available to each electronic apparatus is listed in FIG. 2.

For example, the value-added information in a data receiver, such as a television set or a radio set, receiving a broadcast signal, namely, unilaterally receiving a signal, includes "channel information" formed of the ID of a channel to which the receiver is tuned, "area information" indicating a target area of video data received and replayed, and "volume information" indicating the volume of audio data received and replayed.

The value-added information available to a video deck, a DVD player, and an audio apparatus for replaying a recorded content includes "preprogrammed recording information" indicating the content ID and recording time, and "preprogrammed recording information" which includes recording date and time preprogrammed on a recorder of another user.

The value-added information supplied to a reproducing device such as a VTR or a DVD player includes "digest information" of a replay content produced by another user, "search index information" produced for searching for the replay content, "delete information" formed of the ID of a content which is deleted from a recording medium on the recorder of the other user, and "title information" relating to a recorded content produced on the recorder of the other user.

The value-added information available to a terminal, linked to a network for communication for processing user input data, such as a computer, a PDA, and a mobile terminal includes "browsing information" of a Web represented by a URL indicating a site which is searched and monitored on the terminal, "download information" represented by a URL indicating the storage location of a file downloaded to the user terminal through the network from an external apparatus such as an information providing server, "upload information" containing a URL indicating the ID and the storage location of a file uploaded to an external electronic apparatus from the user terminal through the network, "bookmark information" containing an URL indicating a site which is searched, monitored and bookmark registered on the user terminal, "category information" according to which the other user categorizes a plurality of contents produced by the other user, and "edit information" containing the ID of a file edited by the user on the user terminal and an edit ID identifying the type of edit.

The value-added information supplied to a mobile telephone or a communication terminal which performs a one-to-one communication such as in a peer-to-peer link may include an incoming call sound ID identifying an incoming call sound set in the communication terminal of another user, and "service use information" represented by a service ID identifying ticket-booking information transmitted to an external apparatus such as a service center from the mobile telephone of the other user through a public telephone line.

The value-added information affecting the real world is information that helps the user in activity in the real world. For example, the introduction of stores or events to which individuals have personal preference is the value-added information. With this type of value-added information fed back to the user, action to promote another value adapted to the location of user activity is expected.

For example, the user can get Mickey Mania information (concerning secret stores and meeting places of buffs).

Information about a place where individuals having the area of activity in common meet may be obtained. By distributing the value-added information, consumers' willingness to purchase is driven, leading to vitalization of economic activities.

Taking advantage of the preference information acquired in a given medium and ordinary user information in the real world, the server 1 in this embodiment generates the value-added information for automatically controlling the media and the value-added information affecting the user in the real world. The value-added information automatically controls the media and affects the activity of the user in the real world.

A TV can be automatically controlled in accordance with the user information accumulated in the mobile terminal with the GPS function. A TV may be automatically controlled in accordance with the user information collected by a credit use record system. A mobile telephone may be controlled in accordance with the user information accumulated in a personal computer. The user may be notified of the value-added information through a display output and an audio output on the mobile telephone. The tuning service making use of another media will be specifically discussed.

Automatic Control of the TV Based on the User Information Accumulated in the Mobile Telephone with the GPS Function:

The automatic control function of the TV may be performed by collaboratively combining the mobile telephone with the GPS function, the server, and the TV.

The server 1 and the TV 3 having the functions and constructions respectively illustrated in FIG. 3 and FIG. 5 are also used here, and the discussion thereof is omitted here.

Figure 13:
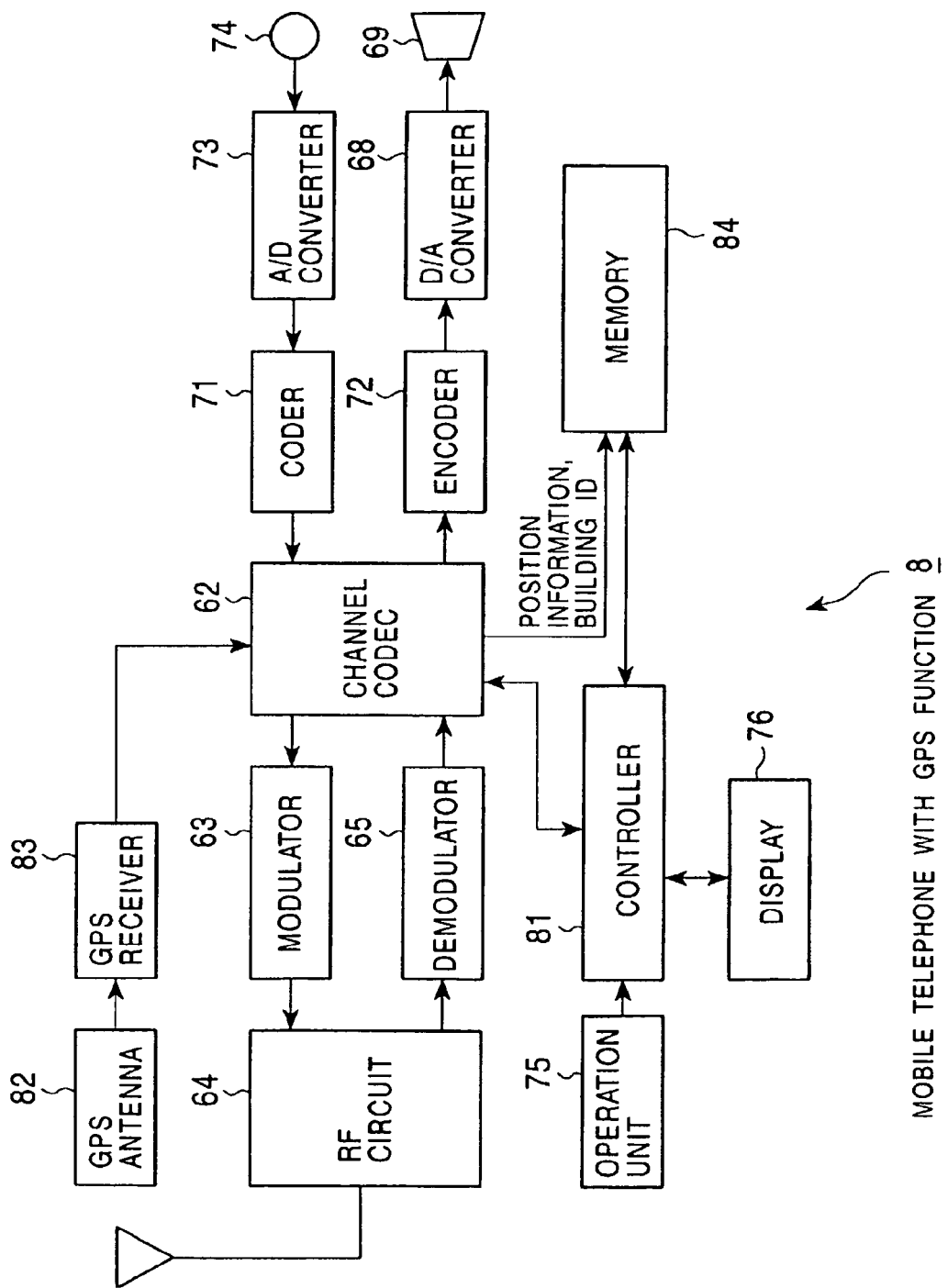
FIG. 13 diagrammatically illustrates the functional structure of a mobile telephone 8 with a GPS function to which the present invention is applied.

FIG. 13 diagrammatically illustrates the functional structure of a mobile telephone 8 with a GPS function to which the present invention is applied. As shown, the mobile telephone 8 with the GPS function includes a controller 81, a GPS antenna 82, a GPS receiver 83, a memory 84, a channel CODEC 62, a modulator 63, an RF circuit 64, a demodulator 65, a D/A converter 68, a loudspeaker 69, a coder 71, a decoder 72, an A/D converter 73, a microphone 74, an operation unit 75, and a display 76. The mobile telephone 8 with the GPS function provides mobile telephone service and other services under a program execution environment provided by the operating system when the controller 51 executes a variety of program codes. The blocks of the mobile telephone 8 with the GPS function are discussed below.

When the mobile telephone 8 with the GPS function is linked to an ordinary telephone line, the RF circuit 64 down-converts an analog transmission signal received through an antenna from a mobile-telephone base station (not shown). The demodulator 65 demodulates the analog signal in accordance with predetermined demodulation information and timing, is channel-decoded through the channel CODEC 62, is decoded through the decoder 72, and is then converted into analog audio signal through the D/A converter 68. The analog audio signal is then output in sound from the loudspeaker 69.

An audio sound input through the microphone 74 is converted into a digital signal through the A/D converter 73, is encoded through the coder 71, is channel-coded through the channel CODEC 62, and is then modulated through the modulator 63 in accordance with predetermined modulation information and timing. The modulated signal is then up-converted through the RF circuit 64 and is then transmitted through the antenna to the mobile-telephone base station.

The mobile telephone 8 with the GPS function also has the function of transmitting and receiving data processed through the controller 81 over a mobile telephone network. For example, the mobile telephone 8 with the GPS function may be linked to a predetermined provider or a service center through the mobile telephone network through exchange and to the server 1 (see FIG. 3) through the mobile telephone network to receive medium control information and value-added information in the real world.

When the mobile telephone 8 with the GPS function transmits data, the data handled by the controller 81 is channel-coded through the channel CODEC 62, is modulated through the modulator 63 in accordance with predetermined modulation information and timing, is up-converted through the RF circuit 64, and is then output from the antenna to the mobile-telephone base station.

When the mobile telephone 8 with the GPS function receives data, an analog transmission signal received through the antenna from the mobile-telephone base station (not shown) is down-converted through the RF circuit 64, is demodulated through the demodulator in accordance with the demodulation information and timing, and is then channel-decoded through the channel CODEC 62. The received data is thus converted into data in a form that is processed through the controller 81.

The mobile telephone 8 with the GPS function is equipped with a position fixing function based on the GPS, namely, the Global Positioning System. The mobile telephone 8 receives radiowaves, namely, GPS signals transmitted from at least three GPS satellites circling the earth, through the GPS antenna 82, and channel-decodes the GPS signal through the channel CODEC 62. Position information thus obtained is stored temporarily in the memory 84 together with the ID of a building where the user is currently located.

The operation unit 75, composed of a user input device such as numeric keys and function buttons, is used to enter commands to the system 8. The commands input through the operation unit 75 are processed through the controller 81 under the control of the operating system. The display 76 is formed of an LCD (Liquid-Crystal Display), and provides a visual feedback to the user.

The memory 84 stores program codes of the operating system and other programs executed by the controller 81, and temporarily stores job data of an execution program. The position information acquired through the GPS function is temporarily stored in the memory 84 together with the ID of the building in which the user is currently located.

Figure 14:
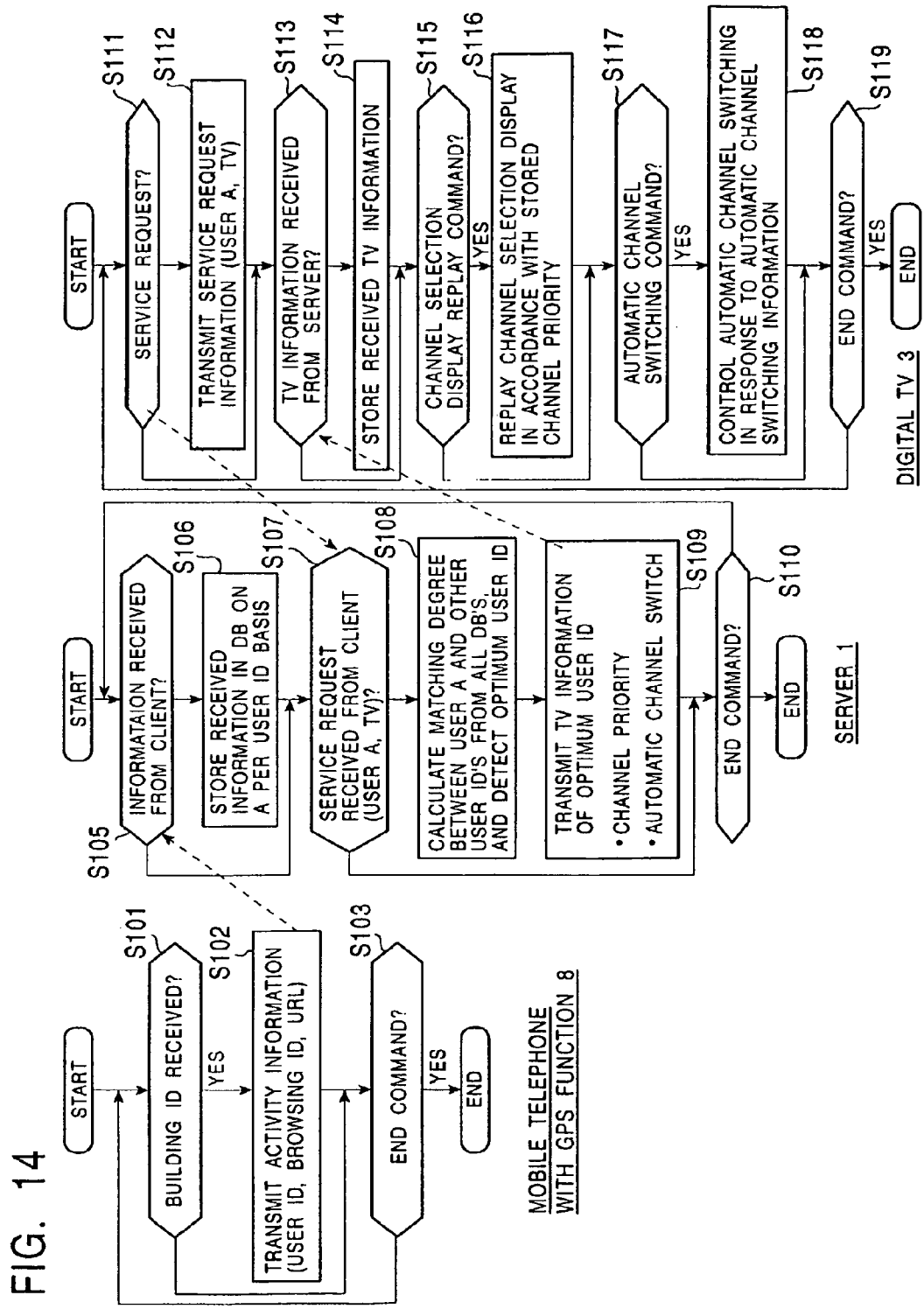
FIG. 14 is a flow diagram of a process for automatically controlling a TV 3 (see FIG. 5) based on information accumulated on the mobile telephone 8 with the GPS function.

FIG. 14 is a flow diagram of a process for automatically controlling a TV 3 (see FIG. 5) based on information collected on the mobile telephone 8 with the GPS function for each user. The process is performed when the respective controllers 12, 81, and 31 of the server 1, the mobile telephone 8 with the GPS function, and the digital TV 3 collaboratively work by executing predetermined program codes.

The automatic control of the digital TV 3 based on the information collected on the mobile telephone 8 with the GPS function for each user will now be discussed.

The operation of the mobile telephone 8 with the GPS function illustrated in FIG. 13 is discussed below. In step S101, the controller 81 determines whether the building ID is received through the antenna and the RF circuit.

A transmitter having a short-range radio data communication function such as Bluetooth or Wireless 1394 is mounted on each store to continuously transmit the building ID. When a user having the mobile telephone 8 with the GPS function enters into a service area (a cell), the building ID may be received through the RF circuit 64.

If the building ID is received in step S101, then the algorithm proceeds to step S102, else the algorithm proceeds to step S103 for an end process.

In step S102, the building ID is received. The position information is also received through the GPS antenna 82 and the GPS receiver 83. The position information and the building ID linked thereto are stored in the memory 84. The user activity information in the format of "position information+ building ID" is sent to the server 1 through the RF circuit 64.

In step S103, the controller 81 determines whether the user enters an end command. If no end command is entered, then the algorithm loops to step S101, else the process of the mobile telephone 8 ends.

The operation of the server 1 illustrated in FIG. 3 will now be discussed. In step S105, the controller 12 determines whether the data transceiver 11 receives the user activity information from the mobile telephone (and other media). If the user operation information has been received, then the algorithm proceeds to step S106, else the algorithm proceeds to step S107.

When the user operation information and the user activity information accumulated in the mobile telephone 6 of each user are received in step S106, the controller 12 controls the data base 13 to store these pieces of information therewithin on a per user ID basis for data base building.

In step S107, the controller 12 determines whether service request information is received from a client through the data transceiver 11. If the service request is received, then the algorithm proceeds to step S110, else the algorithm proceeds to step S110 for an end step. Here, the client is the digital TV 3, and the user A requests the service of TV information.

In step S108, the matching degree calculator 14 calculates the matching degree of the user operation information concerning the personal computer between the user A and each of the other user IDs in all data base information. The matching degree calculator 14 thus detects, as a similar user, a user ID having the highest degree of matching. A weighting process may be performed with the degree of matching varied from full to partial matching.

In step S109, the controller 12 searches the data base 13 and reads the TV information corresponding to the user ID of the searched user. The controller 12 also transmits the TV information as the value-added information to the terminal of the requesting user A through the data transceiver 11. The TV information in this case includes "channel information" formed of the ID of a channel to which the receiver is tuned, "area information" indicating a target area of video data received and replayed, and "volume information" indicating the volume of audio data received and replayed.

In step S110, the controller 12 determines whether a server manager inputs an end command. If no end command is input, then the algorithm loops to step S105, else the process on the server 1 ends.

The operation of the digital TV 3 illustrated in FIG. 5 is discussed below. In step S111, the controller 31 determines whether the user has input a service request through the operation unit 32. If the service request has been input, then the algorithm proceeds to step S112, else the algorithm proceeds to step S113.

In step S112, the controller 31 transmits data request of the user A and the TV information to the server 1 through the data transceiver 33.

In step S113, the controller 31 determines whether the TV information as the value-added information has been received from the server 1 through the data transceiver 33. If the TV information has been received, then the algorithm proceeds to step S114, else the algorithm proceeds to step S115.

In step S114, the controller 31 controls the memory 34 to store the received TV information therewithin.

In step S115, the controller 31 determines whether the user inputs a channel selection display replay command. If the channel selection display replay command is input, then the algorithm proceeds to step S116, else the algorithm proceeds to step S117.

In step S116, the channel priority controller 35 replays a channel selection display through the video decoder 36 in accordance with a channel priority of a similar user having the same preference stored in the memory 34. Specifically, the channel selection display is automatically customized and replayed so that a channel frequently viewed by the user having the same preference is presented with priority.

In step S117, the controller 31 determines whether the user inputs an automatic channel switch command. If an automatic channel switch command is input, then the algorithm proceeds to step S118, else the algorithm proceeds to step S119.

In step S118, the automatic channel switch controller 37 automatically switches a channel in accordance with an automatic channel switching information stored in the memory 34. In other words, the automatic channel switch controller 37 automatically switches the channel to a channel currently viewed by the similar user. For example, this control may be performed by allowing the controller 31 to control the tuner 38 to automatically switch the channel. The output from the tuner 38 subsequent to the channel switching is demodulated through the demodulator 39, and is then separated into audio data and video data through the demultiplexer 40. The audio data is decoded and replayed by the audio decoder 41, and the video data is decoded and replayed by the video decoder 36.

The volume of the audio data, received and replayed in accordance with volume information stored in the memory 34, may be automatically adjusted.

In step S119, the controller 12 determines whether the user inputs an end command. If an end command is not input, then the algorithm loops to step S111, else the process on the digital TV 3 ends.

The process routine illustrated in FIG. 14 includes no automatic resolution control of the digital TV 3. Optionally, the automatic resolution controller 42 may perform the automatic resolution control on the digital TV 3 by determining the "area information" based on the user activity information such as the position information and the building ID acquired from another medium, namely, the mobile telephone 8. In this case, the controller 31 determines whether the user inputs an automatic resolution control command. If the automatic resolution control command is input, the automatic resolution controller 42 controls the resolution of the video decoded through the video decoder 36 in response to the predictive coefficients for class category corresponding to the plurality of resolutions. Based on an identifier of a predictive coefficient preferred by users having the same preference stored in the memory 34, the automatic resolution controller 42 automatically controls the resolution of the video output from the video decoder 36.

The class category process is disclosed in U.S. Pat. No. 5,517,588 which is already assigned to the assignee of this application. The specification of the patent constitutes part of this description of the present invention.

Automatic Control of the TV Based on the User Information Collected through the Credit Use Record System:

The automatic control function of the TV may be performed by collaboratively combining a credit use record system, a server, and a TV.

The server 1 and the TV 3 having the functions and constructions respectively illustrated in FIG. 3 and FIG. 5 are also used here, and the discussion thereof is omitted here.

Figure 15:
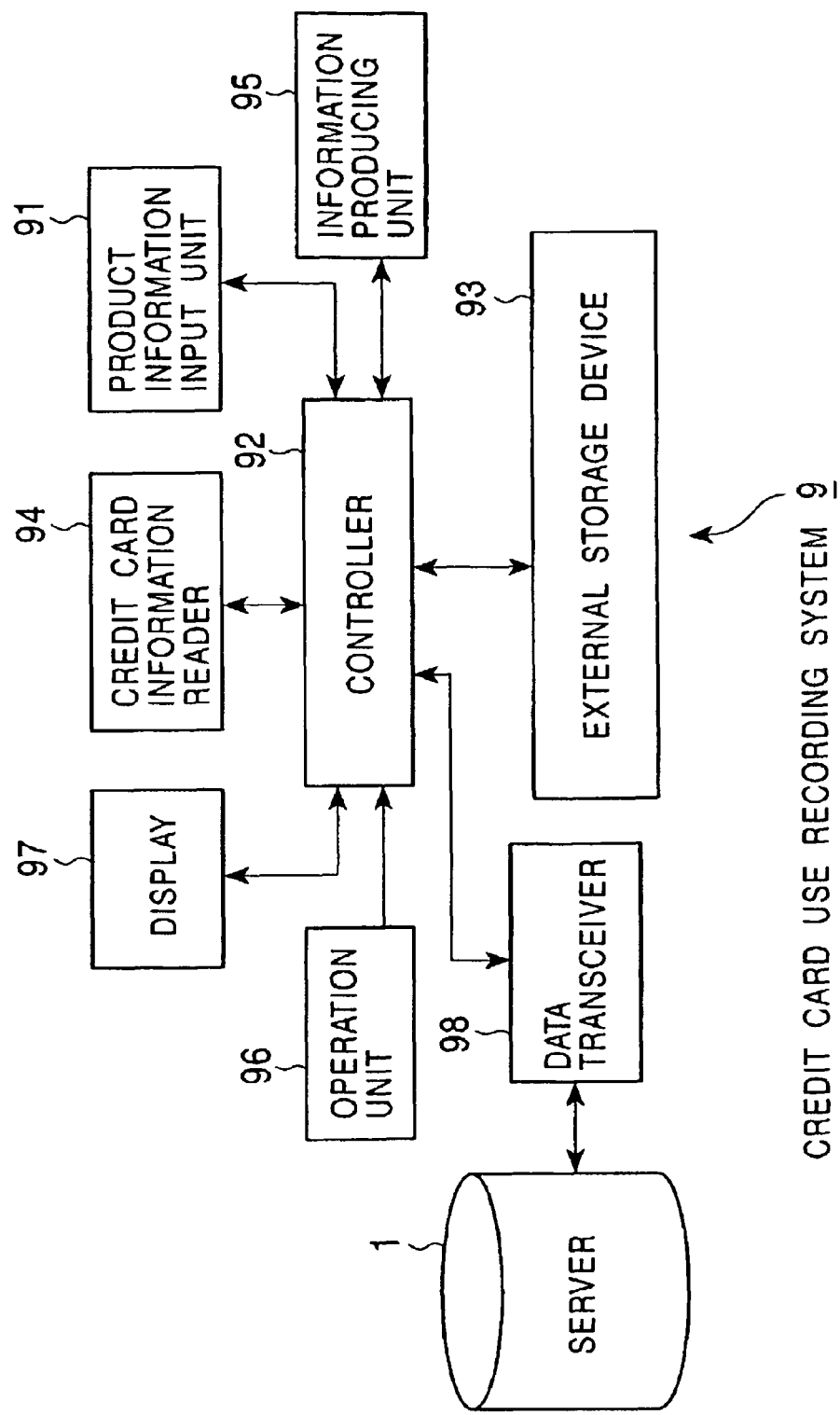
FIG. 15 diagrammatically illustrates the functional structure of a credit use record system 9 in which the present invention is applied.

FIG. 15 diagrammatically illustrates the functional structure of a credit use record system 9 in which the present invention is applied. The credit use record system 9 described here is integrated with a card reader that receives payment by a credit card, and is installed in each store.

As shown, the credit use record system 9 includes a product information input unit 91, a controller 92, an external storage device 93, a credit card information reader 94, an information producing unit 95, an operation unit 96, a display 97, and a data transceiver 98. The credit use record system 9 provides services under a program execution environment provided by the operating system when the controller 92 executes a variety of program codes. The blocks of the credit use record system 9 are discussed below.

When the credit use record system 9 is used for payment by a credit card, the credit card information reader 94 reads information magnetically recorded on the credit card. The product information input unit 91 including a bar-code reader reads and analyzes a medium such as a bar code associated with goods or service, thereby identifying the product information. Credit card information and the product information read are transferred to the controller 92. The controller 92 under the control of the operating system processes the credit card information and the product information, stores the process results in the external storage device 93, sends the process results to an external system, or performs a billing process.

The information producing unit 95 produces user activity information each time the credit card is used on the credit use record system 9. The user activity information is formed of a data combination of the ID of a holder of the credit card, the position information of the credit use record system 9, the ID of the building in which the credit use record system 9 is installed, and the product ID input through the credit use record system 9.

The operation unit 96, composed of a user input device such as numeric keys and function buttons, is used to enter commands to the system 2. The display 97 is formed of an LCD (Liquid-Crystal Display), and provides a visual feedback relating to process results in the system 9 to the user.

The external storage device 93 is formed of a relatively large-capacity non-volatile memory device such as a hard disk drive (HDD). The external storage device 93 is used to store a software program executed by the controller 22, and a variety of data files.

The credit card information and product information of the purchased product are managed in a data base in the external storage device 93. The external storage device 93 also stores, in a non-volatile fashion, the information of a location at which the credit use record system 9 is installed, the building ID, the product ID, etc. The external storage device 93 temporarily stores the user ID of the card holder read from the card, and the user information that is produced during the use of the credit card.

The data transceiver 98 is a functional module which interconnects the credit use record system 9 to an external host apparatus, and is a combination of a network interface and a communication protocol stack. For example, the credit use record system 9 is connected to the server 1 through the data transceiver 98. The credit use record system 9 transfers the user activity information, generated by the information producing unit 95, to the server 1 through the data transceiver 98. Furthermore, the credit use record system 9 is interconnected, through the data transceiver 98, to a credit institution (not shown) which generally manages credit on the basis of credit cards, and sends settlement information thereto each time.

Figure 16:
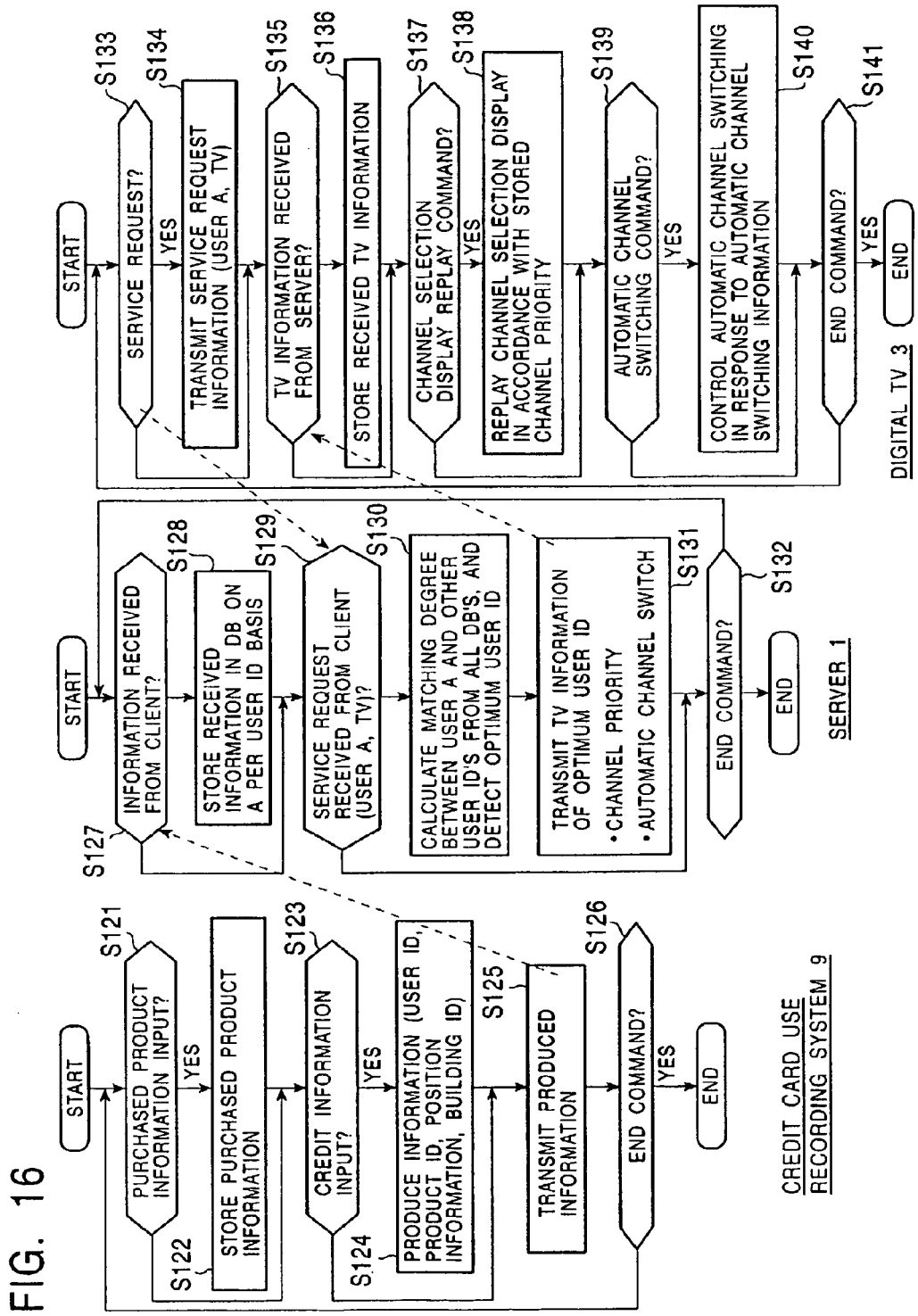
FIG. 16 is a flow diagram of a process for automatically controlling the TV 3 (see FIG. 5) based on information accumulated on the credit use record system 9.

FIG. 16 is a flow diagram of a process for automatically controlling the TV 3 (see FIG. 5) based on the user activity information collected on the credit use record system 9. The process is performed when the respective controllers 12, 92, and 31 of the server 1, the credit use record system 9, and the digital TV 3 collaboratively work by executing predetermined program codes.

The automatic control of the digital TV 3 based on the user activity information accumulated in the credit use record system 9 will be now discussed with reference to the flow diagram.

In step S121, the controller 92 determines whether the product information input unit 91 receives any input, such as a bar code input. If the product information input unit 91 receives any input, then the algorithm proceeds to step S122, else the algorithm proceeds to step S123.

In step S122, the controller 92 stores the input purchased product information in the external storage device 93.

In step S123, the controller 92 determines whether the credit card information reader 94 provides any read output. If the credit card information reader 94 provides any read output, then the algorithm proceeds to step S124, else the algorithm proceeds to an end process.

In step S124, the information producing unit 95 produces the user activity information formed of the user ID identified from the credit card information, the product ID identified from the output from the product information input unit 91, and the position information and the building ID registered beforehand in the external storage device 93. In step S125, the produced user activity information is transmitted to the server 1.

In step S126, the controller 92 determines whether the user enters an end command. If no enter command is entered, then the algorithm loops to step S121, else the process of the credit use record system 9 ends.

The operation of the server 1 illustrated in FIG. 3 will now be discussed. In step S127, the controller 12 determines whether the data transceiver 11 receives the user activity information from the credit use record system 9 (and other media). If the user activity information has been received, then the algorithm proceeds to step S128, else the algorithm proceeds to step S129.

When the user activity information accumulated in the credit use record system 9 of each user is received in step S128, the controller 12 controls the data base 13 to store these pieces of information therewithin on a per user ID basis for data base building.

In step S129, the controller 12 determines whether service request information is received from a client through the data transceiver 11. If the service request is received, then the algorithm proceeds to step S130, else the algorithm proceeds to step S132 for an end step. Here, the client is the digital TV 3, and the user A requests the service of TV information.

In step S130, the matching degree calculator 14 calculates the matching degree of the user activity information concerning the personal computer between the user A and each of the other user IDs in all data base information. The matching degree calculator 14 thus detects, as a similar user, a user ID having the highest degree of matching. For example, data in each category is tested for matching on a text basis, and the number of fully matched words may be treated as the degree of matching. A weighting process may be performed with the degree of matching varied from full to partial matching.

In step S131, the controller 12 searches the data base 13 and reads the TV information corresponding to the user ID of the searched user. The controller 12 also transmits the TV information as the value-added information to the terminal of the requesting user A through the data transceiver 11. The TV information in this case includes "channel information" formed of the ID of a channel to which the receiver is tuned, "area information" indicating a target area of video data received and replayed, and "volume information" indicating the volume of audio data received and replayed.

In step S132, the controller 12 determines whether a server manager inputs an end command. If no end command is input, then the algorithm loops to step S127, else the process on the server 1 ends.

The operation of the digital TV 3 illustrated in FIG. 5 is discussed below. In step S133, the controller 31 determines whether the user has input a service request through the operation unit 32. If the service request has been input, then the algorithm proceeds to step S134, else the algorithm proceeds to step S135.

In step S134, the controller 31 transmits data request of the user A and the TV information to the server 1 through the data transceiver 33.

In step S135, the controller 31 determines whether the TV information as the value-added information has been received from the server 1 through the data transceiver 33. If the TV information has been received, then the algorithm proceeds to step S136, else the algorithm proceeds to step S137.

In step S136, the controller 31 controls the memory 34 to store the received TV information therewithin.

In step S137, the controller 31 determines whether the user inputs a channel selection display replay command. If the channel selection display replay command is input, then the algorithm proceeds to step S138, else the algorithm proceeds to step S139.

In step S138, the channel priority controller 35 replays a channel selection display through the video decoder 36 in accordance with a channel priority of a similar user having the same preference stored in the memory 34. Specifically, the channel selection display is automatically customized and replayed so that a channel frequently viewed by the user having the same preference is presented with priority.

In step S139, the controller 31 determines whether the user inputs an automatic channel switch command. If an automatic channel switch command is input, then the algorithm proceeds to step S140, else the algorithm proceeds to step S141.

In step S140, the automatic channel switch controller 37 automatically switches a channel in accordance with an automatic channel switching information stored in the memory 34. In other words, the automatic channel switch controller 37 automatically switches the channel to a channel currently viewed by the similar user. For example, this control may be performed by allowing the controller 31 to control the tuner 38 to automatically switch the channel. The output from the tuner 38 subsequent to the channel switching is demodulated through the demodulator 39, and is then separated into audio data and video data through the demultiplexer 40. The audio data is decoded and replayed by the audio decoder 41, and the video data is decoded and replayed by the video decoder 36.

In step S141, the controller 12 determines whether the user inputs an end command. If an end command is not input, then the algorithm loops to step S133, else the process on the digital TV 3 ends.

The process routine illustrated in FIG. 16 includes no automatic resolution control of the digital TV 3. Optionally, the automatic resolution controller 42 may perform the automatic resolution control on the digital TV 3 by determining the "area information" based on the user activity information such as the product ID, the position information and the building ID acquired from another medium, namely, the credit use record system 9. In this case, the controller 31 determines whether the user inputs an automatic resolution control command. If the automatic resolution control command is input, the automatic resolution controller 42 controls the resolution of the video decoded through the video decoder 36 in response to the predictive coefficient for class category corresponding to the plurality of resolutions. Based on an identifier of a predictive coefficient preferred by users having the same preference stored in the memory 34, the automatic resolution controller 42 automatically controls the resolution of the video output from the video decoder 36.

The class category process is disclosed in U.S. Pat. No. 5,517,588 which is already assigned to the assignee of this application. The specification of the patent constitutes part of this description of the present invention.

In the calculation of the matching degree of the user activity information in this embodiment, the server 1 treats a user having coincidence in the product purchased, the position information of the store, and the name of the store as a similar user having the same preference. The automatic tuning service of the TV is performed based on apparatus operation information of the similar user.

C. Third Embodiment

In the above-referenced second embodiment, the automatic control of a medium of a particular user is performed based on the trial information and the activity information of the plurality of users in the real world. In contrast, a third embodiment of the present invention provides activity information affecting the activity of a user in the real world based on the value-added information resulting from the operation information and the control information of the media of the plurality of users.

The present embodiment provides the value-added information affecting the real world, such as giving a notice on a mobile telephone 7, based on user operation information accumulated on the personal computer 2. The information service function for the value-added information affecting the real world is performed when the personal computer 2, the server 1, and the mobile telephone 7 work collaboratively.

The server 1 and the personal computer 2 having the functions and constructions respectively illustrated in FIG. 3 and FIG. 4 are also used here, and the discussion thereof is omitted here.

Figure 17:
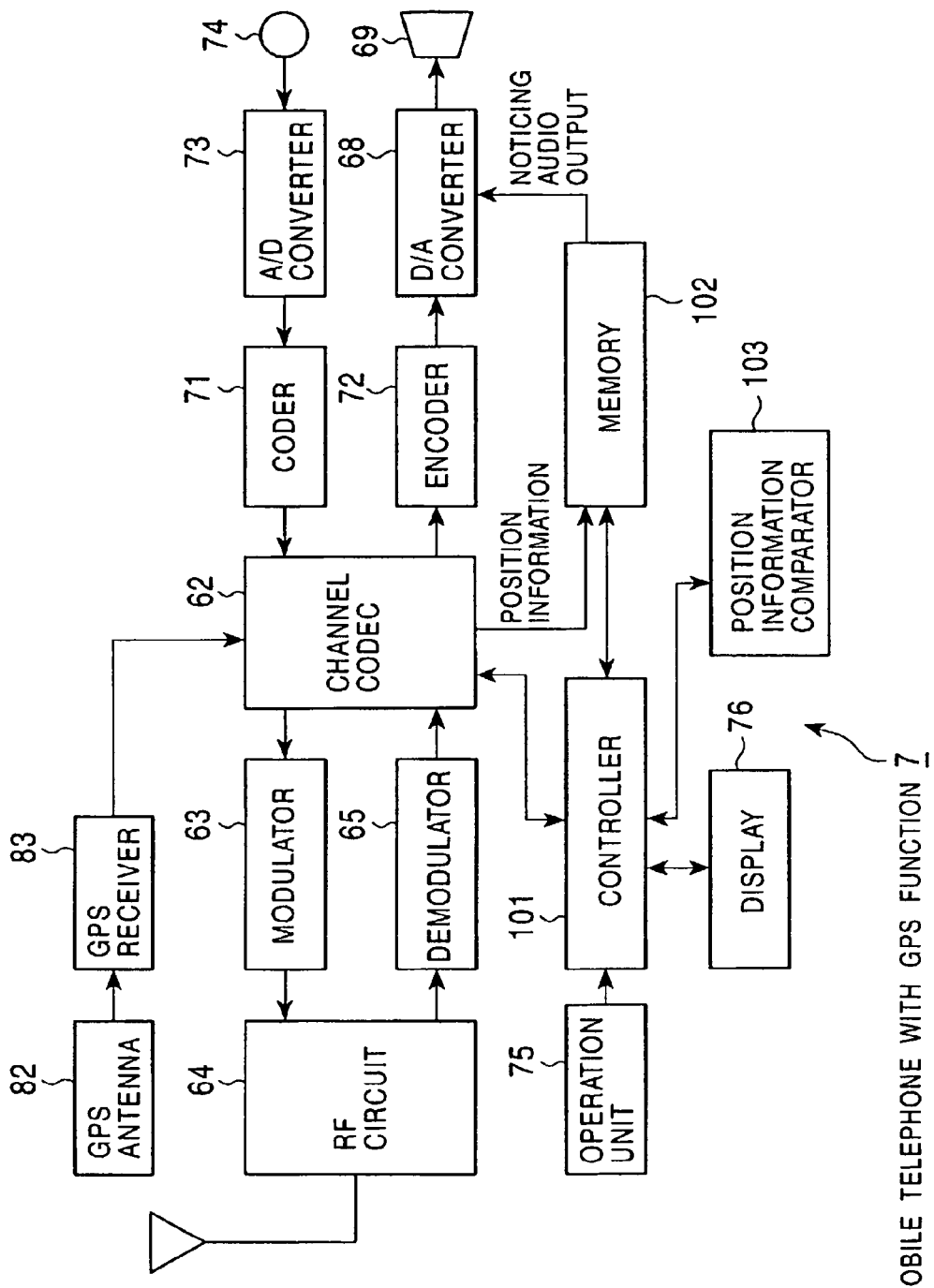
FIG. 17 diagrammatically illustrates the functional structure of a mobile telephone 7 with a GPS function in which the present invention is applied.

FIG. 17 diagrammatically illustrates the functional structure of a mobile telephone 7 with a GPS function in which the present invention is applied. As shown, the mobile telephone 7 with the GPS function includes a controller 101, a memory 102, a position information comparator 103, a channel CODEC 62, a modulator 63, an RF circuit 64, a demodulator 65, a D/A converter 68, a loudspeaker 69, a coder 71, a decoder 72, an A/D converter 73, a microphone 74, an operation unit 75, a display 76, a GPS antenna 82, and a GPS receiver 83. The mobile telephone 7 with the GPS function provides services affecting the real world under a program execution environment provided by the operating system when the controller 101 executes a variety of program codes. The blocks of the mobile telephone 7 are discussed below.

When the mobile telephone 7 with the GPS function is linked to an ordinary telephone line, the RF circuit 64 down-converts an analog transmission signal received through an antenna from a mobile-telephone base station (not shown). The demodulator 65 demodulates the analog signal in accordance with predetermined demodulation information and timing, is channel-decoded through the channel CODEC 62, is decoded through the decoder 72, and is then converted into analog audio signal through the D/A converter 68. The analog audio signal is then output in sound from the loudspeaker 69.

An audio sound input through the microphone 74 is converted into a digital signal through the A/D converter 73, is encoded through the coder 71, is channel-coded through the channel CODEC 62, and is then modulated through the modulator 63 in accordance with predetermined modulation information and timing. The modulated signal is then up-converted through the RF circuit 64 and is then transmitted through the antenna to the mobile-telephone base station (not shown).

The mobile telephone 7 with the GPS function also has the function of transmitting and receiving data processed through the controller 101 over a mobile telephone network. For example, the mobile telephone 7 with the GPS function may be linked to a predetermined provider or a service center through the mobile telephone network through exchange and to the server 1 (see FIG. 3) through the mobile telephone network to receive medium control information and value-added information in the real world.

When the mobile telephone 7 with the GPS function transmits data, the data handled by the controller 101 is channel-coded through the channel CODEC 62, is modulated through the modulator 63 in accordance with predetermined modulation information and timing, is up-converted through the RF circuit 64, and is then output from the antenna to the mobile-telephone base station (not shown).

When the mobile telephone 7 with the GPS function receives data, an analog transmission signal received through the antenna from the mobile-telephone base station (not shown) is down-converted through the RF circuit 64, is demodulated through the demodulator in accordance with the demodulation information and timing, and is then channel-decoded through the channel CODEC 62. The received data is thus converted into data in a form that is processed through the controller 101.

The mobile telephone 7 with the GPS function receives the value-added information affecting the real world from the server 1 using the data receiving function thereof. One example of the value-added information is user activity information. The user activity information is a combination of the position information and the building ID. The user activity information is formed of data that determines the activity of the user in the real world, and has the effect of driving the user's willingness to act. The user activity information received is temporarily stored in the memory 102.

The mobile telephone 7 with the GPS function is equipped with a position fixing function based on the GPS, namely, the Global Positioning System. The mobile telephone 7 receives radiowaves, namely, GPS signals transmitted from at least three GPS satellites circling the earth, through the GPS antenna 82, and channel-decodes the GPS signal through the channel CODEC 62. Position information thus obtained is stored temporarily in the memory 102 together with the ID of a building where the user is currently located.

The operation unit 75, composed of a user input device such as numeric keys and function buttons, is used to enter commands to the system 7. The commands input through the operation unit 75 are processed through the controller 101 under the control of the operating system. The display 76 is formed of an LCD (Liquid-Crystal Display), and provides a visual feedback to the user.

The memory 102 stores program codes of the operating system and other programs executed by the controller 61, and temporarily stores job data of an execution program. The value-added information received from the server 1 and the position information acquired through the GPS function are temporarily stored in the memory 102.

The position information comparator 103 is a functional module which compares the position information received as the value-added information and the position information acquired by the GPS function. Based on the position information comparison results, the controller 101 generates audio data for notice. The audio data is temporarily stored in the memory 102, converted into an analog signal through the D/A converter 68, and then output in sound from the loudspeaker 69. A notice audio output draws attention of the user, thereby affecting the real world.

FIG. 18 is a flow diagram of the process for providing service that affects the real world through the mobile telephone 7 with the GPS function based on information collected on the personal computer 2. The process is performed when the respective controllers 12, 22, and 101 of the server 1, the personal computer 2, and the mobile telephone 7 collaboratively work by executing predetermined program codes.

Service, affecting the real world, provided to the user based on operation information of the personal computers 2 of a plurality of users is discussed below.

The operation of the personal computer 2 illustrated in FIG. 4 is discussed below. When the controller 22 determines in step S151 that the user operates the operation unit 21 to issue an HTML acquisition command, the algorithm proceeds to step S152. If no HTML acquisition command is provided, the algorithm proceeds to step S153.

In step S152, the data transceiver 23 receives HTML data designated by the user through the server 1 connected to the Internet. The controller 22 decodes the HTML data through the HTML decoder 24 under the control thereof, and presents the HTML data on the display 25. The controller 22 transmits, to the server 1 through the data transceiver 23, the user information such as a user ID registered beforehand in the external storage device 26, and the "browsing information" of the Web represented by a URL indicating the site which is searched for and monitored by the personal computer 2.

In step S153, the bookmark registration monitor 27 monitors whether the user inputs a bookmark registration command on the operation unit 21. If a bookmark registration command is input, then the algorithm proceeds to step S154, else the algorithm proceeds to step S155.

In step S154, the controller 22 transmits, to the server 1 through the data transceiver 23, the user operation information such as the user ID registered beforehand in the external storage device 26, and the "bookmark information" represented by the URL indicating the bookmark registered site.

In step S155, the download monitor 28 monitors whether the user inputs a download command on the controller 12. If a download command is input, then the algorithm proceeds to step S156, else the algorithm proceeds to step S157.

In step S156, the controller 22 transmits, to the server 1, the user operation information such as and the "download information" represented by the URL indicating the storage location of the file downloaded to the personal computer 2.

Similarly, the upload monitor monitors whether the user inputs an upload command on the operation unit 21. If an upload command is input, the controller 22 may transmit, to the sever 1, the user operation information such as the user ID, the "upload information" such as the ID of a file uploaded from the personal computer 2 and the URL indicating the storage location of the uploaded file.

In step S157, the data storage command monitor 29 monitors whether the user inputs a data storage command for the information displayed as the HTML information on the operation unit 21. If the user inputs the storage command, then the algorithm proceeds to step S158, else the algorithm proceeds to step S159.

In step S158, the controller 22 transmits, to the server 1 through the data transceiver 23, the user operation information such as the user ID, the storage ID, the URL data to be stored.

In step S159, the data deletion command monitor 30 monitors whether the user has input a delete command of data stored in the external storage device 26 on the operation unit 21. If the user has input the data delete command, then the algorithm proceeds to step S160, else the algorithm proceeds to step S161.

In step S160, the controller 22 transmits, to the server 1 through the data transceiver 23, the user operation information such as the user ID, the delete ID, the URL data to be deleted, and the name of a file to be deleted.

When the user edits data on the personal computer 2, the user operation information such as "edit information" containing the ID of an edited file and the edit ID identifying the type of edit may be transmitted to the server 1 via the data transceiver 23.

In step S161, the controller 22 determines whether the user has input an end command. If no end command has been input, then the algorithm loops to step S151, else the process on the personal computer 2 ends.

The operation of the server 1 illustrated in FIG. 3 will now be discussed. In step S162, the controller 12 determines whether the data transceiver 11 receives the user operation information from the personal computer 2 (and other media). If the user operation information has been received, then the algorithm proceeds to step S163, else the algorithm proceeds to step S164.

When the user operation information in the personal computer 2 of each user is received in step S163, the controller 12 controls apparatus operation to store the user operation information in the data base 13 on a per user ID basis for data base building.

In step S164, the controller 12 determines whether service request information is received from a client through the data transceiver 11. If the service request is received, then the algorithm proceeds to step S165, else the algorithm proceeds to step S167 for an end step. Here, the client is the mobile telephone 6, and the user A requests activity information service as the value-added information.

In step S165, the matching degree calculator 14 calculates the matching degree of the user operation information concerning the personal computer 2 between the user A and each of the other user IDs in all data base information. The matching degree calculator 14 thus detects, as a similar user, a user ID having the highest degree of matching. For example, data in each category is tested for matching on a text basis, and the number of fully matched words may be treated as the degree of matching. A weighting process may be performed with the degree of matching varied from full to partial matching.

In step S166, the controller 12 searches the data base 13 and reads the user activity information (position information+ building ID) corresponding to the searched user ID. The controller 12 also transmits the user activity information as the value-added information to the terminal of the requesting user A through the data transceiver 11.

In step S167, the controller 12 determines whether a server manager inputs an end command. If no end command is input, then the algorithm loops to step S162, else the process of the server 1 ends.

The operation of the mobile telephone 7 illustrated in FIG. 17 will now be discussed. In step S168, the controller 101 determines whether a service request is received from the user. If the service request is received, then the algorithm proceeds to step S169, else the algorithm proceeds to step S170.

In step S169, the controller 101 transmits service request information about the user A and the mobile telephone information to the server 1 through the channel CODEC 62, the modulator 63, and the RF circuit 64.

In step S170, the controller 101 determines whether the user activity information is received through an antenna, the RF circuit 64, the demodulator 65, and the channel CODEC 62, from the server 1. If the user activity information is received, then the algorithm proceeds to step S171, else the algorithm proceeds to step S172.

In step S171, the controller 101 controls the memory 102 to store the received user activity information therewithin. The user activity information includes the position information and the building ID.

In step S172, the position information comparator 103 compares the position information of the current user position received from the GPS antenna with the position information of the similar user stored in the memory 102. If the two pieces of information coincide with each other, then the algorithm proceeds to step S173, else the algorithm proceeds to an end process.

In step S173, the controller 101 outputs alarm audio data stored beforehand in the memory 102 to the D/A converter 68, and outputs the sound from the loudspeaker 69, thereby notifying the user that the two pieces of position information coincide with each other. Instead of the audio output, the notice information that the two pieces of position information coincide with each other is output on the screen of the display 76.

In step S174, the controller 101 determines whether an end command is input. If no end command is input, then the algorithm loops to step S168, else the process of the mobile telephone 7 ends.

In this embodiment, the server 1 uses the browsing information to calculate the matching degree of the user. When the user of the mobile telephone drops in at a place where a user having similar browsing information has visited, an alarm is triggered. Even in a place that apparently draws no attention of the users, the server 1 allows the user to find an item, a scenery, or a product worth looking at. As a result, the value-added information affects the activity of the user in the real world.

Purchase of Product Based on the Value-Added Information:

Internet connection service through the mobile telephone has started, and transfer of value information, such as ticket booking, and the purchase and consumption of goods and service are possible over the mobile telephone. As already discussed, the present invention provides the value-added information affecting the real world on the mobile telephone, based on the user operation information accumulated on the personal computer. Discussed next is the value-added information service function affecting the real world in which a product is purchased over the mobile telephone based on the value-added information provided by the server.

The server 1 and the personal computer 2 having the functions and constructions respectively illustrated in FIG. 3 and FIG. 4 are also used here, and the discussion thereof is omitted here.

Figure 19:
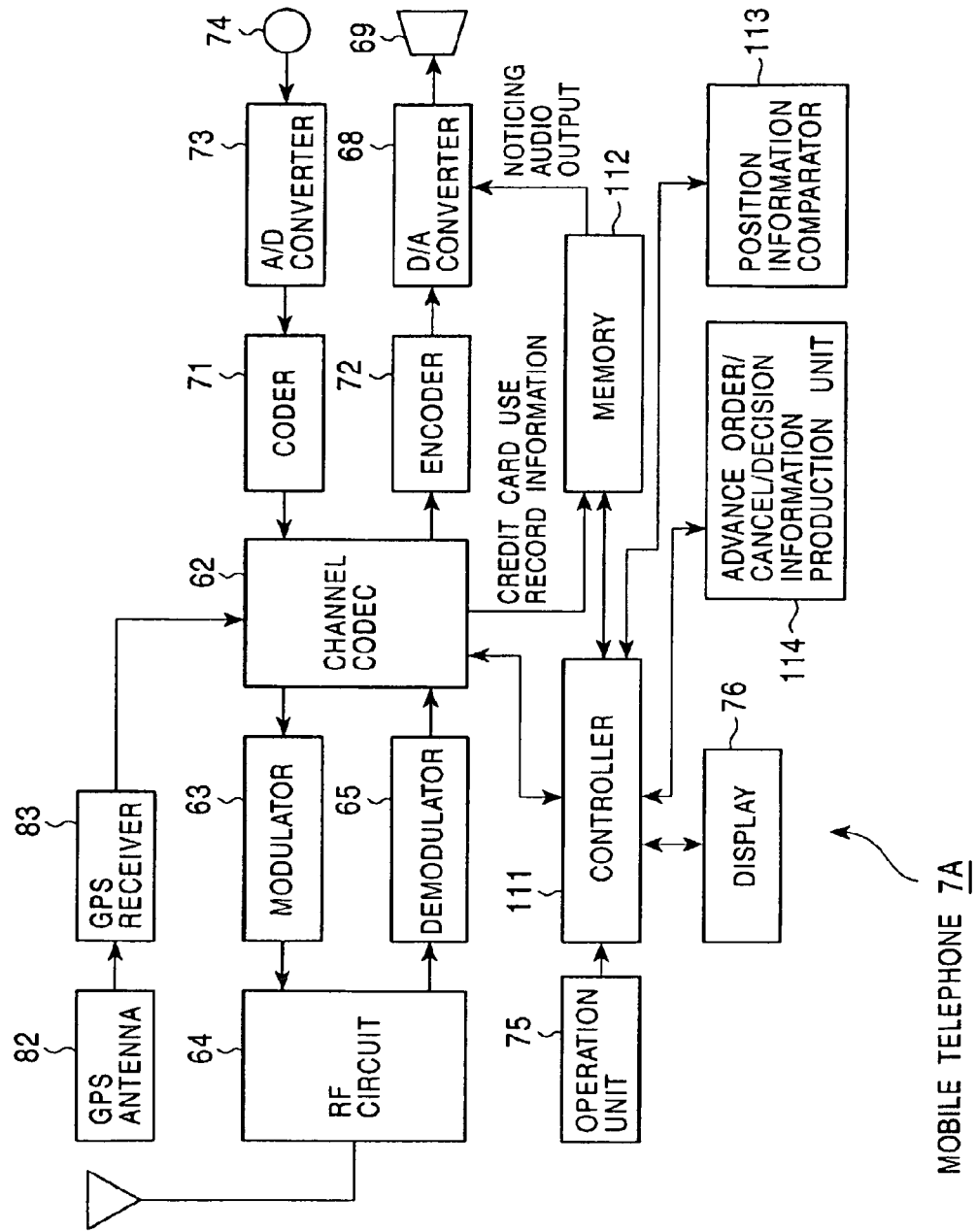
FIG. 19 diagrammatically illustrates the functional structure of a mobile telephone 7A with a GPS function in which the present invention is applied.

FIG. 19 diagrammatically illustrates the functional structure of a mobile telephone 7A with a GPS function in which the present invention is applied. As shown, the mobile telephone 7A includes a controller 111, a memory 112, a position information comparator 113, an advance order/cancel/decision information production unit 114, a channel CODEC 62, a modulator 63, an RF circuit 64, a demodulator 65, a D/A converter 68, a loudspeaker 69, a coder 71, a decoder 72, an A/D converter 73, a microphone 74, an operation unit 75, and a display 76. The mobile telephone 7A with the GPS function provides services affecting the real world under a program execution environment provided by the operating system when the controller 111 executes a variety of program codes. The blocks of the mobile telephone 7A are discussed below.

When the mobile telephone 7A with the GPS function is linked to an ordinary telephone line, the RF circuit 64 downconverts an analog transmission signal received through an antenna from a mobile-telephone base station (not shown). The demodulator 65 demodulates the analog signal in accordance with predetermined demodulation information and timing, is channel-decoded through the channel CODEC 62, is decoded through the decoder 72, and is then converted into analog audio signal through the D/A converter 68. The analog audio signal is then output in sound from the loudspeaker 69.

An audio sound input through the microphone 74 is converted into a digital signal through the A/D converter 73, is encoded through the coder 71, is channel-coded through the channel CODEC 62, and is then modulated through the modulator 63 in accordance with predetermined modulation information and timing. The modulated signal is then up-converted through the RF circuit 64 and is then transmitted through the antenna to the mobile-telephone base station.

The mobile telephone 7A with the GPS function also has the function of transmitting and receiving data processed through the controller 111 over a mobile telephone network. For example, the mobile telephone 7A with the GPS function may be linked to a predetermined provider or a service center through the mobile telephone network through exchange and to the server 1 (see FIG. 3) through the mobile telephone network to receive medium control information and value-added information in the real world.

When the mobile telephone 7A with the GPS function transmits data, the data handled by the controller 111 is channel-coded through the channel CODEC 62, is modulated through the modulator 63 in accordance with predetermined modulation information and timing, is up-converted through the RF circuit 64, and is then output from the antenna to the mobile-telephone base station (not shown).

When the mobile telephone 7A with the GPS function receives data, an analog transmission signal received through the antenna from the mobile-telephone base station (not shown) is down-converted through the RF circuit 64, is demodulated through the demodulator in accordance with the demodulation information and timing, and is then channel-decoded through the channel CODEC 62. The received data is thus converted into data in a form that is processed through the controller 111.

The mobile telephone 7A with the GPS function receives the value-added information affecting the real world from the server 1 using the data receiving function thereof. One example of the value-added information is purchase information relating to the purchase and consumption of goods and service. The purchase information is a combination of the position information, the building ID, and the product ID, and has the effect of driving the user's willingness to act. The purchase information received is temporarily stored in the memory 112.

The mobile telephone 7A with the GPS function is equipped with a position fixing function based on the GPS, namely, the Global Positioning System. The mobile telephone 7A receives radiowaves, namely, GPS signals transmitted from at least three GPS satellites circling the earth, through the GPS antenna 82, and channel-decodes the GPS signal through the channel CODEC 62. Position information thus obtained is stored temporarily in the memory 112 together with the ID of a building where the user is currently located.

The operation unit 75, composed of a user input device such as numeric keys and function buttons, is used to enter commands to the system 7. The display 76 is formed of an LCD (Liquid-Crystal Display), and provides a visual feedback to the user.

In this embodiment, the operation unit 75 is also used to enter telephone numbers, set a melody signaling an incoming call, and input commands for a variety of services such as ticket booking. The commands input through the operation unit 75 are processed through the controller 111 under the control of the operating system.

The memory 112 stores program codes of the operating system and other programs executed by the controller 61, and temporarily stores job data of an execution program.

The position information comparator 113 is a functional module which compares the position information received as the value-added information and the position information acquired by the GPS function. Based on the position information comparison results, the controller 111 generates audio data for notice. The audio data is temporarily stored in the memory 112, is converted into an analog signal through the D/A converter 68, and is then output in sound from the loudspeaker 69. A notice audio output draws attention of the user, thereby affecting the real world.

The advance order/cancel/decision information production unit 114 automatically produces information for ordering, deciding, and canceling the purchase of goods and service, and other spending, based on the value-added information received from the server 1. The server 1 generates the value-added information relating to purchasing by collecting the user operation information over the personal computer 2 (see FIG. 5), and provides service affecting the activity of the user in the real world through the mobile telephone 7A with the GPS function.

Figure 20:
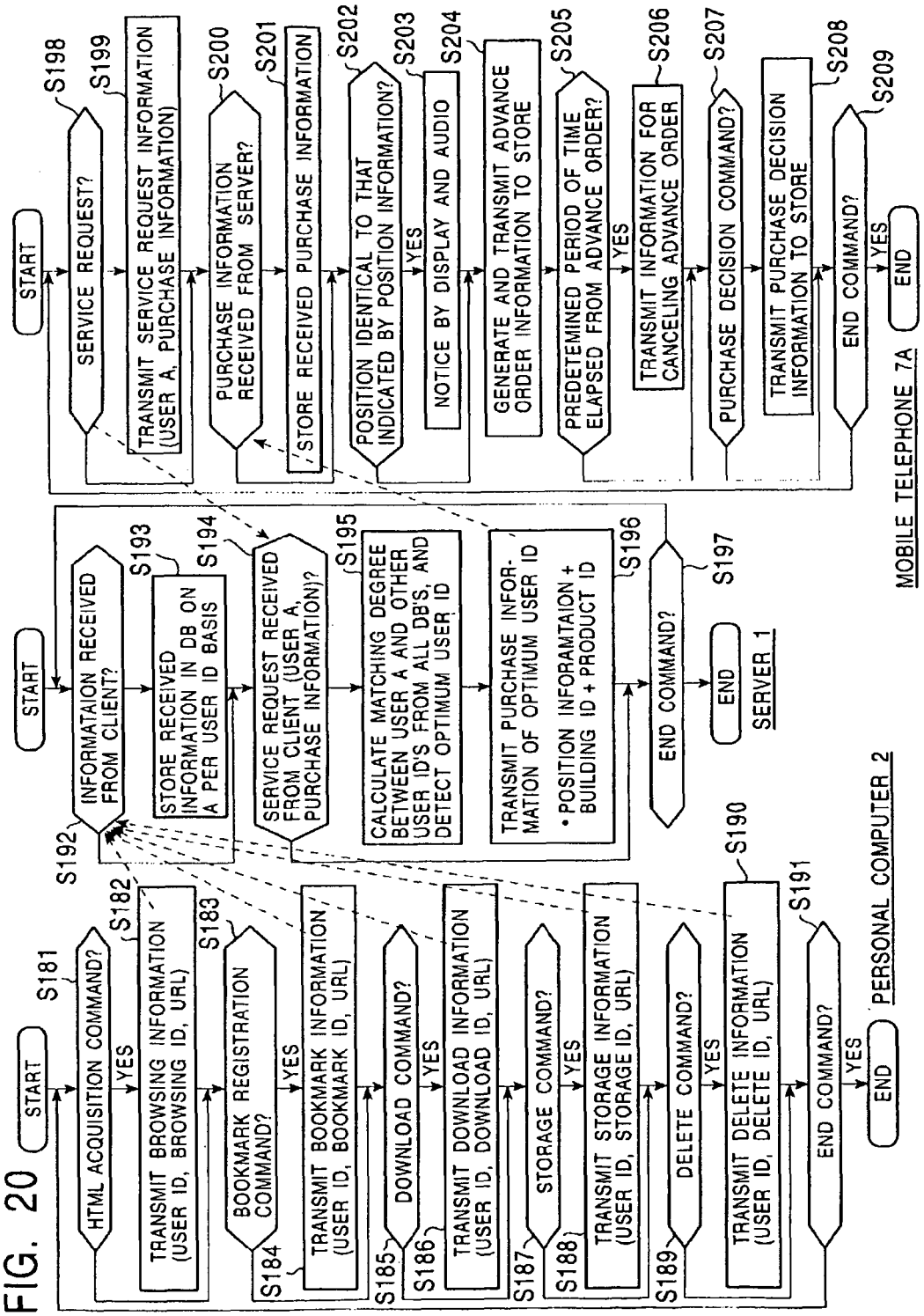
FIG. 20 is a flow diagram of the process for providing service that affects the real world wherein a product is purchased through the mobile telephone 7A with the GPS function in accordance with the information accumulated on the personal computer 2.

FIG. 20 is a flow diagram of the process for providing service that affects the real world wherein a product is purchased through the mobile telephone 7A with the GPS function in accordance with the information collected on the personal computer 2. The process is performed when the respective controllers 12, 22, and 111 of the server 1, the personal computer 2, and the mobile telephone 7A collaboratively work by executing predetermined program codes.

Service, affecting the real world, provided to a given user based on operation information of the personal computers 2 of a plurality of users is discussed below with reference to the flow diagram.

The operation of the personal computer 2 illustrated in FIG. 4 is discussed below. When the controller 22 determines in step S181 that the user operates the operation unit 21 to issue an HTML acquisition command, the algorithm proceeds to step S162. If no HTML acquisition command is provided, the algorithm proceeds to step S183.

In step S182, the data transceiver 23 receives HTML data designated by the user through the server 1 connected to the Internet. The controller 22 decodes the HTML data through the HTML decoder 24 under the control thereof, and presents the HTML data on the display 25. The controller 22 transmits, to the server 1 through the data transceiver 23, the user information such as a user ID registered beforehand in the external storage device 26, and the "browsing information" of the Web presented by a URL indicating the site which is searched for and monitored by the personal computer 2.

In step S183, the bookmark registration monitor 27 monitors whether the user inputs a bookmark registration command on the operation unit 21. If a bookmark registration command is input, then the algorithm proceeds to step S184, else the algorithm proceeds to step S185.

In step S184, the controller 22 transmits, to the server 1 through the data transceiver 23, the user operation information such as the user ID registered beforehand in the external storage device 26, and the "bookmark information" represented by the URL indicating the bookmark registered site.

In step S185, the download monitor 28 monitors whether the user inputs a download command on the controller 21. If a download command is input, then the algorithm proceeds to step S186, else the algorithm proceeds to step S187.

In step S186, the controller 22 transmits, to the server 1, the user operation information such as the "download information" represented by the URL indicating the storage location of the file downloaded to the personal computer 2.

Similarly, the upload monitor monitors whether the user inputs an upload command on the operation unit 21. If an upload command is input, the controller 22 may transmit, to the sever 1, the user operation information such as the "upload information" such as the ID of a file uploaded from the personal computer 2 and the URL indicating the storage location of the uploaded file.

In step S187, the data storage command monitor 29 monitors whether the user inputs a data storage command for the information displayed as the HTML information on the operation unit 21. If the user inputs the storage command, then the algorithm proceeds to step S188, else the algorithm proceeds to step S189.

Similarly, in step S188, the controller 22 transmits, to the server 1 through the data transceiver 23, the user operation information such as the user ID, the storage ID, the URL data to be stored.

In step S189, the data deletion command monitor 30 monitors whether the user has input a delete command of data stored in the external storage device 26 on the operation unit 21. If the user has input the data delete command, then the algorithm proceeds to step S190, else the algorithm proceeds to step S191.

In step S190, the controller 22 transmits, to the server 1 through the data transceiver 23, the user operation information such as the user ID, the delete ID, the URL data to be deleted, and the name of a file to be deleted.

When the user edits data on the personal computer 2, the user operation information such as "edit information" containing the ID of an edited file and the edit ID identifying the type of edit may be transmitted to the server 1 via the data transceiver 23.

In step S191, the controller 22 determines whether the user has input an end command. If no end command has been input, then the algorithm loops to step S151, else the process on the personal computer 2 ends.

The operation of the server 1 illustrated in FIG. 3 will now be discussed. In step S192, the controller 12 determines whether the data transceiver 11 receives the user operation information from the personal computer 2 (and other media). If the user operation information has been received, then the algorithm proceeds to step S193, else the algorithm proceeds to step S194.

When the user operation information in the personal computer 2 of each user is received in step S193, the controller 12 controls apparatus operation to store the user operation information in the data base 13 on a per user ID basis for data base building.

In step S194, the controller 12 determines whether service request information is received from a client through the data transceiver 11. If the service request is received, then the algorithm proceeds to step S195, else the algorithm proceeds to step S197 for an end step. Here, the user A requests the purchase information service.

In step S195, the matching degree calculator 14 calculates the matching degree of the user operation information concerning the personal computer between the user A and each of the other user IDs in all data base information. The matching degree calculator 14 thus detects, as a similar user, a user ID having the highest degree of matching as a similar user. For example, data in each category is tested for matching on a text basis, and the number of fully matched words may be treated as the degree of matching. A weighting process may be performed with the degree of matching varied from full to partial matching.

In step S196, the controller 12 searches the data base 13 and reads the purchase information (position information+building ID+product ID) corresponding to the searched user ID. The controller 12 also transmits the purchase information as the value-added information to the terminal of the requesting user A through the data transceiver 11.

In step S197, the controller 12 determines whether a server manager inputs an end command. If no end command is input, then the algorithm loops to step S192, else the process on the server 1 ends.

The operation of the mobile telephone 7A illustrated in FIG. 19 will now be discussed. In step S198, the controller 111 determines whether a service request is received from the user through the operation unit 75. If the service request is received, then the algorithm proceeds to step S199, else the algorithm proceeds to step S200.

In step S199, the controller 111 transmits service request information about the user A and the purchase information to the server 1 through the channel CODEC 62, the modulator 63, and the RF circuit 64.

In step S200, the controller 111 determines whether the purchase information as the value-added information is received through an antenna, the RF circuit 64, the demodulator 65, and the channel CODEC 62 from the server 1. If the purchase information is received, then the algorithm proceeds to step S201, else the algorithm proceeds to step S202.

In step S201, the controller 111 controls the memory 112 to store the received user purchase information, namely, the position information+the building ID+the product ID therewithin.

In step S202, the position information comparator 113 compares the position information of the current user position received from the GPS antenna with the position information of the similar user stored in the memory 112. If the two pieces of information coincide with each other, then the algorithm proceeds to step S203, else the algorithm proceeds to step S204.

In step S203, the controller 111 outputs alarm audio data stored beforehand in the memory 112 to the D/A converter 68, and outputs the sound from the loudspeaker 69, thereby notifying the user that the two pieces of position information coincide with each other. Instead of the audio output, the notice information that the two pieces of position information coincide with each other is visually output on the screen of the display 76.

In step S204, the advance order/cancel/decision information production unit 114 transmits the advance order information to a building (a store) based on the product ID and the building ID stored in the memory 112. There is a limitation that the information cannot be transmitted to the store outside the service area when a short-range radio data communication function such as Bluetooth is used to transmit data. If the building ID is a telephone number, the data is transmitted by automatically telephoning to the building.

In step S205, the data transceiver 11 calculates dates and time which has elapsed from the advance order. If a predetermined period of time has elapsed, then the algorithm proceeds to step S206, else the algorithm proceeds to step S207.

In step S206, the controller 111 transmits order canceling information produced by the advance order/cancel/decision information production unit 114.

In step S207, the controller 111 determines whether the user inputs a purchase decision command. If the purchase decision command is input, then the algorithm proceeds to step S208, else the algorithm proceeds to step S209.

In step S208, the advance order/cancel/decision information production unit 114 produces purchase decision information, and the controller 111 transmits the purchase decision information to the store.

In step S209, the controller 111 determines whether the user inputs an end command. If no end command is input, then the algorithm loops to step S198, else the process of the mobile telephone 7A with the GPS function ends.

In this embodiment, the server 1 uses the browsing information to calculate the matching degree of the user. When the user of the mobile telephone drops in at a place where a user having similar browsing information has visited, an alarm is triggered, inviting the user to the store. When a user having a similar preference places an order of an item, the advance order information is automatically transmitted to the store. In this way, the user thus enjoys preferable service in the real world in which valuable items that may not be listed in sales information can be tentatively ordered.

The collected information supplied to the server and the value-added information available from the server are now summarized in the value-added information service in each of the above embodiments of the present invention.

The collected information supplied from the media such as the TV and the stereo devices include a DVD title, operation information, information input by the user in game playing, clicking for digest, clicking for products, channel information, bookmarks, and browsing information.

The collected information supplied from the user in the real world includes position, movement, congestion information, a GPS fixed position, course information (statistical quantity), and biological information (fingerprint, voice pattern).

The collected information intermediate between the media and the real world includes a collection of images, and special effects.

The value-added information which is supplied to the media from the server for tuning service includes popular title information, scenes attracting public attention/tiresome scenes, game content/content update, digest image replay, marketing information, automatic channel switch, search engine tuning, and ranking of sports and movies with the degree of importance.

The value-added information available from the server and affecting the real world includes the degree of crowdedness, date spots, prediction of traffic congestion, and optimum route searching.

The value-added information available from the server and intermediate between and related to both the medium and the real world includes know-how of image processing, and sale information.

The above-referenced information collection and the value-added information providing service in each of the above embodiments of the present invention are carried out by the server having a dedicated hardware. The service is also available from a general-purpose computer that executes a predetermined computer software program containing the server function. The computer software here refers to program codes for performing steps S22-S27 as illustrated in the flow diagram in FIG. 6, steps S52-S57 illustrated in the flow diagram in FIG. 8, steps S82-87 illustrated in the flow diagram in FIG. 10, steps S105-S110 illustrated in the flow diagram in FIG. 14, steps S127-S132 illustrated in the flow diagram in FIG. 16, steps S162-167 illustrated in the flow diagram FIG. 18, and steps S192-S197 in the flow diagram illustrated in FIG. 20.

Figure 21:
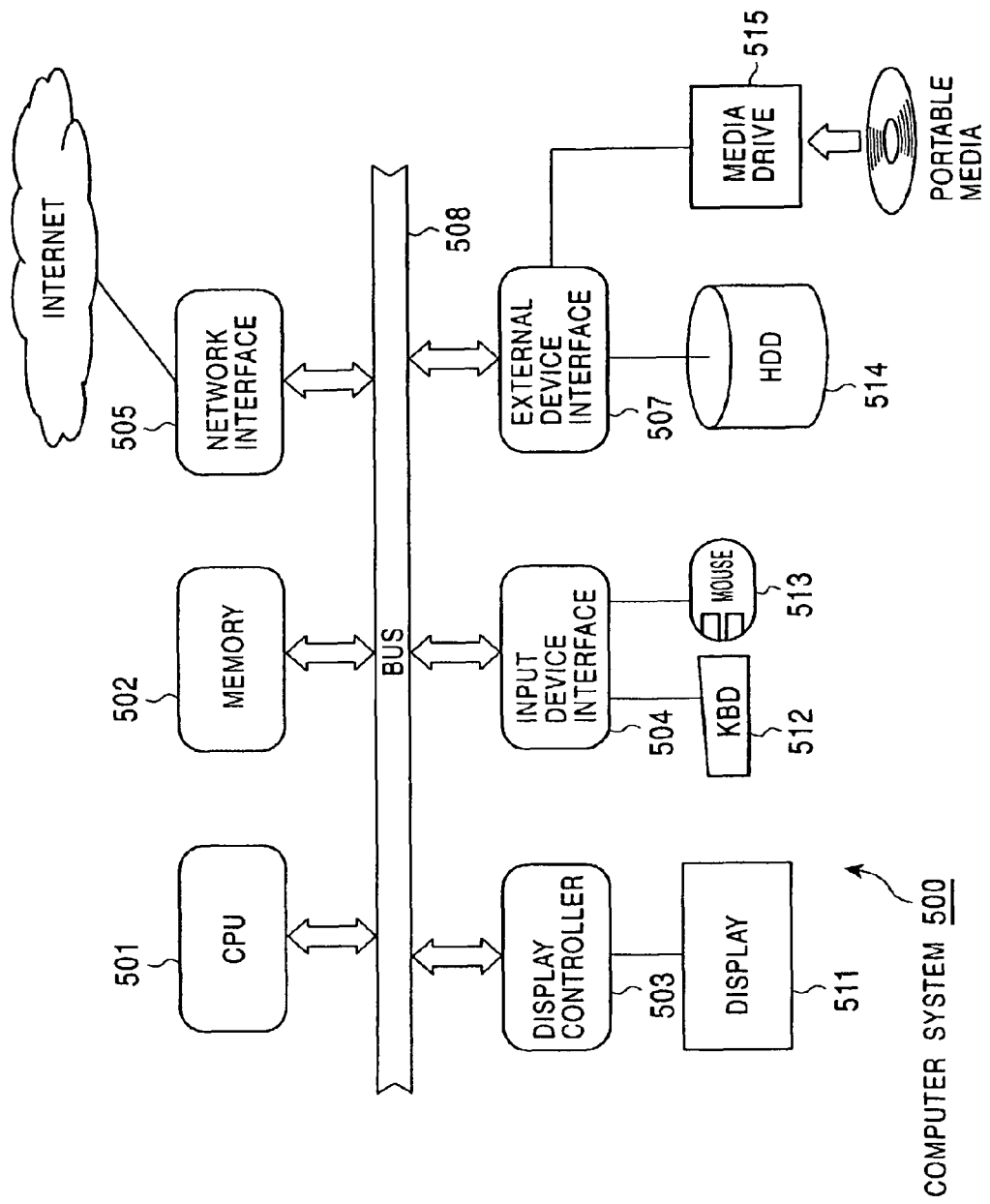
FIG. 21 diagrammatically illustrates the construction of a computer system 500 in which the present invention is applied.

FIG. 21 diagrammatically illustrates the construction of a computer system 500 in which the present invention is applied. Referring to FIG. 21, the functional structure of the computer system 500 for carrying out the program codes implementing the steps of each of the above flow diagrams is discussed below.

A CPU (Central Processing Unit) 501 as a main controller of the system 500 executes a variety of applications under the control of an operating system (OS). As shown, the CPU 501 is interconnected to other devices (to be discussed later) through a bus 508.

A memory 502 stores the program codes executed by the CPU 501 and temporarily stores job data during operation. The memory 502 contains both volatile and non-volatile memories.

A display controller 503 is a dedicated controller to perform a rendering command input by the CPU 501. Rendering data processed by the display controller 503 is first written on a frame buffer (not shown), and then output on the screen of a display 511.

An input device interface 504 is used to interconnect user input devices such as a keyboard 512 and a mouse 513 to the computer system 500.

A network interface 505 is used to connect the system 500 to a localized network such as a LAN (Local Area Network) or a wide-area network such as the Internet through a predetermined communication protocol such as Ethernet.

Over the network, a plurality of host terminals (not shown) such as content receivers is interconnected to each other in a transparent fashion, thereby forming a distributed computing environment. Software programs and data contents are delivered over the network. For example, server applications for the information collection and the generation and providing of the value-added information are down-loaded through the network. The value-added information generated using the server applications is then delivered to each medium and user terminals over the network.

An external device interface 507 is used to interconnect the system 500 to external devices such as a hard disk drive (HDD) 514 or a medium drive 515.

The HDD 514 is an (known) external storage device having a magnetic disk as a storage medium mounted thereto, and outperforms other external devices in terms of storage capacity and data transfer speed. The placement of a software program onto the HDD 514 in a ready-to-be-executed fashion is referred to as the "installation" of the program to the system. The HDD 514 stores program codes of the operating system to be executed by the CPU 501, application programs, and device drivers in a non-volatile manner.

The server applications for the information collection and the generation and providing of the value-added information and the client applications for using the value-added information may be installed onto the HDD 514. The information of each user received through the network is stored in the HDD 514. The value-added information generated based on the user information is accumulated in the HDD 514.

The medium drive 515 is a device which is loaded with a removable medium such as a CD (Compact Disk), an MO (Magneto-Optical Disc), a DVD (Digital Versatile Disc), and accesses data storage surface thereof.

The removable medium is mainly used to back up software programs and data files as computer readable data, and to move these pieces of data between systems (for the purposes of sale, distribution, and delivery). The server applications for the information collection and the generation and providing of the value-added information and the client applications for using the value-added information may be physically distributed and delivered among a plurality of apparatuses using the removable media. The user information and the value-added information generated from the user information may be physically distributed among a plurality of apparatuses.

The computer system 500 illustrated in FIG. 21 is a computer compatible with a "personal computer" PC/AT (Personal Computer/Advanced Technology) manufactured by IBM or the successors thereof. It is also possible to use a computer having another architecture as the computer system 500 of this embodiment.

APPENDIX

The present invention has been discussed in detail with reference to the particular embodiments. It is obvious that ordinary skilled artisans easily modify or change the embodiments without departing from the scope of the present invention. The present invention has been discussed for exemplary purposes only, and is not intended to limit the scope of the present invention. The scope of the present invention is determined solely by reference to the claims appended.

INDUSTRIAL APPLICABILITY

The present invention provides a communication apparatus, a communication method, an electronic apparatus, a method for controlling the electronic apparatus, and a storage medium, for collecting information relating to apparatus operation of a plurality of users and for generating value-added information in an excellent manner based on the collected information.

The present invention provides a communication apparatus, a communication method, an electronic apparatus, a method for controlling the electronic apparatus, and a storage medium, for collecting information relating to apparatus operation of a plurality of users, for generating value-added information relating to the preference of the user in an excellent manner based on the collected information, and for automatically and adaptively providing service in accordance with the user preference based on the value-added information.

In accordance with the present invention, interlocking features and correlation of user operations of a diversity of electronic apparatuses are determined so that a variety of services is automatically provided based on the preference of the users without no human intervention in the interpretation of data.

In accordance with the present invention, a second electronic apparatus of a particular user is controlled based on control information of a second electronic apparatus of a user whose first electronic apparatus information is similar to that of the particular user. Electronic apparatus control service matching the preference of the user is provided without the need for a complex signal processing such as user preference analysis.

In accordance with the present invention, the electronic apparatus of a particular user is controlled based on the electronic apparatus information of a user who has activity information, such as the transfer or purchase of an apparatus, similar to that of the particular user. Electronic apparatus control service matching the preference of the user is provided without the need for a complex signal processing such as user preference analysis. The real world and information space are easily linked.

In accordance with the present invention, notice of stores and advance order are automatically performed based on the activity information of the user having similar electronic apparatus information. The user is thus free from missing chance of purchasing goods. The present invention contributes to driving users' willingness to purchase.

The invention claimed is:

1. A communication apparatus comprising:
a receiver device configured to receive first electronic apparatus operation information and second electronic apparatus operation information from each of a plurality of users,
a determining device configured to determine a matching degree for a first user based on the contents of an operation for the first electronic apparatus included in the received first electronic apparatus operation information;
a selecting device configured to select an identifier of a second user associated with the first user based on the matching degree; and
a transmitter device configured to transmit control information to control a second electronic apparatus of the first user based on the second electronic apparatus operation information of the second user.

2. A communication apparatus according to claim 1, wherein the receiver device receives, from each user, operation information for a receiving device which, as the first electronic apparatus, receives broadcast data.

3. A communication apparatus according to claim 2, wherein the receiver device receives, as video and audio information from each user, the ID and replay time of a content replayed by the receiving device.

4. A communication apparatus according to claim 2, wherein the receiver device receives, as channel switching information from each user, the ID of a channel to which the receiving device is tuned, and channel switch time at which that tuned channel ID is changed.

5. A communication apparatus according to claim 2, wherein the receiver device receives, as recording information from each user, the ID and recording time of a content replayed by the receiving device and recorded in a recording medium.

6. A communication apparatus according to claim 1, wherein the receiver device receives, from each user, operation information for a recording device which, as the first electronic apparatus records in a medium a content replayed by another reproducing device.

7. A communication apparatus according to claim 6, wherein the receiver device receives, as recording information from each user, the ID and recording time of a content recorded in a recording medium by the recording device.

8. A communication apparatus according to claim 6, wherein the receiver device receives, as preprogrammed recording information from each user, the ID of a content preprogrammed for recording by the recording device.

9. A communication apparatus according to claim 1, wherein the receiver device receives, from each user, operation information for a reproducing device which, as the first electronic apparatus, replays a content recorded in a medium.

10. A communication apparatus according to claim 9, wherein the receiver device receives, as the operation information from each user, at least one of the function commands of replay, fast-forward, rewind, and pause given to the reproducing device and the time assigned for that function.

11. A communication apparatus according to claim 1, wherein the receiver device receives, from each user, operation information for a terminal which, as the first electronic apparatus, communicates with an external apparatus.

12. A communication apparatus according to claim 11, wherein the receiver device receives, as browsing information from each user, a URL (Uniform Resource Locator) representing a site which is browsed by the terminal.

13. A communication apparatus according to claim 11, wherein the receiver device receives, as download information from each user, a URL at which a file downloaded from the external apparatus by the terminal is stored.

14. A communication apparatus according to claim 11, wherein the receiver device receives, as upload information from each user, a URL at which a file and the ID of the file uploaded to the external apparatus by the terminal are stored.

15. A communication apparatus according to claim 11, wherein the receiver device receives, as bookmark information from each user, a URL that represents a site which is browsed and then bookmarked by the terminal.

16. A communication apparatus according to claim 11, wherein the receiver device receives, as edit information from each user, the ID of a file edited by the terminal and an edit ID identifying the type of edit.

17. A communication apparatus according to claim 1, wherein the receiver device receives, from each user, operation information for a communication terminal which, as the first electronic apparatus, communicates with an external apparatus in a one-to-one communication.

18. A communication apparatus according to claim 17, wherein the receiver device receives, as service use information from each user, a service ID identifying ticket-booking information transmitted to the external apparatus from the communication terminal.

19. A communication apparatus according to claim 1, wherein the transmitter device transmits, to the second electronic apparatus of the first user, operation information for a receiving device which, as the second electronic apparatus of the second user, receives broadcast data.

20. A communication apparatus according to claim 19, wherein the transmitter device transmits, to the second electronic apparatus of the first user, the ID of a channel to which the receiving device is tuned.

21. A communication apparatus according to claim 19, wherein the transmitter device transmits, to the second electronic apparatus of the first user, area information representing a target area of image data received and replayed by the receiving device.

22. A communication apparatus according to claim 19, wherein the transmitter device transmits, to the second apparatus of the first user, volume information representing the volume of audio data received and replayed by the receiving device.

23. A communication apparatus according to claim 1, wherein the transmitter device transmits, to the second apparatus of the first user, operation information for a recording device which, as the second apparatus of the second user, records in a medium a content replayed by another reproducing device.

24. A communication apparatus according to claim 23, wherein the transmitter device transmits, as preprogrammed recording information to the second electronic apparatus of the first user, the ID and recording time of a content recorded in the recording medium by the recording device.

25. A communication apparatus according to claim 23, wherein the transmitter device transmits, as preprogrammed recording information to the second electronic apparatus of the first user, preprogrammed recording date and time information preprogrammed by the recording device.

26. A communication apparatus according to claim 23, wherein the transmitter device transmits, to the second electronic apparatus of the first user, digest information of the replayed content produced by the second user.

27. A communication apparatus according to claim 23, wherein the transmitter device transmits, to the second electronic apparatus of the first user, search index information of the replayed content produced by the second user.

28. A communication apparatus according to claim 23, wherein the transmitter device transmits, as delete information to the second electronic apparatus of the first user, the ID of a deleted content from among contents recorded in the recording medium by the recording device.

29. A communication apparatus according to claim 23, wherein the transmitter device transmits, as title production information to the second electronic apparatus of the first user, title information corresponding to the content produced by the second user and recorded in the recording medium.

30. A communication apparatus according to claim 1, wherein the transmitter device transmits, to the second electronic apparatus of the first user, operation information for a terminal which, as the second electronic apparatus of the second user, communicates with an external apparatus.

31. A communication apparatus according to claim 30, wherein the transmitter device transmits, as browsing information to the second electronic apparatus of the first user, a URL representing a site which is browsed by the terminal.

32. A communication apparatus according to claim 30, wherein the transmitter device transmits, as download information to the second electronic apparatus of the first user, a URL at which a download file browsed by the terminal is stored.

33. A communication apparatus according to claim 30, wherein the transmitter device transmits, as bookmark information to the second electronic apparatus of the first user, a URL which represents a site which is browsed and bookmarked by the terminal.

34. A communication apparatus according to claim 30, wherein the transmitter device transmits, as category information to the second electronic apparatus of the first user, each category of a plurality of contents produced by the second user and stored in a recording medium in the terminal.

35. A communication apparatus according to claim 30, wherein the transmitter device transmits, to the second electronic apparatus of the first user, operation information for a communication terminal which, as the second electronic apparatus of the second user, communicates with an external apparatus in a one-to-one communication.

36. A communication apparatus according to claim 30, wherein the transmitter device transmits, to the second electronic apparatus of the first user, an incoming call sound ID identifying an incoming call sound set in the communication terminal and replayed at the arrival of a call.

37. A communication apparatus according to claim 30, wherein the transmitter device transmits, to the second electronic apparatus of the first user, a service ID identifying ticket-booking information transmitted to an external apparatus from the communication terminal.

38. A communication apparatus comprising:
a receiver device configured to receive activity information and electronic apparatus operation information from each of a plurality of users,
a determining device configured to determine a matching degree for a first user based on the received activity information,
a selecting device configured to select an identifier of a second user associated with the first user based on the matching degree; and
a transmitter device configured to transmit control information as contents of an operation for the electronic apparatus to control the electronic apparatus of the first user based on the electronic apparatus operation information of the second user.

39. A communication apparatus according to claim 38, wherein the receiver device receives, from each user, the information of the position of the user as the activity information.

40. A communication apparatus according to claim 39, wherein the receiver device receives, as the activity information from each user, the information of the position of the user and identification information identifying a building in which the user is currently located.

41. A communication apparatus according to claim 39, wherein the receiver device receives, as the activity information from each user, information of the operation of an electronic apparatus by the user.

42. A communication apparatus according to claim 38, wherein the receiver device receives, as the activity information from each user, product purchase information that is detected when a credit card is used.

43. A communication apparatus according to claim 42, wherein the receiver device receives, as the activity information from each user, the identification information of a building in which the user is currently located.

44. A communication apparatus according to claim 38, wherein the transmitter device transmits, to the first electronic apparatus of the first user, operation information for a receiving device which, as the first electronic apparatus of the second user, receives broadcast data.

45. A communication apparatus according to claim 44, wherein the transmitter device transmits, to the first electronic apparatus of the first user, the ID of a channel to which the receiving device is tuned.

46. A communication apparatus according to claim 44, wherein the transmitter device transmits, to the first electronic apparatus of the first user, area information representing a target area of image data received and replayed by the receiving device.

47. A communication apparatus according to claim 44, wherein the transmitter device transmits, to the first electronic apparatus of the first user, volume information representing audio data received and replayed by the receiving device.

48. A communication apparatus according to claim 38, wherein the transmitter device transmits, to the first electronic apparatus of the first user, operation information for a recording device which, as the first electronic apparatus of the second user, records in a medium a content replayed by another reproducing device.

49. A communication apparatus according to claim 48, wherein the transmitter device transmits, to the second electronic apparatus of the first user, the ID and recording time of a content recorded by the recording device as preprogrammed recording information.

50. A communication apparatus according to claim 48, wherein the transmitter device transmits, as preprogrammed recording information to the second electronic apparatus of the first user, preprogrammed recording date and time information preprogrammed by the recording device.

51. A communication apparatus according to claim 48, wherein the transmitter device transmits, to the second electronic apparatus of the first user, digest information of the replayed content produced by the second user.

52. A communication apparatus according to claim 48, wherein the transmitter device transmits, to the second electronic apparatus of the first user, search index information of the replayed content produced by the second user.

53. A communication apparatus according to claim 48, wherein the transmitter device transmits, as delete information to the second electronic apparatus of the first user, the ID of a deleted content from among contents recorded in the recording medium by the recording device.

54. A communication apparatus according to claim 48, wherein the transmitter device transmits, as title production information to the second electronic apparatus of the first user, title information corresponding to the content produced by the second user and recorded in the recording medium.

55. A communication apparatus according to claim 38, wherein the transmitter device transmits, to the first electronic apparatus of the first user, operation information for a terminal which, as the first electronic apparatus of the second user, communicates with an external apparatus.

56. A communication apparatus according to claim 55, wherein the transmitter device transmits, as browsing information to the second electronic apparatus of the first user, a URL representing a site which is browsed by the terminal.

57. A communication apparatus according to claim 55, wherein the transmitter device transmits, as download information to the second electronic apparatus of the first user, a URL at which a download file browsed by the terminal is stored.

58. A communication apparatus according to claim 55, wherein the transmitter device transmits, as bookmark information to the second electronic apparatus of the first user, a URL that represents a site which is browsed and bookmarked by the terminal.

59. A communication apparatus according to claim 55, wherein the transmitter device transmits, as category information to the second electronic apparatus of the first user, each category of a plurality of contents produced by the second user and stored in a recording medium in the terminal.

60. A communication apparatus according to claim 38, wherein the transmitter device transmits, to the first electronic apparatus of the first user, operation information for a communication terminal which, as the first electronic apparatus of the second user, communicates with an external apparatus in a one-to-one communication.

61. A communication apparatus according to claim 60, wherein the transmitter device transmits, to the second electronic apparatus of the first user, an incoming call sound ID identifying an incoming call sound set in the communication terminal and replayed at the arrival of a call.

62. A communication apparatus according to claim 60, wherein the transmitter device transmits, to the second electronic apparatus of the first user, a service ID identifying ticket-booking information transmitted to an external apparatus from the communication terminal.

63. A communication apparatus comprising:
   a receiver device configured to receive first electronic apparatus information and user activity information from each of a plurality of users,
   a determining device configured to determine a matching degree for a first user based on the contents of an operation for the first electronic apparatus included in the received first electronic apparatus activity information,
   a selecting device configured to select an identifier of a second user associated with the first user based on the matching degree; and
   a transmitter device configured to transmit control information to control a second electronic apparatus of the first user based on the user activity information of the second user.

64. A communication apparatus according to claim 63, wherein the receiver device receives, from each user, operation information for a receiving device which, as the first electronic apparatus, receives broadcast data.

65. A communication apparatus according to claim 64, wherein the receiver device receives, as video and audio information from each user, the ID and replay time of an content replayed by the receiving device.

66. A communication apparatus according to claim 64, wherein the receiver device receives, as channel switching information from each user, the ID of a channel to which the receiving device is tuned, and channel switch time at which that tuned channel ID is changed.

67. A communication apparatus according to claim 64, wherein the receiver device receives, as recording information from each user, the ID and recording time of a content replayed by the receiving device and recorded in a recording medium.

68. A communication apparatus according to claim 64, wherein the receiver device receives, as preprogrammed recording information from each user, the ID of a content preprogrammed for recording by the recording device.

69. A communication apparatus according to claim 63, wherein the receiver device receives, as the first electronic apparatus from each user, operation information for a recording device which records, in a medium, a content replayed by another reproducing device.

70. A communication apparatus according to claim 69, wherein the receiver device receives, as recording information from each user, the ID and recording time of a content recorded in a recording medium by the recording device.

71. A communication apparatus according to claim 63, wherein the receiver device receives, from each user, operation information for a reproducing device which, as the first electronic apparatus, replays a content recorded in a medium.

72. A communication apparatus according to claim 71, wherein the receiver device receives, as the operation information from each user, at least one of the function commands of replay, fast-forward, rewind, and pause given to the reproducing device and the time assigned for that function.

73. A communication apparatus according to claim 63, wherein the receiver device receives, from each user, operation information for a terminal which, as the first electronic apparatus, communicates with an external apparatus.

74. A communication apparatus according to claim 73, wherein the receiver device receives, as browsing information from each user, a URL representing a site which is browsed by the terminal.

75. A communication apparatus according to claim 73, wherein the receiver device receives, as download information from each user, a URL at which a file downloaded from the external apparatus by the terminal is stored.

76. A communication apparatus according to claim 73, wherein the receiver device receives, as upload information from each user, a URL at which a file and the ID of the file uploaded to the external apparatus by the terminal are stored.

77. A communication apparatus according to claim 73, wherein the receiver device receives, as bookmark information from each user, a URL that represents a site which is browsed and bookmarked by the terminal.

78. A communication apparatus according to claim 73, wherein the receiver device receives, as edit information from each user, the ID of a file edited by the terminal and an edit ID identifying the type of edit.

79. A communication apparatus according to claim 63, wherein the receiver device receives, from each user, operation information for a communication terminal which, as the first electronic apparatus, communicates with an external apparatus in a one-to-one communication.

80. A communication apparatus according to claim 79, wherein the receiver device receives, as service use information from each user, a service ID identifying ticket- booking information transmitted to the external apparatus from the communication terminal.

81. A communication apparatus according to claim 63, wherein the transmitter device transmits, as control information to the second electronic apparatus of the first user, information of the position of the second user, namely, the activity information of the second user.

82. A communication apparatus according to claim 81, wherein the transmitter device transmits, as the control information to the second electronic apparatus of the first user, the information of the position of the user and the identification information identifying a building in which the user is currently located, as the activity information of the second user.

83. A communication apparatus according to claim 81, wherein the transmitter device transmits, as control information to the second electronic apparatus of the first user, product purchase information that is detected as the activity information of the second user when a credit card is used.

84. A communication apparatus according to claim 83, wherein the transmitter device transmits, as control information to the second electronic apparatus of the first user, the product purchase information that is detected when the credit card is used, and the identification information identifying a building in which the user is currently located, as the activity information of the second user.

85. An electronic apparatus comprising:
a receiver device configured to receive control information for an electronic apparatus of a first user; and
a control device configured to control the electronic apparatus of the first user based on the received control information,
wherein the control information includes control information for an electronic apparatus of a second user as a similar user, the second user selected based on a matching degree for the first user based on contents of an operation for another electronic apparatus, and
wherein the contents of an operation for the other electronic apparatus of the second user is similar to that of the first user.

86. An electronic apparatus according to claim 85, wherein the receiver device receives operation information for a receiving device which, as the other electronic apparatus of the similar user, receives broadcast data, and
the control device controls a receiving device as the electronic apparatus in response to the received operation information.

87. An electronic apparatus according to claim 86, wherein the receiver device receives, as channel information, the ID of a channel to which the receiving device of the similar user is tuned, and
the control device controls a tuning operation in the receiving device as the electronic apparatus in response to the channel ID.

88. An electronic apparatus according to claim 86, wherein the receiver device receives area information of image data received and replayed by the receiving device of the similar user, and
the control device performs a resolution setting process on the image data corresponding to the area information.

89. An electronic apparatus according to claim 86, wherein the receiver device receives volume information representing the volume of audio data received and replayed by the receiving device of the similar user, and
the control device controls the volume of the audio data in the receiving device as the electronic apparatus in response to the volume information.

90. An electronic apparatus according to claim 86, wherein the receiver device receives the operation information for a terminal which, as the other electronic apparatus of the similar user, communicates with an external apparatus, and the control device controls a terminal as the electronic apparatus in accordance with the received operation information.

91. An electronic apparatus according to claim 90, wherein the receiver device receives, as browsing information, a URL representing a site which is browsed by the terminal of the similar user, and
the control device controls a browsing operation in a terminal as the electronic apparatus in accordance with the received URL.

92. An electronic apparatus according to claim 90, wherein the receiver device receives, as download information, a URL at which a download file downloaded from an external apparatus by the terminal of the similar user is stored, and
the control device controls a download operation in a terminal as the electronic apparatus in accordance with the received URL.

93. An electronic apparatus according to claim 90, wherein the receiver device receives, as bookmark information, a URL representing a site which is browsed and bookmarked by the terminal of the similar user, and
the control device controls the registration of a bookmark in a terminal as the electronic apparatus in accordance with the received URL.

94. An electronic apparatus according to claim 90, wherein the receiver device receives, as category information, each category of a plurality of contents produced by the similar user and stored in a recording medium in the terminal, and
the control device controls a terminal as the electronic apparatus to automatically categorize the plurality of contents to be stored in the recording medium of the terminal in accordance with the received category information.

95. An electronic apparatus according to claim 85, wherein the receiver device receives operation information for a recording device which, as the other electronic apparatus of the similar user, records in a medium a content replayed by a reproducing device, and
the control device controls a recording device as the electronic apparatus in response to the received operation information.

96. An electronic apparatus according to claim 95, wherein the receiver device receives, as preprogrammed recording information, the ID and recording time of a content which is recorded in a recording medium by the recording device of the similar user, and
the control device controls the setting of the preprogrammed recording in the recording device as the electronic apparatus in accordance with the ID and the recording time of the content.

97. An electronic apparatus according to claim 95, wherein the receiver device receives, as preprogrammed recording information, recording date and time information preprogrammed by the recording device of the similar user, and
the control device controls the setting of the preprogrammed recording in the recording device of the electronic apparatus in accordance with the received preprogrammed recording information.

98. An electronic apparatus according to claim 95, wherein the receiver device receives digest information of a replayed content produced by the similar user, and
the control device controls the production of the digest of the content in accordance with the digest information.

99. An electronic apparatus according to claim 95, wherein the receiver device receives search index information of a replayed content produced by the similar user, and
the control device controls the production of the search index of the content in accordance with the received search index.

100. An electronic apparatus according to claim 95, wherein the receiver device receives, as delete information, the ID of a deleted content from among contents recorded in the recording medium by the recording device of the similar user, and
the control device controls the recording device as the electronic apparatus to delete the content therewithin in accordance with the content ID of the received delete information.

101. An electronic apparatus according to claim 95, wherein the receiver device receives title information corresponding to a content stored in the recording medium by the recording device of the similar user, and
the control device controls the recording device as the electronic apparatus to automatically produce the title of the content to be recorded in the recording device in accordance with the title information.

102. An electronic apparatus according to claim 85, wherein the receiver device receives operation information for a communication terminal which, as the other electronic apparatus of the similar user, communicates with an external apparatus in a one-to-one communication, and
the control device controls a communication terminal as the electronic apparatus in accordance with the received operation information.

103. An electronic apparatus according to claim 102, wherein the receiver device receives an incoming call sound ID identifying an incoming call sound set and replayed at the arrival of a call in the communication terminal of the similar user, and
the control device controls the setting of the incoming call sound in the communication terminal as the electronic apparatus in accordance with the received incoming call sound ID.

104. An electronic apparatus according to claim 102, wherein the receiver device receives a service ID identifying ticket-booking information transmitted to an external apparatus from the communication terminal of the similar user, and
the control device controls the communication terminal as the electronic apparatus to transmit the ticket-booking information corresponding to the received service ID.

105. An electronic apparatus according to claim 85, wherein the receiver device receives, as the activity information of the similar user, user position information, and
the control device controls the electronic apparatus to notify the user of the electronic apparatus that the user is located in the vicinity of a location indicated by the received position information when the user is so located.

106. An electronic apparatus according to claim 105, wherein the receiver device receives, as the activity information of the similar user, position information and identification information of a building in which the user is currently located, and
the control device controls the electronic apparatus to notify the user of the electronic apparatus that the user is located in the vicinity of a location indicated by the received position information and the building.

107. An electronic apparatus according to claim 105, wherein the receiver device receives, as the activity information of the similar user, product purchase information that is detected when the user uses a credit card, and the control device controls the electronic apparatus to outwardly transmit advance order information to order a product in response to the received product purchase information.

108. An electronic apparatus comprising:
a receiver device configured to receive control information for controlling the electronic apparatus of a first user, and
a control device configured to control the electronic apparatus of the first user based on the received control information,
wherein the control information includes control information for an electronic apparatus of a second user as a similar, the second user selected based on a matching degree for the first user based on an activity information,
wherein an activity information of the second user is similar to an activity information of the first user of the electronic apparatus, and
wherein the matching degree is determined from the number of fully matched words on a text basis or a weighting process performed with the degree of matching varied from full to partial matching.

109. An electronic apparatus according to claim 108, wherein the receiver device receives operation information for a receiving device which, as the other electronic apparatus of the similar user, receives broadcast data, and
the control device controls a receiving device as the electronic apparatus in response to the received operation information.

110. An electronic apparatus according to claim 109, wherein the receiver device receives, as channel information, the ID of a channel to which the receiving device of the similar user is tuned, and
the control device controls a tuning operation in the receiving device as the electronic apparatus in response to the channel ID.

111. An electronic apparatus according to claim 109, wherein the receiver device receives area information of image data received and replayed by the receiving device of the similar user, and
the control device performs a resolution setting process on the image data corresponding to the received area information.

112. An electronic apparatus according to claim 109, wherein the receiver device receives volume information representing the volume of audio data received and replayed by the receiving device of the similar user, and
the control device controls the volume of the audio data in the receiving device as the electronic apparatus in response to the volume information.

113. An electronic apparatus according to claim 108, wherein the receiver device receives operation information for a communication terminal which, as the other electronic apparatus of the similar user, communicates with an external apparatus in a one-to-one communication, and
the control device controls a communication terminal as the electronic apparatus in accordance with the received operation information.

114. An electronic apparatus according to claim 113, wherein the receiver device receives an incoming call sound ID identifying an incoming call sound set and replayed at the arrival of a call in the communication terminal of the similar user, and
the control device controls the setting of the incoming call sound in the communication terminal as the electronic apparatus in accordance with the received incoming call sound ID.

115. An electronic apparatus according to claim 113, wherein the receiver device receives a service ID identifying ticket-booking information transmitted to an external apparatus from the communication terminal of the similar user, and
the control device controls the communication terminal as the electronic apparatus to transmit the ticket-booking information corresponding to the received service ID.

116. An electronic apparatus according to claim 108, wherein the receiver device receives operation information for a recording device which, as the other electronic apparatus of the similar user, records in a medium a content replayed by a reproducing device, and
the control device controls a recording device as the electronic apparatus in response to the received operation information.

117. An electronic apparatus according to claim 116, wherein the receiver device receives, as preprogrammed recording information, the ID and recording time of a content which is recorded in a recording medium by the recording device of the similar user, and
the control device controls the setting of the preprogrammed recording in the recording device as the electronic apparatus in accordance with the received ID and the recording time of the content.

118. An electronic apparatus according to claim 116, wherein the receiver device receives, as preprogrammed recording information, recording date and time information preprogrammed by the recording device of the similar user, and
the control device controls the setting of the preprogrammed recording in the recording device as the electronic apparatus in accordance with the received preprogrammed recording date and time information.

119. An electronic apparatus according to claim 116, wherein the receiver device receives digest information of a replayed content produced by the similar user, and
the control device controls the production of the digest of the content in accordance with the received digest information.

120. An electronic apparatus according to claim 116, wherein the receiver device receives search index information of a replayed content produced by the similar user, and
the control device controls the production of the search index of the content in accordance with the received search index.

121. An electronic apparatus according to claim 116, wherein the receiver device receives, as delete information, the ID of a deleted content from among contents recorded in the recording medium by the recording device of the similar user, and
the control device controls the recording device as the electronic apparatus to delete the content therewithin in accordance with the received content ID.

122. An electronic apparatus according to claim 116, wherein the receiver device receives title information corresponding to a content stored in the recording medium by the recording device of the similar user, and
the control device controls the recording device as the electronic apparatus to automatically produce the title of the content to be recorded in the recording device in accordance with the received title information.

123. An electronic apparatus according to claim 108, wherein the receiver device receives the operation information for a terminal which, as the other electronic apparatus of the similar user, communicates with an external apparatus, and the control device controls a terminal as the electronic apparatus in accordance with the received operation information.

124. An electronic apparatus according to claim 123, wherein the receiver device receives, as browsing information, a URL representing a site which is browsed by the terminal of the similar user, and the control device controls a browsing operation in a terminal as the electronic apparatus in accordance with the received URL.

125. An electronic apparatus according to claim 123, wherein the receiver device receives, as download information, a URL at which a download file downloaded from an external apparatus by the terminal of the similar user is stored, and the control device controls a download operation in a terminal as the electronic apparatus in accordance with the received URL.

126. An electronic apparatus according to claim 123, wherein the receiver device receives, as bookmark information, a URL representing a site which is browsed and bookmarked by the terminal of the similar user, and the control device controls the registration of a bookmark in a terminal as the electronic apparatus in accordance with the received URL.

127. An electronic apparatus according to claim 123, wherein the receiver device receives, as category information, each category of a plurality of contents produced by the similar user and stored in a recording medium in the terminal, and the control device controls a terminal as the electronic apparatus to automatically categorize the plurality of contents to be stored in the recording medium of the terminal in accordance with the received category information.

128. An electronic apparatus according to claim 108, wherein the receiver device receives user position information as the activity information of the similar user, and the control device controls the electronic apparatus to notify the user of the electronic apparatus that the user is located in the vicinity of a location indicated by the received position information when the user is so located.

129. An electronic apparatus according to claim 128, wherein the receiver device receives, as the activity information of the similar user, user position information and identification information of a building in which the user is currently located, and the control device controls the electronic apparatus to notify the user of the electronic apparatus that the user is located in the vicinity of a location indicated by the received position information and the building.

130. An electronic apparatus according to claim 128, wherein the receiver device receives, as the activity information of the similar user, product purchase information that is detected when the user uses a credit card, and the control device controls the electronic apparatus to actually transmit advance order information to order a product in response to the received product purchase information.

131. A communication method comprising:

a receiving step of receiving first electronic apparatus operation information and second electronic apparatus operation information from each of a plurality of users, a determining step of determining a matching degree for a first user based on the contents of an operation for the first electronic apparatus included in the received first electronic apparatus operation information;

a selecting device configured to select an identifier of a second user associated with the first user based on the matching degree; and a transmitting step of transmitting control information to control a second electronic apparatus of the first user based on the second electronic apparatus operation information of the second user.

132. A communication method comprising:

a receiving step of receiving activity information and electronic apparatus operation information from each of a plurality of users, a determining step of determining a matching degree for a first user based on the received activity information a selecting device configured to select an identifier of a second user associated with the first user based on the matching degree; and a transmitting step of transmitting control information as contents of an operation for the electronic apparatus to control the electronic apparatus of the first user based on the electronic apparatus operation information of the second user.

133. A communication method comprising:

a receiving step of receiving first electronic apparatus information and user activity information from each of a plurality of users;

a determining step of determining a matching degree for a first user based on the contents of an operation for the first electronic apparatus included in the received operation information similar to the first electronic apparatus information of a first user;

a selecting device configured to select an identifier of a second user associated with the first user based on the matching degree; and a transmitting step of transmitting control information to control a second electronic apparatus of the first user based on the user activity information of the second user.

134. A control method for controlling an electronic apparatus, comprising:

a receiving step of receiving control information for controlling an electronic apparatus of a first user; and a controlling step of controlling the electronic apparatus of the first user based on the received control information, wherein the control information includes control information for an electronic apparatus of a second user as a similar, the second user selected based on a matching degree for the first user based on contents of an operation for another electronic apparatus, and wherein the contents of an operation for the other electronic apparatus of the second user is similar to that of the first user.

135. A control method for controlling an electronic apparatus, comprising:

a receiving step of receiving control information for controlling the electronic apparatus of a first user; and a controlling step of controlling the electronic apparatus of the first user based on the received control information, wherein the control information includes control information for an electronic apparatus of a second user as a similar, the second user selected based on a matching degree for the first user based on an activity information, wherein an activity information of the second user is similar to an activity information of the first user of the electronic apparatus, and wherein the matching degree is determined from the number of fully matched words on a text basis or a weighting process performed with the degree of matching varied from full to partial matching.

136. A Non-transitory computer-readable medium storing a computer program that when executed on a processor causes the processor to perform a method for controlling an electronic apparatus for a single user based on control information of electronic apparatuses of a plurality of users the method comprising:
 a receiving step of receiving first electronic apparatus operation information and second electronic apparatus operation information from each of a plurality of users;
 a determining step of determining a matching degree for a first user based on the contents of an operation for the first electronic apparatus included in the received operation information similar to the first electronic apparatus information of a first user;
 a selecting device configured to select an identifier of a second user associated with the first user based on the matching degree; and
 a transmitting step of transmitting control information to control a second electronic apparatus of the first user based on the second electronic apparatus operation information of the second user.

137. A Non-transitory computer-readable medium storing a computer program that when executed on a processor causes the processor to perform a method for controlling an electronic apparatus for a single user based on activity information of a plurality of users, the method comprising:
 a receiving step of receiving activity information and electronic apparatus operation information from each of a plurality of users;
 a determining step of determining a matching degree for a first user based on the received activity information;
 a selecting device configured to select an identifier of a second user associated with the first user based on the matching degree; and
 a transmitting step of transmitting control information as contents of an operation for the electronic apparatus to control the electronic apparatus of the first user based on the electronic apparatus operation information of the second user.

138. A Non-transitory computer-readable medium storing a computer program that when executed on a processor causes the processor to perform a method for controlling an electronic apparatus for a single user based on electronic apparatus information of a plurality of users, the method comprising:
 a receiving step of receiving first electronic apparatus information and user activity information from each of a plurality of users;
 a determining step of determining a matching degree for a first user based on the contents of an operation for the first electronic apparatus included in the received first electronic apparatus activity information;
 a selecting device configured to select an identifier of a second user associated with the first user based on the matching degree; and
 a transmitting step of transmitting control information to control a second electronic apparatus of the first user based on the user activity information of the second user.

139. A Non-transitory computer-readable medium storing a computer program that when executed on a processor causes the processor to perform a method for controlling an electronic apparatus for a single user based on activity information of a similar user, the method comprising:
 a receiving step of receiving control information for controlling an electronic apparatus of a first user; and
 a controlling step of controlling the electronic apparatus of the first user based on the received control information,
 wherein the control information includes control information for an electronic apparatus of a second user as a similar, the second user selected based on a matching degree for the first user based on contents of an operation for another electronic apparatus, and
 wherein the contents of an operation for the other electronic apparatus of the second user is similar to that of the first user.

140. A Non-transitory computer-readable medium storing a computer program that when executed on a processor causes the processor to perform a method for controlling an electronic apparatus for a single user based on activity information of a similar user, the method comprising:
 a receiving step of receiving control information for controlling the electronic apparatus of a first user; and
 a controlling step of controlling the electronic apparatus of the first user based on the received control information,
 wherein the control information includes control information for an electronic apparatus of a second user as a similar, the second user selected based on a matching degree for the first user based on an activity information,
 wherein an activity information of the second user is similar to an activity information of the first user of the electronic apparatus, and
 wherein the matching degree is determined from the number of fully matched words on a text basis or a weighting process performed with the degree of matching varied from full to partial matching.

141. A communication apparatus comprising:
 receiver means for receiving first electronic apparatus operation information and second electronic apparatus operation information from each of a plurality of users;
 determining means for determining a matching degree for a first user based on the contents of an operation for the first electronic apparatus included in the received first electronic apparatus operation information;
 a selecting device configured to select an identifier of a second user associated with the first user based on the matching degree; and
 transmitter means for transmitting control information to control a second electronic apparatus of the first user based on the second electronic apparatus operation information of the second user.

142. A communication apparatus comprising:
 receiver means for receiving activity information and electronic apparatus operation information from each of a plurality of users;
 determining means for determining a matching degree for a first user based on the received activity information;
 a selecting device configured to select an identifier of a second user associated with the first user based on the matching degree; and
 transmitter means for transmitting control information as contents of an operation for the electronic apparatus to control the electronic apparatus of the first user based on the electronic apparatus operation information of the second user.

143. A communication apparatus comprising:
 receiver means for receiving first electronic apparatus information and user activity information from each of a plurality of users;

determining means for determining a matching degree for a first user based on the contents of an operation for the first electronic apparatus included in the received first electronic apparatus activity information a selecting device configured to select an identifier of a second user associated with the first user based on the matching degree; and transmitter means for transmitting control information to control a second electronic apparatus of the first user based on the user activity information of the second user.

144. An electronic apparatus comprising:

receiver means for receiving control information for controlling an electronic apparatus of a first user; and control means for controlling the electronic apparatus of the first user based on the received control information, wherein the control information includes control information for an electronic apparatus of a second user as a similar, the second user selected based on a matching degree for the first user based on contents of an operation for another electronic apparatus, and wherein the contents of an operation for the other electronic apparatus of the second user is similar to that of the first user.

145. The communication apparatus of claim 144, wherein the similar user has a highest degree of matching with the other electronic apparatus with the user based on the contents of an operation of the other electronic apparatus determined from the number of fully matched words on a text basis and a weighting process performed with the degree of matching varied from full to partial matching.

146. An electronic apparatus comprising:

receiver means for receiving control information for controlling the electronic apparatus of a first user; and control means for controlling the electronic apparatus of the first user based on the received control information, wherein the control information includes control information for an electronic apparatus of a second user as a similar, the second user selected based on a matching degree for the first user based on an activity information, wherein an activity information of the second user is similar to an activity information of the first user of the electronic apparatus, and wherein the matching degree is determined from the number of fully matched words on a text basis or a weighting process performed with the degree of matching varied from full to partial matching.

147. The communication apparatus of claim 146, wherein the similar user has a highest degree of matching with the other electronic apparatus with the user based on the contents of an operation of the other electronic apparatus determined from the number of fully matched words on a text basis and a weighting process performed with the degree of matching varied from full to partial matching.

148. A communication method comprising:

receiving first electronic apparatus operation information and second electronic apparatus operation information from each of a plurality of users;

determining a matching degree for a first user among said received first electronic apparatus operation information based on the contents of an operation for the first electronic apparatus received from each of the plurality of users;

selecting an identifier of a a second user associated with the first user based on the matching degree; and transmitting control information to control a second electronic apparatus of the first user based on the second electronic apparatus operation information of the second user.

149. The communication method of claim 148, wherein the matching degree based on the contents of the operation is determined from the number of fully matched words on a text basis and a weighting process is performed with the degree of matching varied from full to partial matching.

* * * * *